United States Patent [19]

Ishida et al.

[11] Patent Number: 5,646,850
[45] Date of Patent: Jul. 8, 1997

[54] AUTO-DRIVE CONTROL APPARATUS FOR USE IN VEHICLE APPARATUS

[75] Inventors: Akira Ishida, Sakai; Masahiro Takada, Hirakata; Kazushige Narazaki, Katano; Osamu Ito, Kadoma, all of Japan

[73] Assignee: Matsushita Electric Industrial Co., Ltd., Osaka-fu, Japan

[21] Appl. No.: 234,601

[22] Filed: Apr. 28, 1994

Related U.S. Application Data

[63] Continuation of Ser. No. 733,208, Jul. 19, 1991, abandoned.

[30] Foreign Application Priority Data

| Jun. 13, 1990 | [JP] | Japan | 2-154742 |
| Jul. 19, 1990 | [JP] | Japan | 2-191390 |
| Nov. 15, 1990 | [JP] | Japan | 2-310773 |
| Mar. 19, 1991 | [JP] | Japan | 3-054500 |
| Jun. 21, 1991 | [JP] | Japan | 3-150039 |

[51] Int. Cl.$^6$ .................................................. B60K 31/00
[52] U.S. Cl. ............................. 364/426.041; 180/179; 123/352
[58] Field of Search ............... 364/426.04, 431.07; 123/352; 180/170, 176, 179

[56] References Cited

U.S. PATENT DOCUMENTS

| 4,730,839 | 3/1988 | Miyoshi | 180/143 |
| 4,803,637 | 2/1989 | Tada et al. | 364/426.04 |
| 4,843,553 | 6/1989 | Ohata | 364/426.04 |
| 4,926,334 | 5/1990 | Suzuki et al. | 364/426.04 |
| 4,939,657 | 7/1990 | Imai et al. | 364/426.04 |
| 4,953,093 | 8/1990 | Etoh | 364/426.04 |
| 4,958,288 | 9/1990 | Takahashi | 364/426.04 |
| 4,982,805 | 1/1991 | Naitou et al. | 180/179 |
| 5,005,133 | 4/1991 | Takahashi | 364/426.04 |
| 5,021,958 | 6/1991 | Tokoro | 364/426.04 |
| 5,038,880 | 8/1991 | Matsuoka et al. | 180/179 |
| 5,099,941 | 3/1992 | Kawano et al. | 364/426.04 |
| 5,137,104 | 8/1992 | Etoh | 180/179 |
| 5,189,618 | 2/1993 | Tsujii et al. | 364/426.04 |

FOREIGN PATENT DOCUMENTS

| 3841386A1 | 8/1988 | Germany . |
| 1-145235 | 6/1989 | Japan . |
| 1-153344 | 6/1989 | Japan . |

OTHER PUBLICATIONS

Patent Abstracts of Japan, Sep. 13, 1989, vol. 13, No. 415 (M-870) [3763].

*Primary Examiner*—Gary Chin
*Attorney, Agent, or Firm*—Wenderoth, Lind & Ponack

[57] ABSTRACT

A constant travel speed control apparatus is for use in a vehicle and utilizes time delay control which is a kind of adaptive control for estimating an unknown term. A plurality of targeted paths, each having a certain waveform, for causing the actual speed of the vehicle to converge on a target speed are provided and an error vector is defined on the basis of the paths. The actual speed of the vehicle can be made to converge on the target speed thereof with a constant convergence performance along a target path in spite of the fluctuation of vehicle dynamic characteristics.

18 Claims, 46 Drawing Sheets

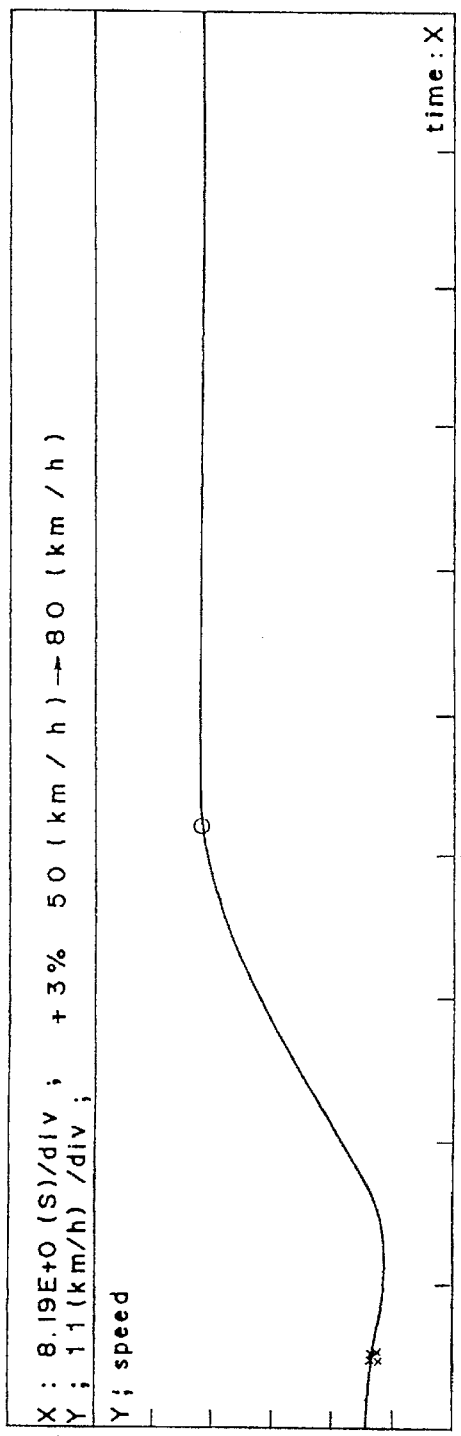
Fig. 20(a)1
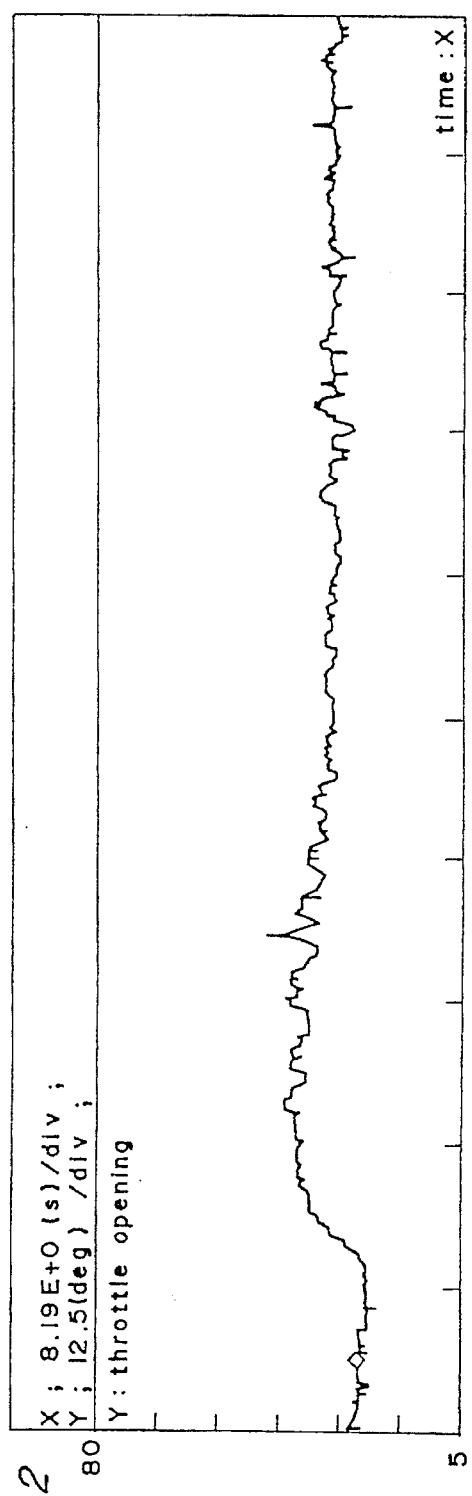
Fig. 20(a)2

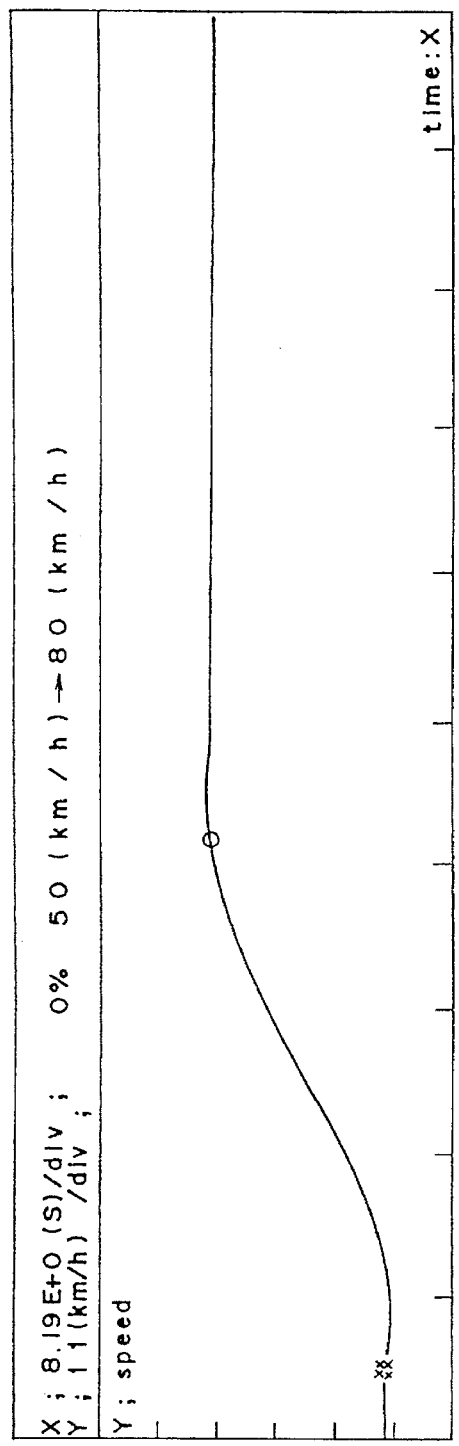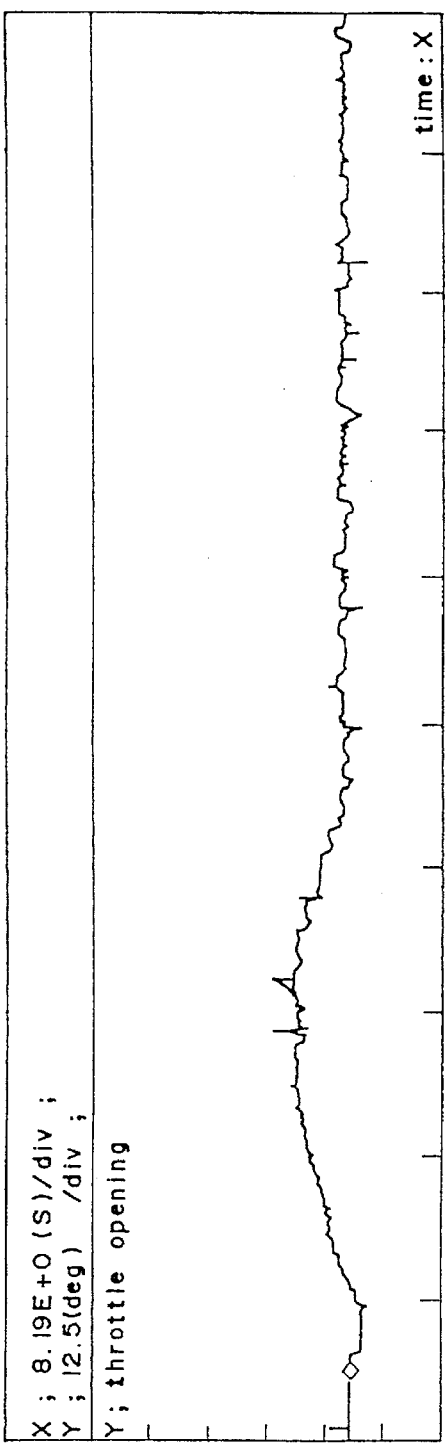

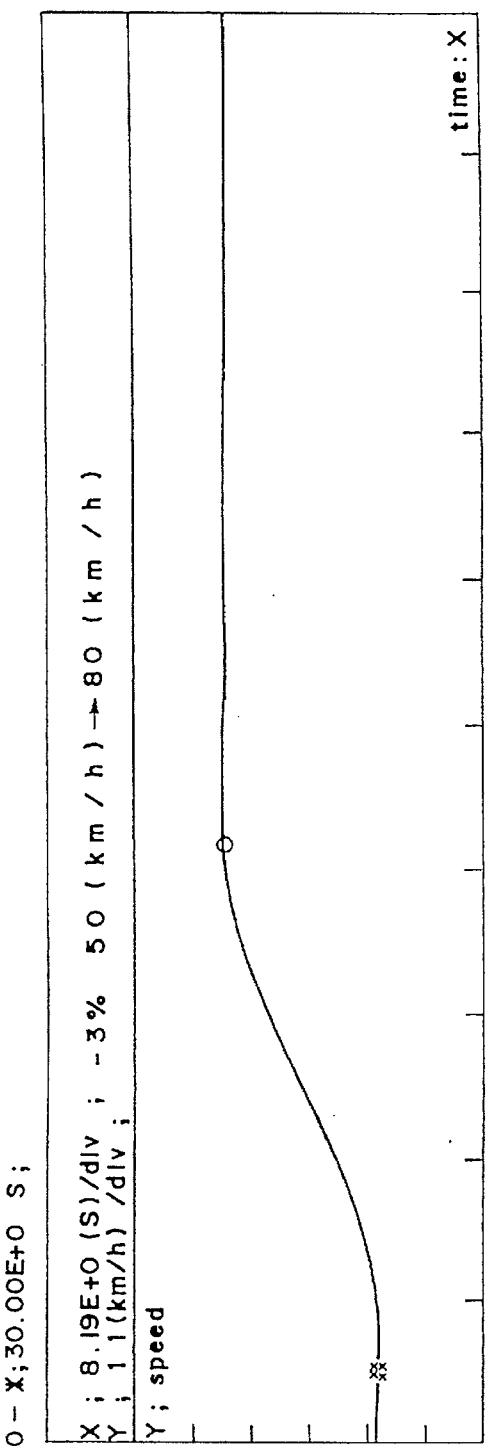
Fig. 20(c)1
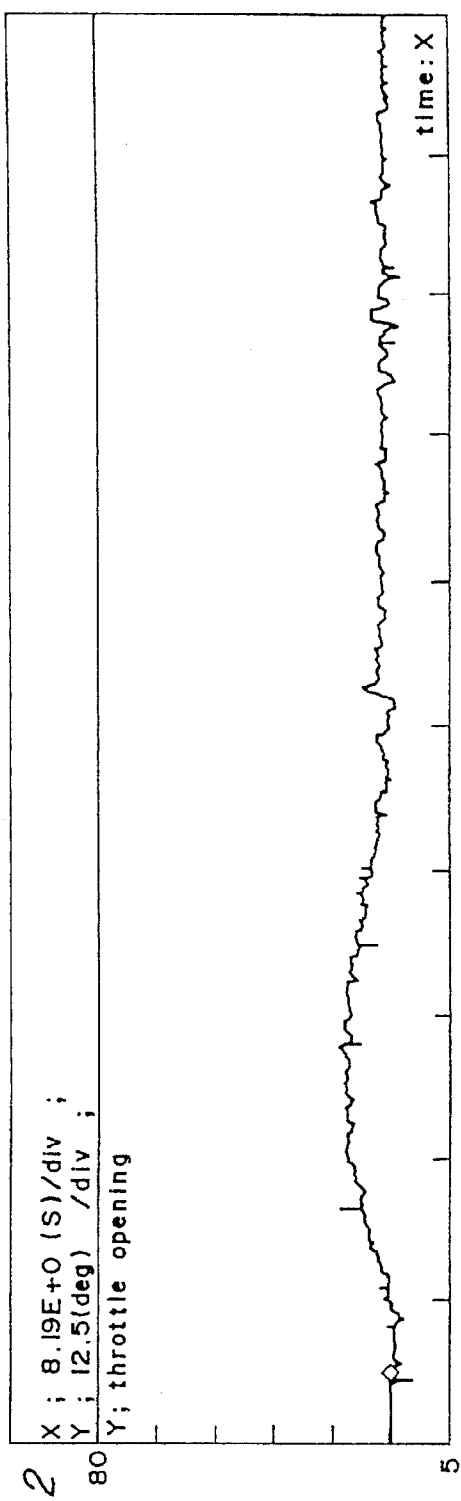
Fig. 20(c)2

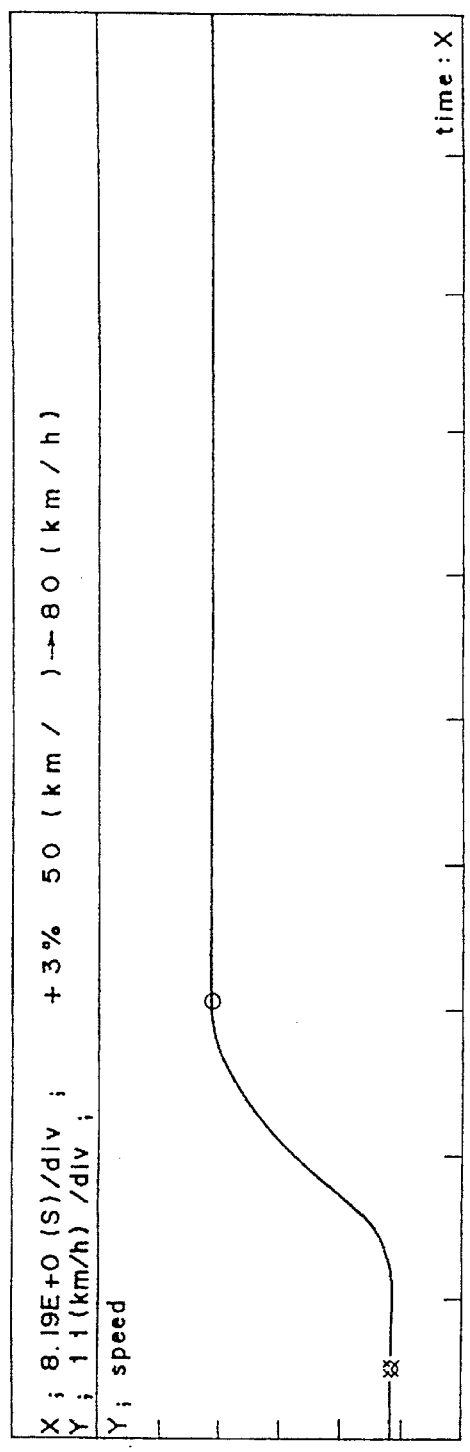
Fig. 20(d)1
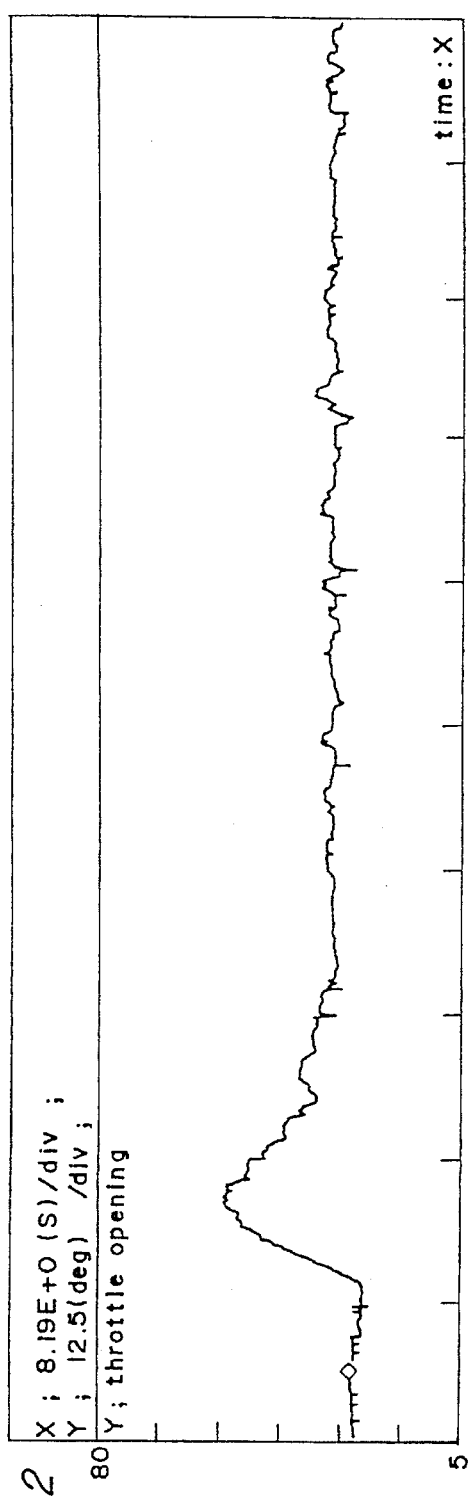
Fig. 20(d)2

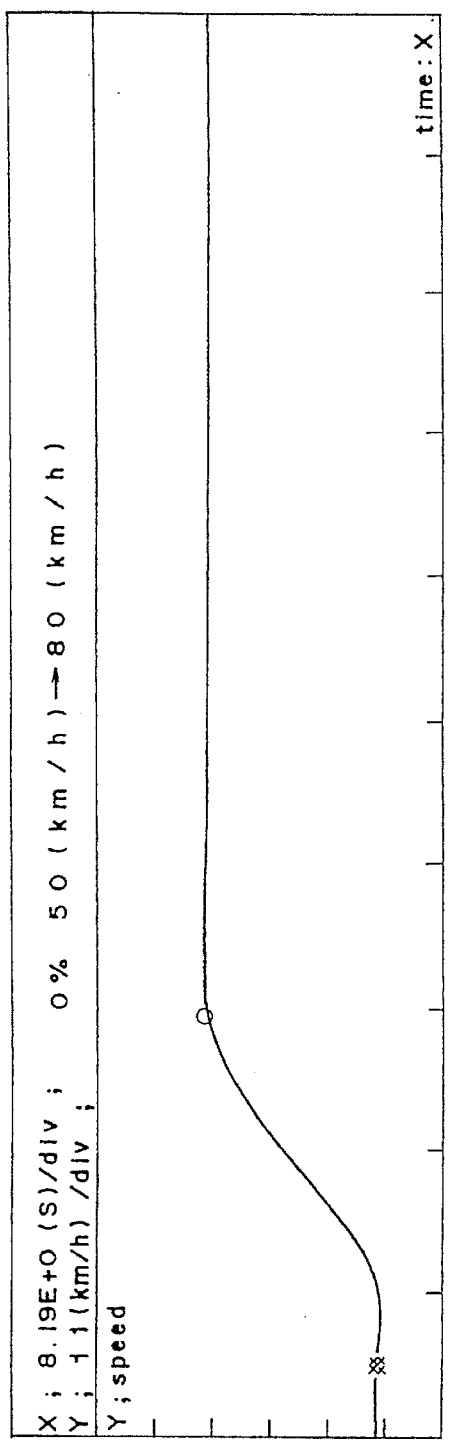
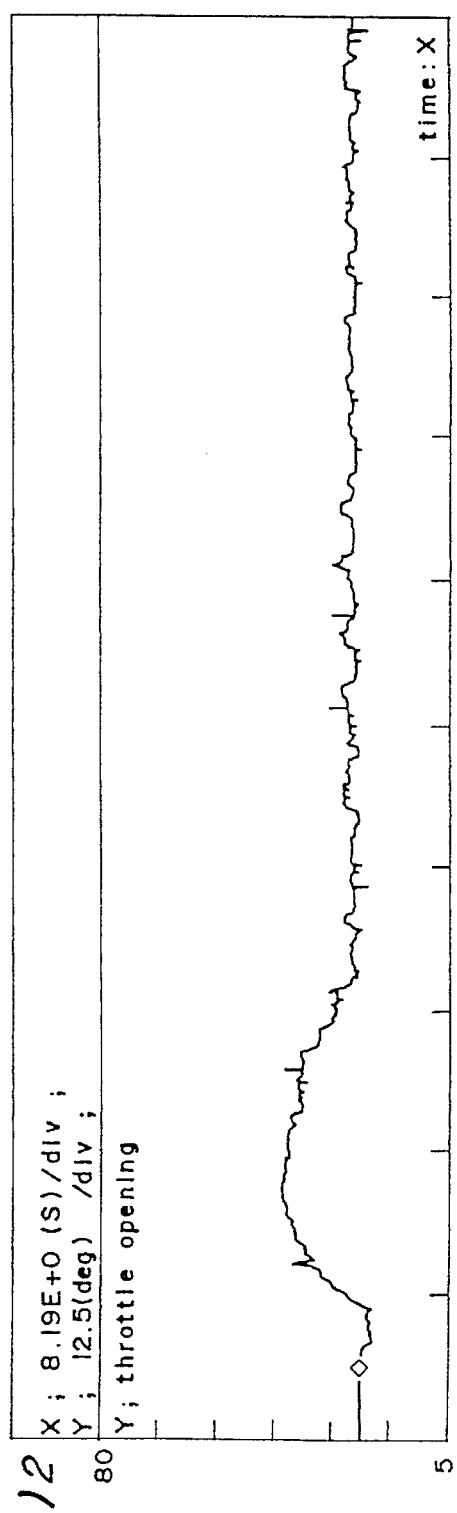
Fig. 20(e)1
Fig. 20(e)2

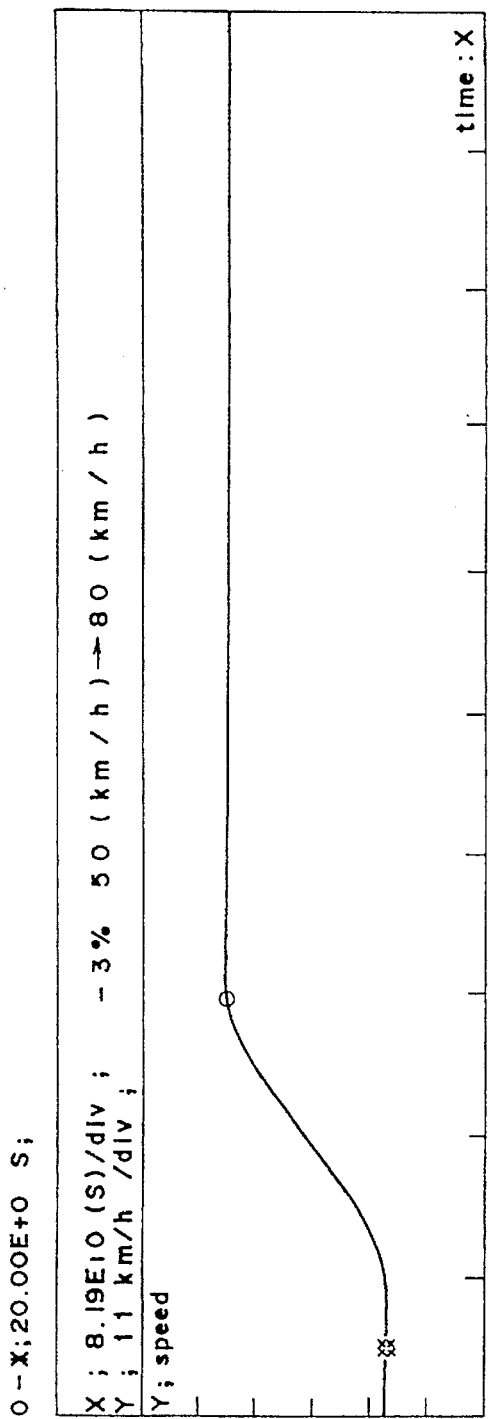
Fig. 20(f)1
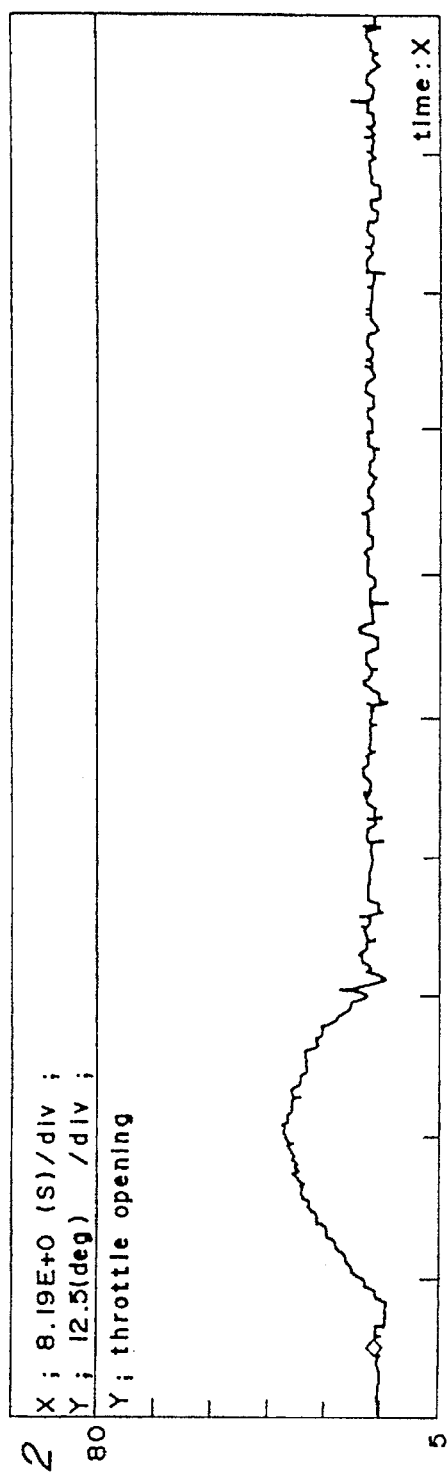
Fig. 20(f)2

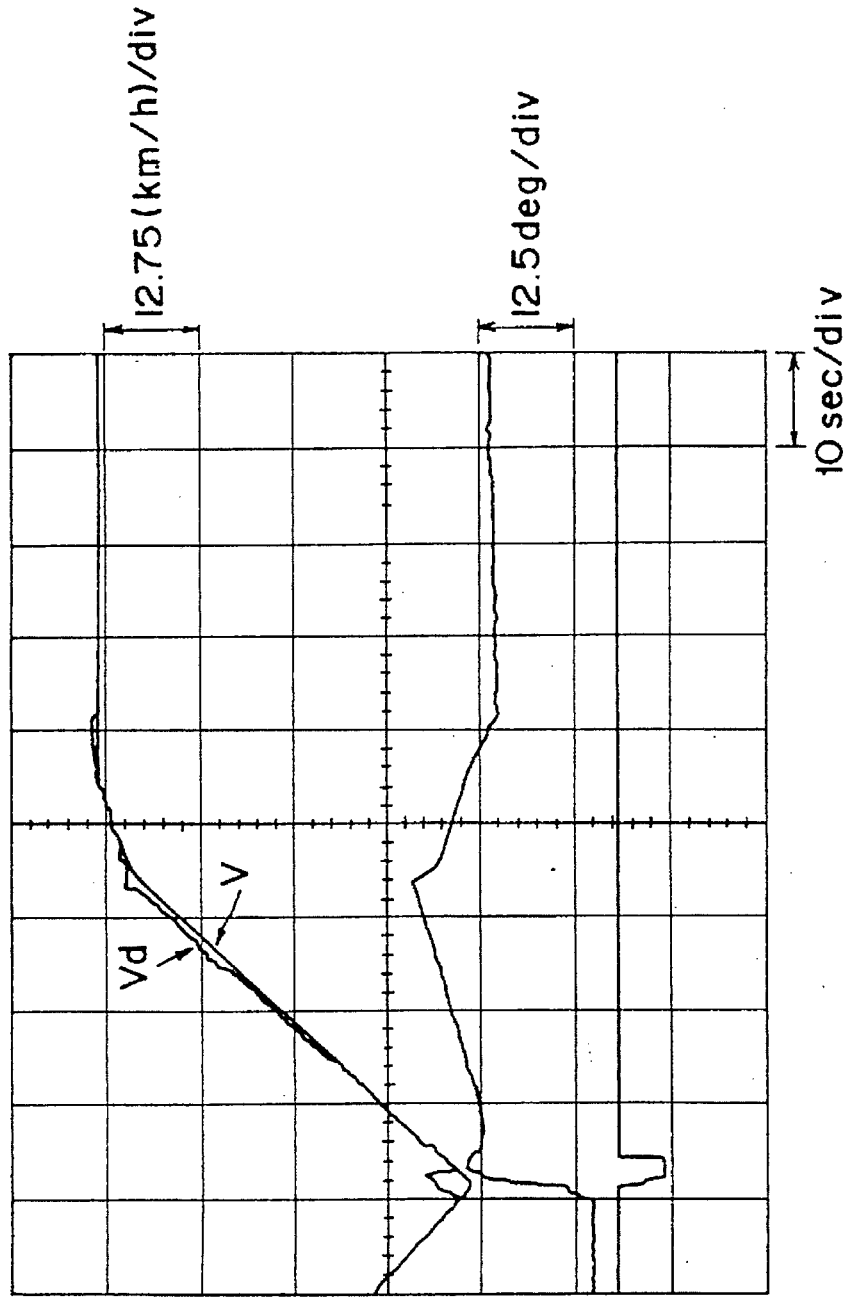

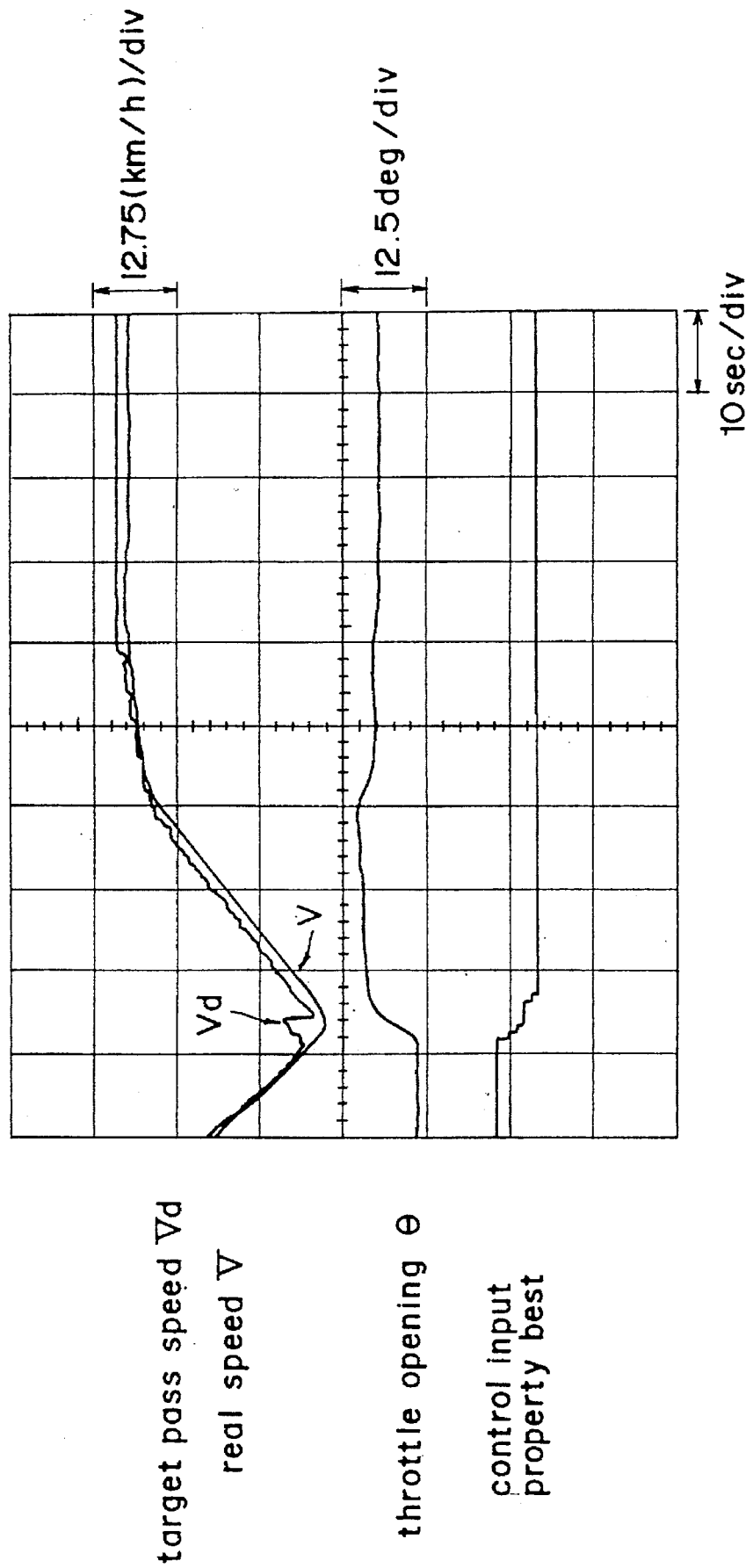

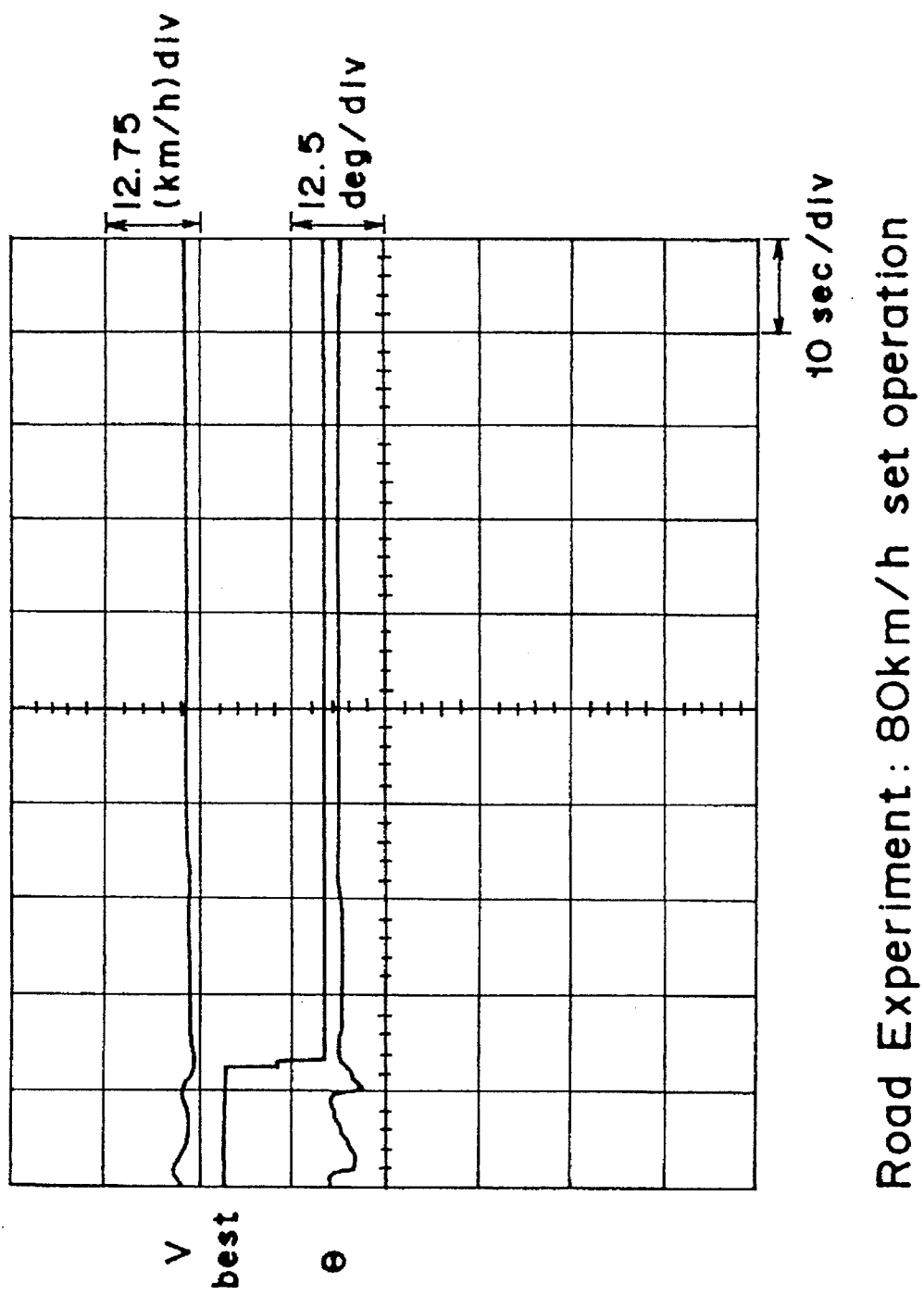

Road Experiment Response to slope variation (100 km/h set)

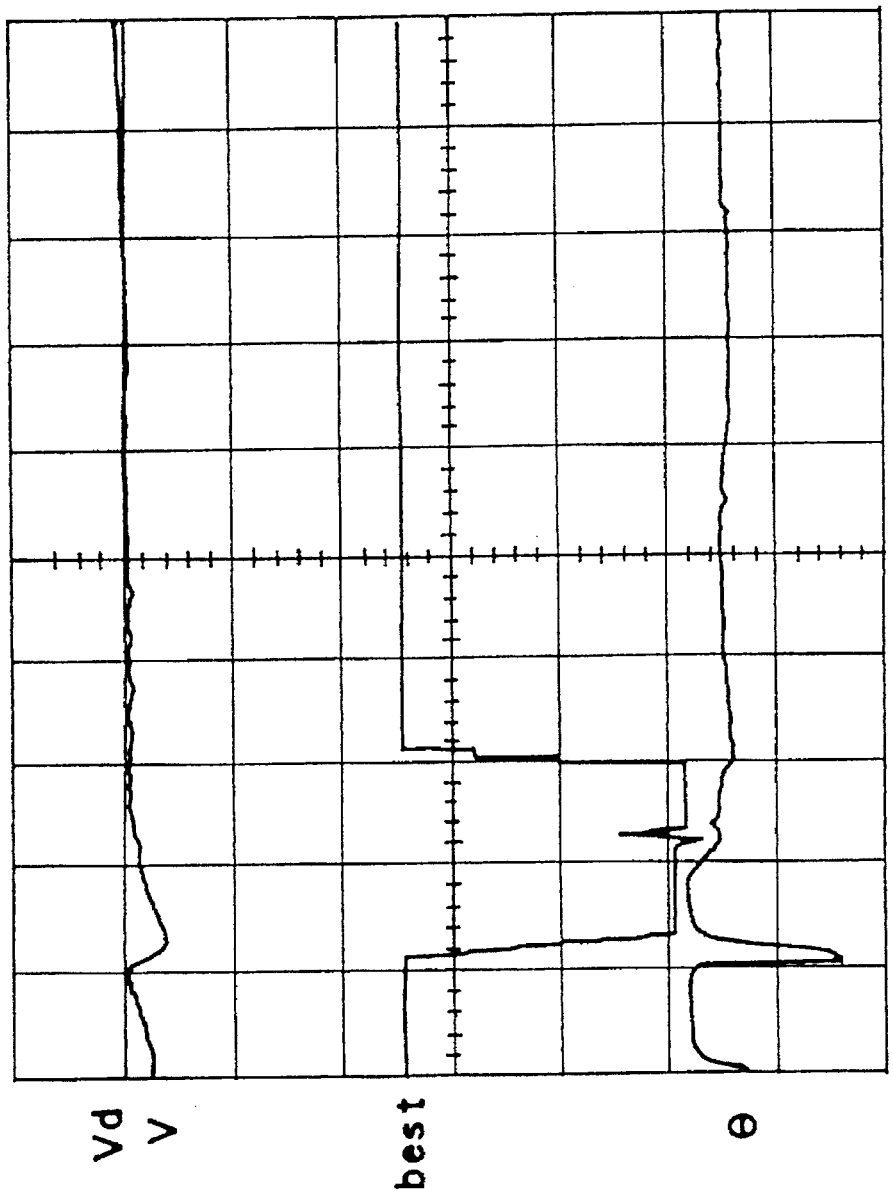

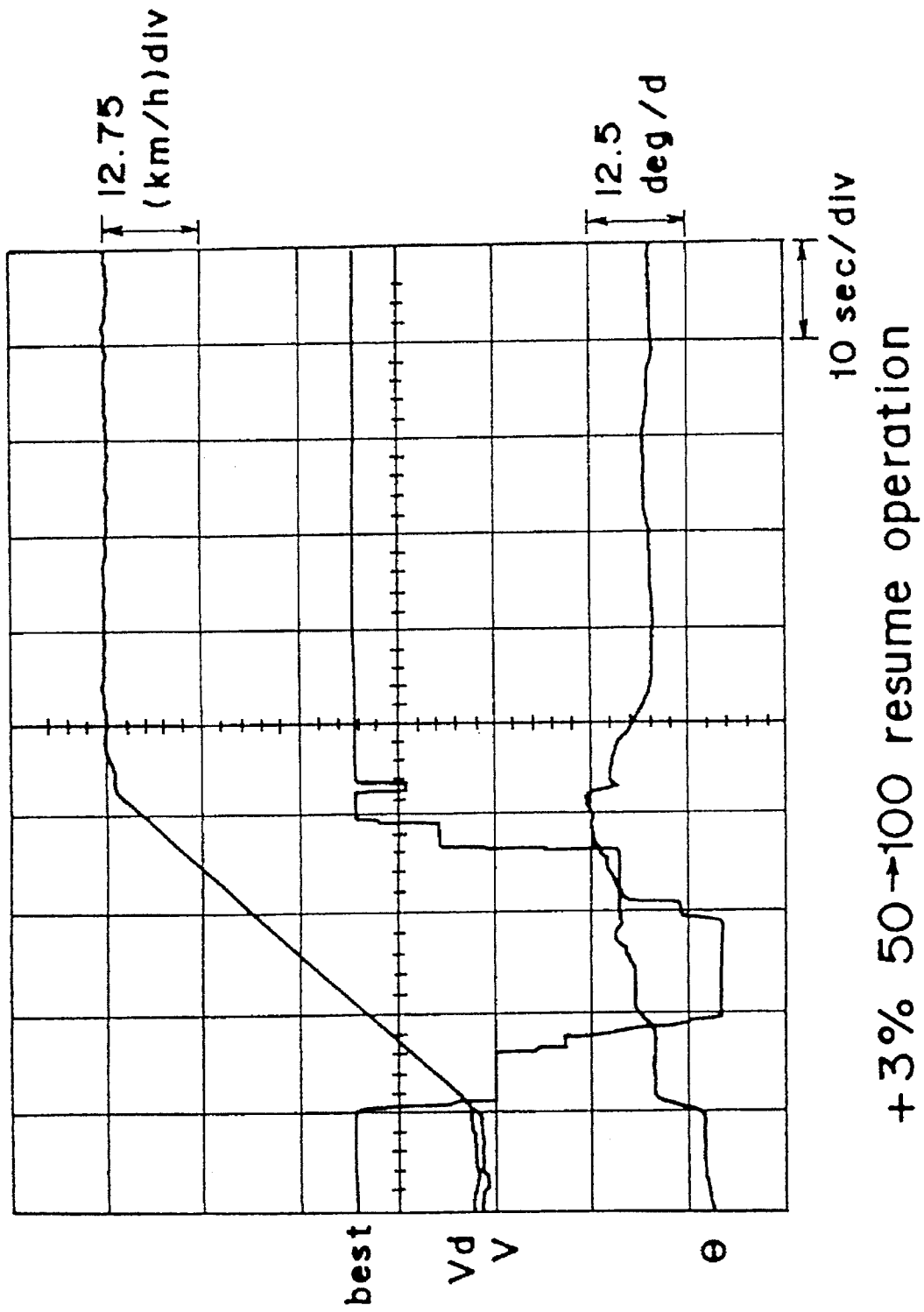

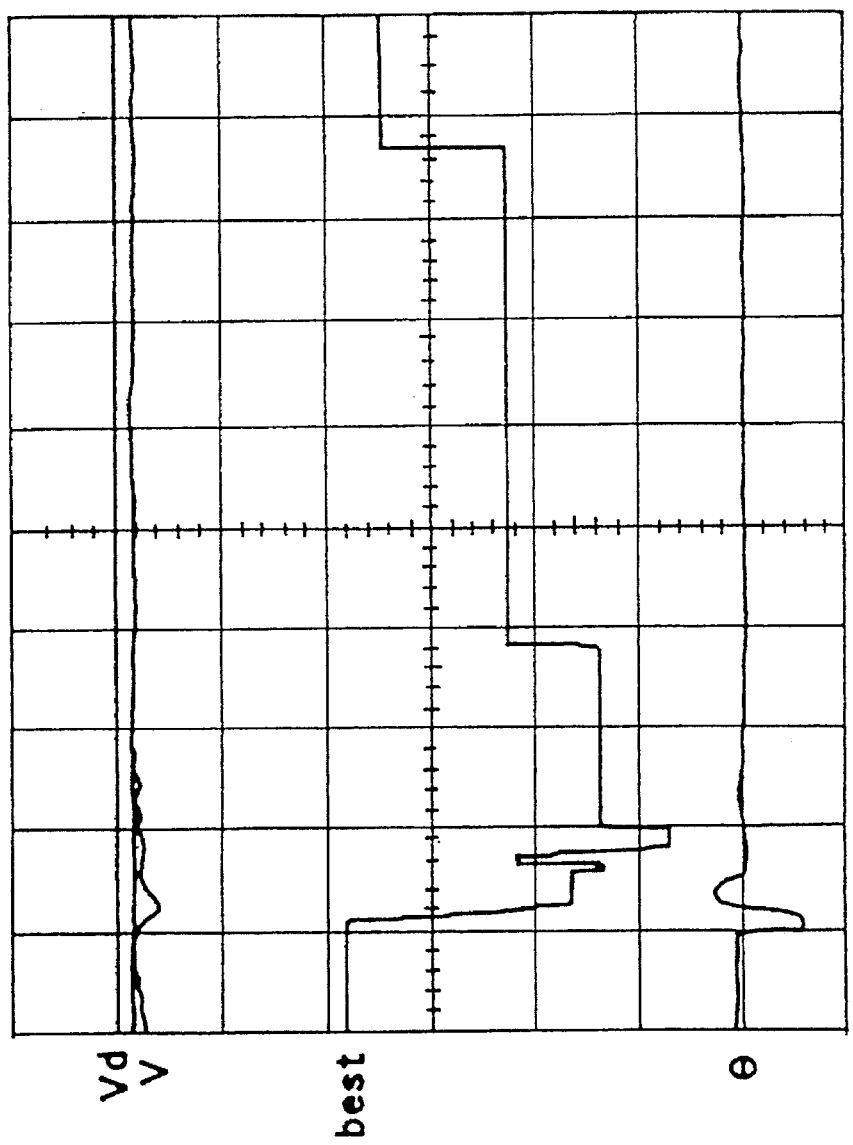

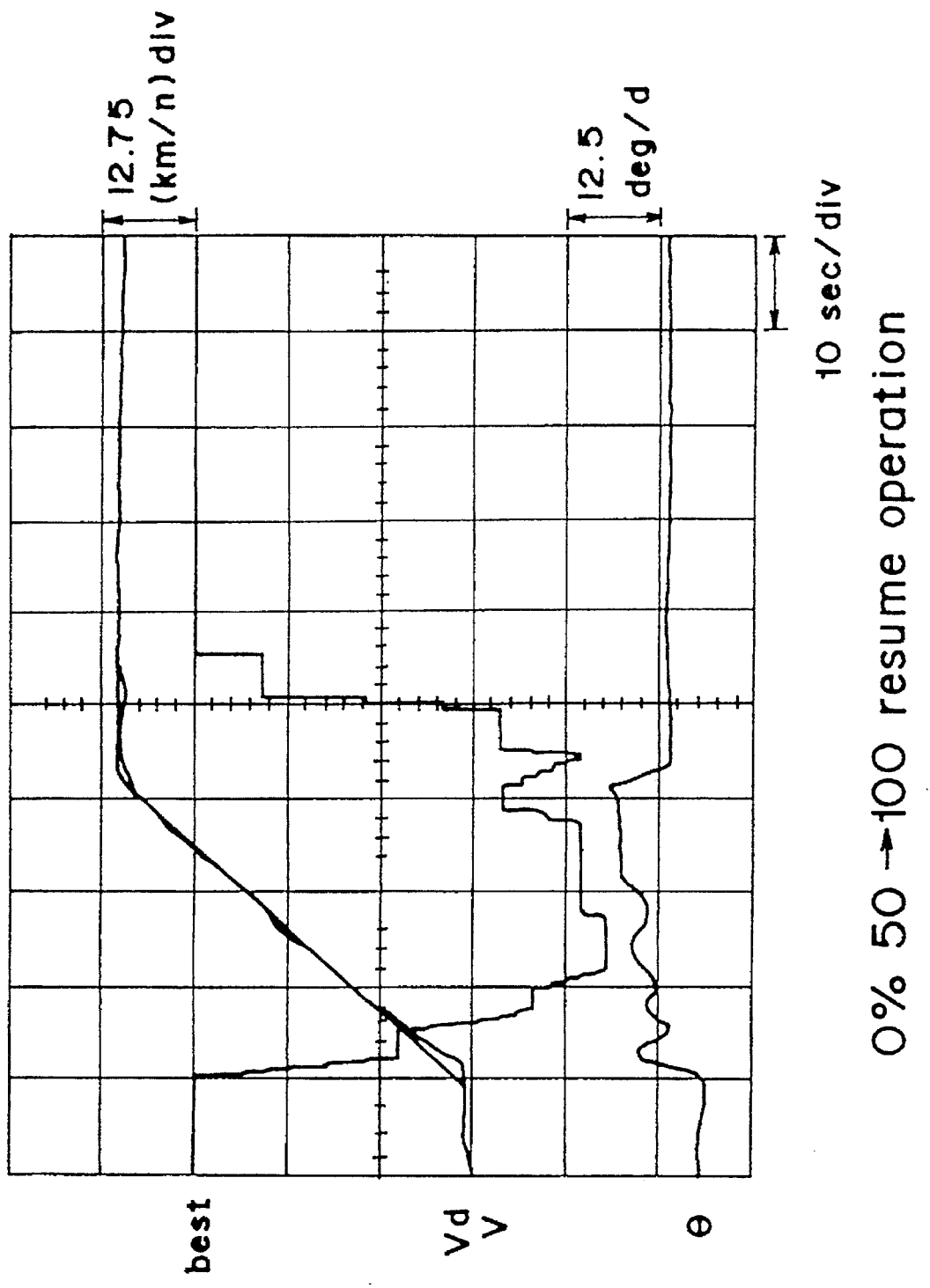
Fig. 25(b)2

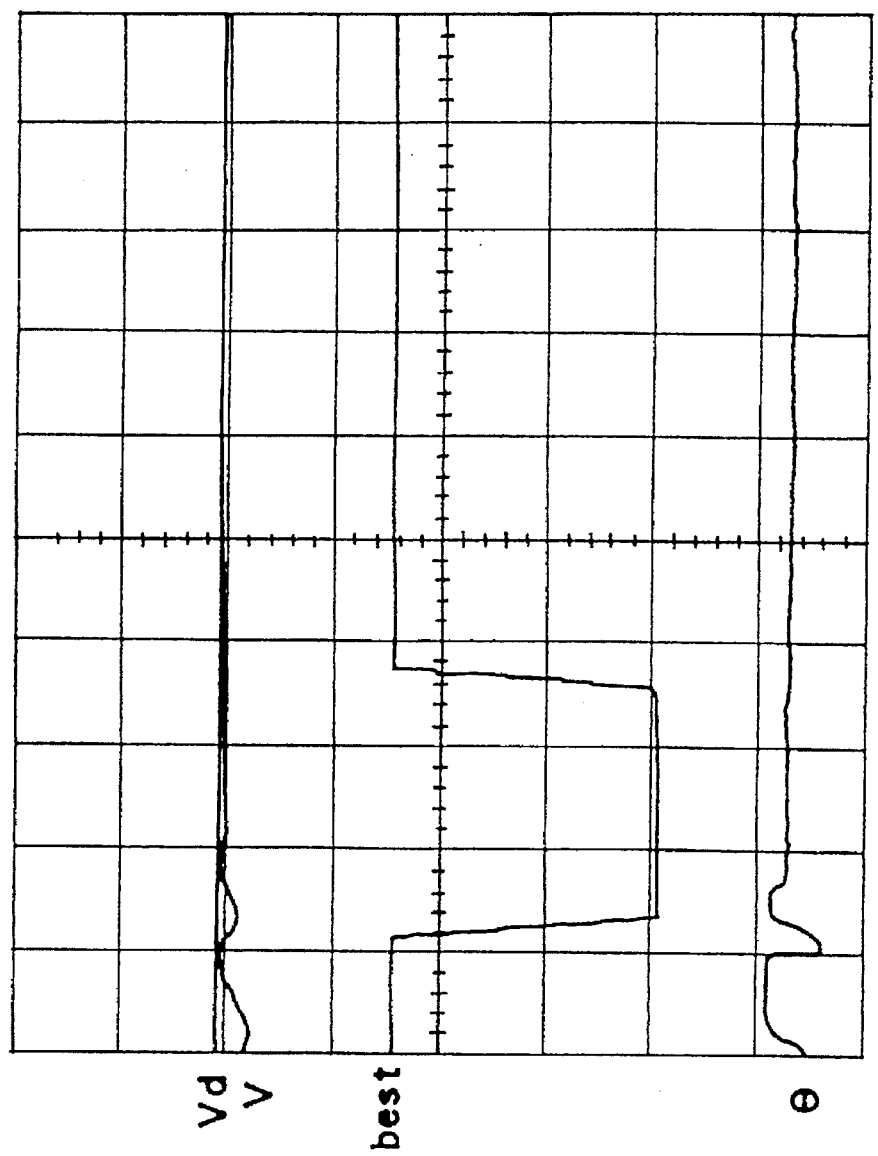

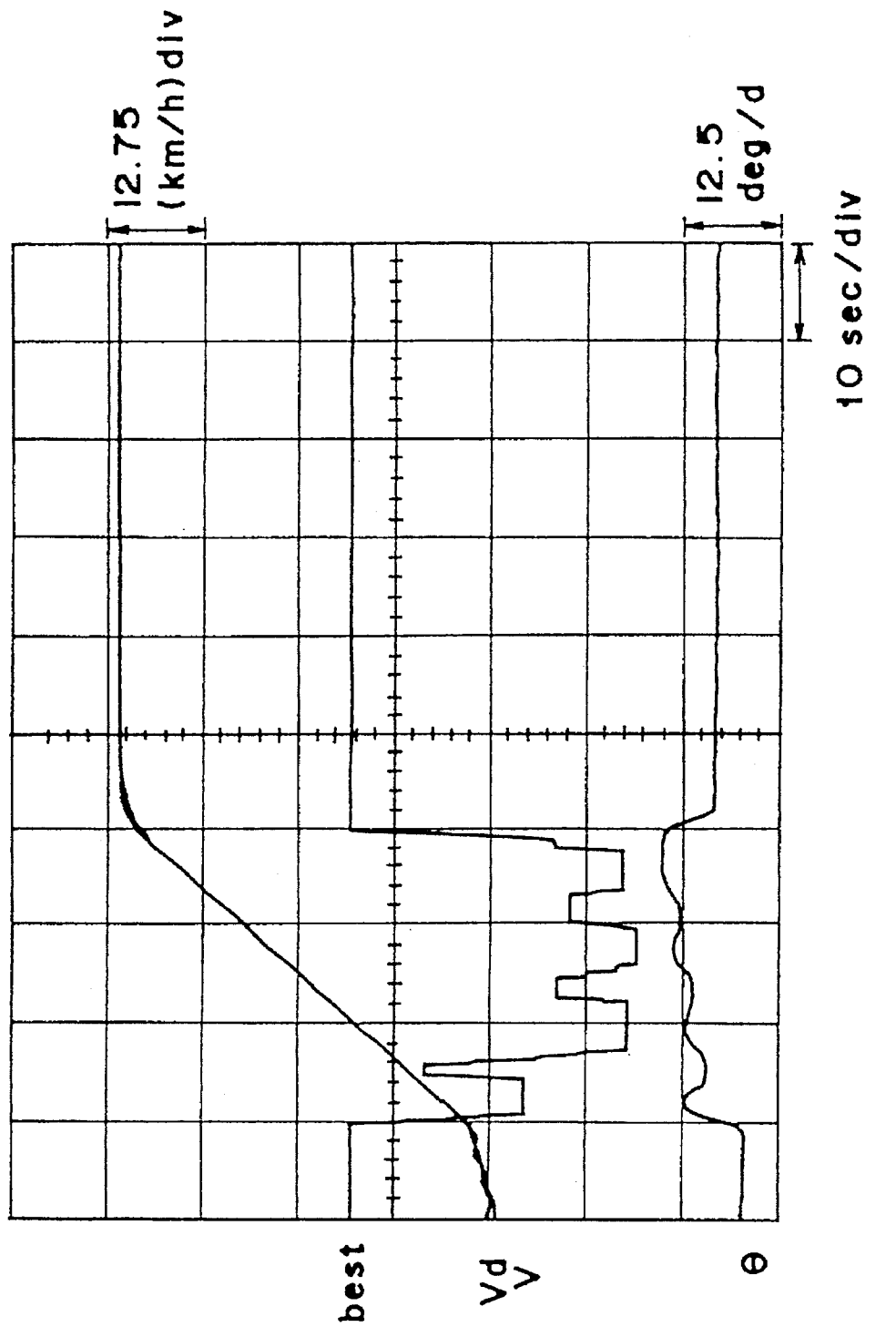
Fig. 25(c)2
−3% 50→100 resume operation

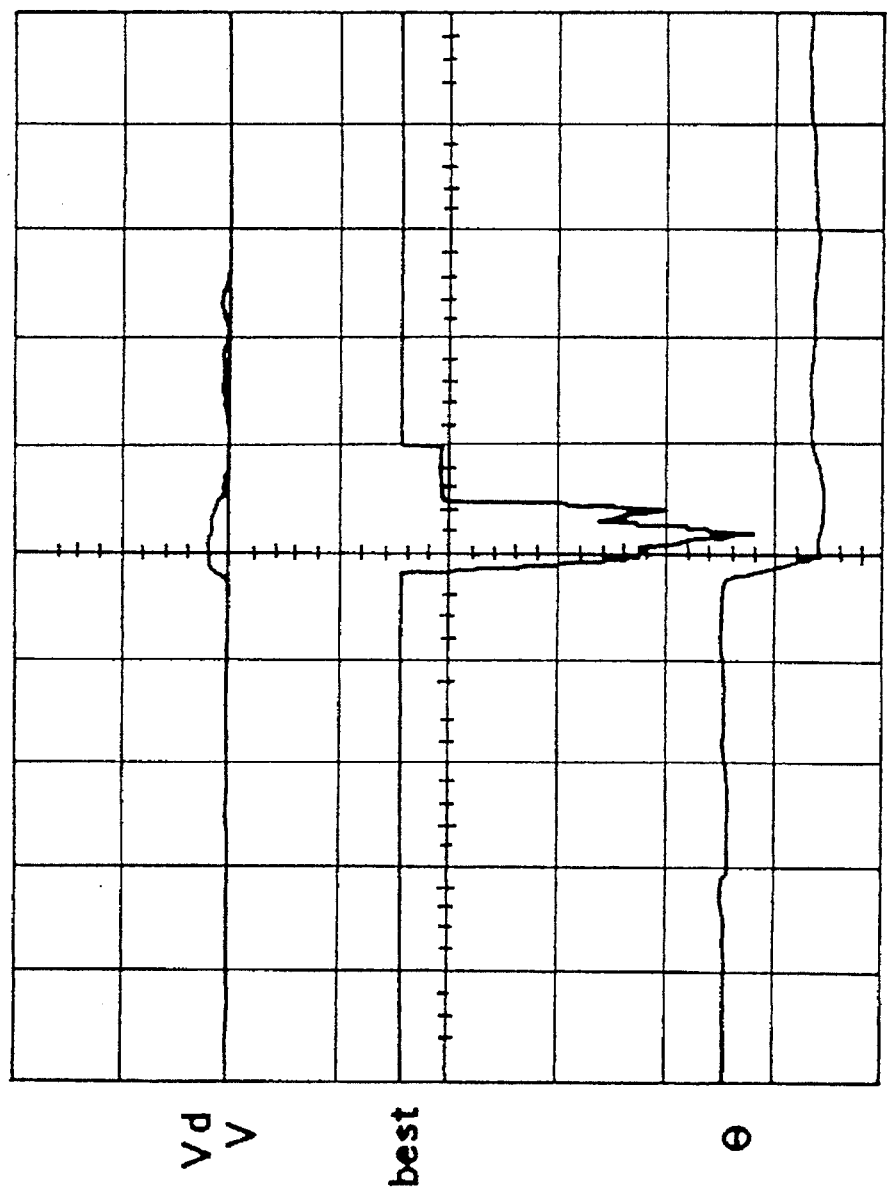

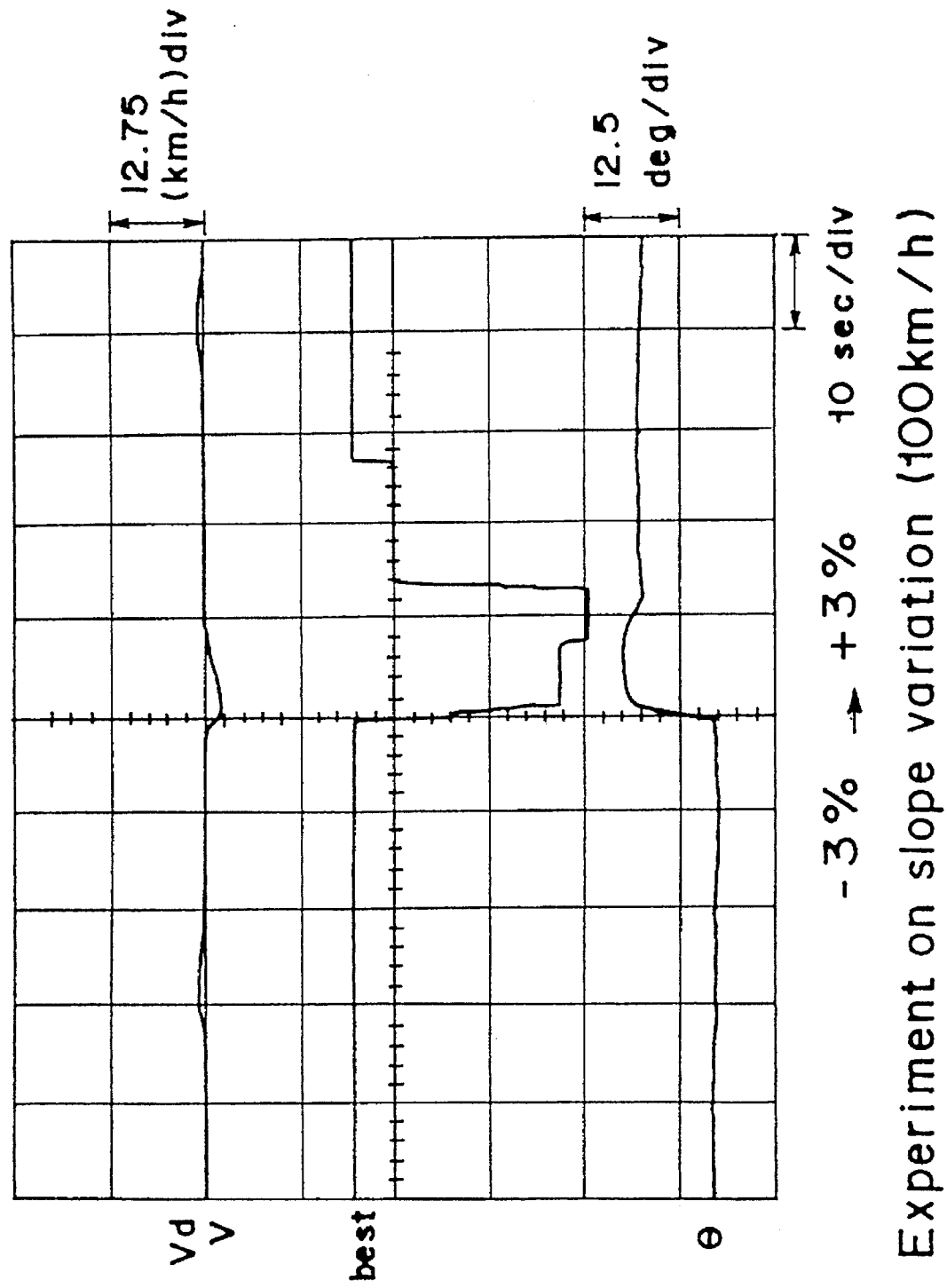
Fig. 25(d)2
Experiment on slope variation (100km/h)

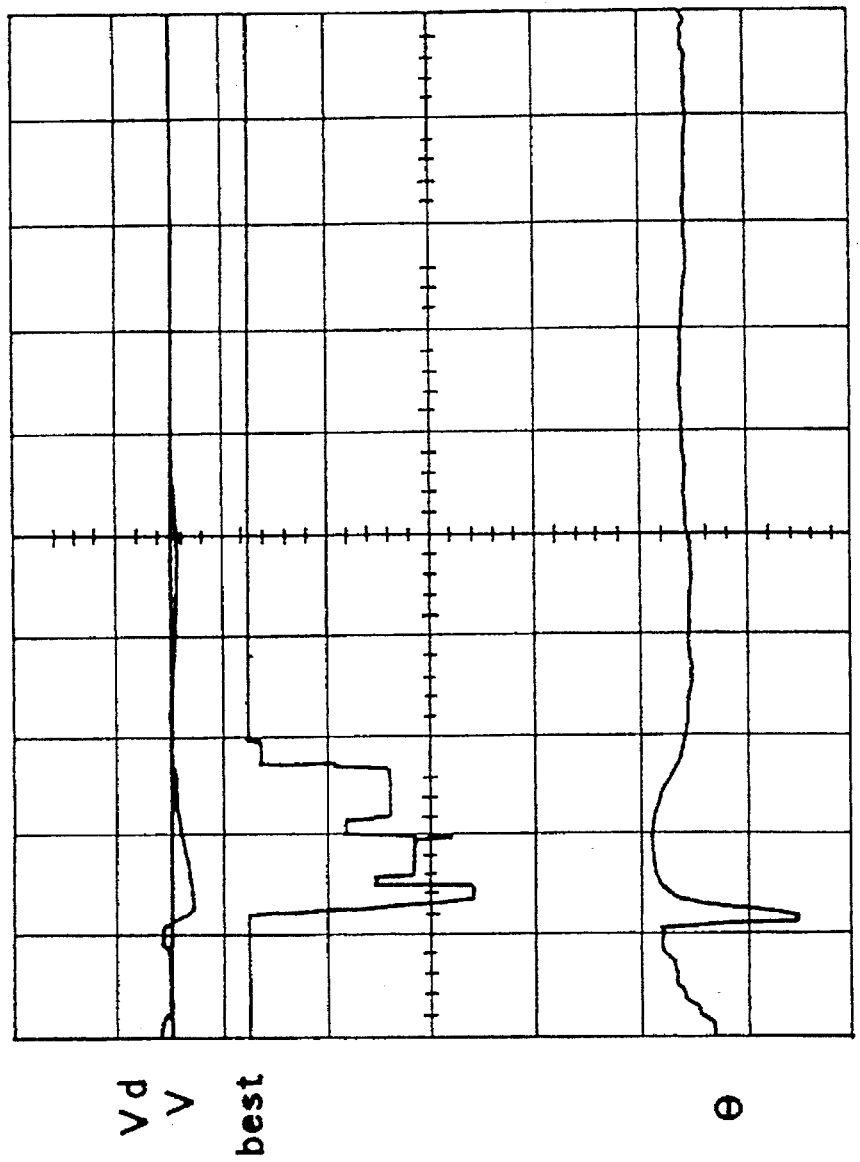

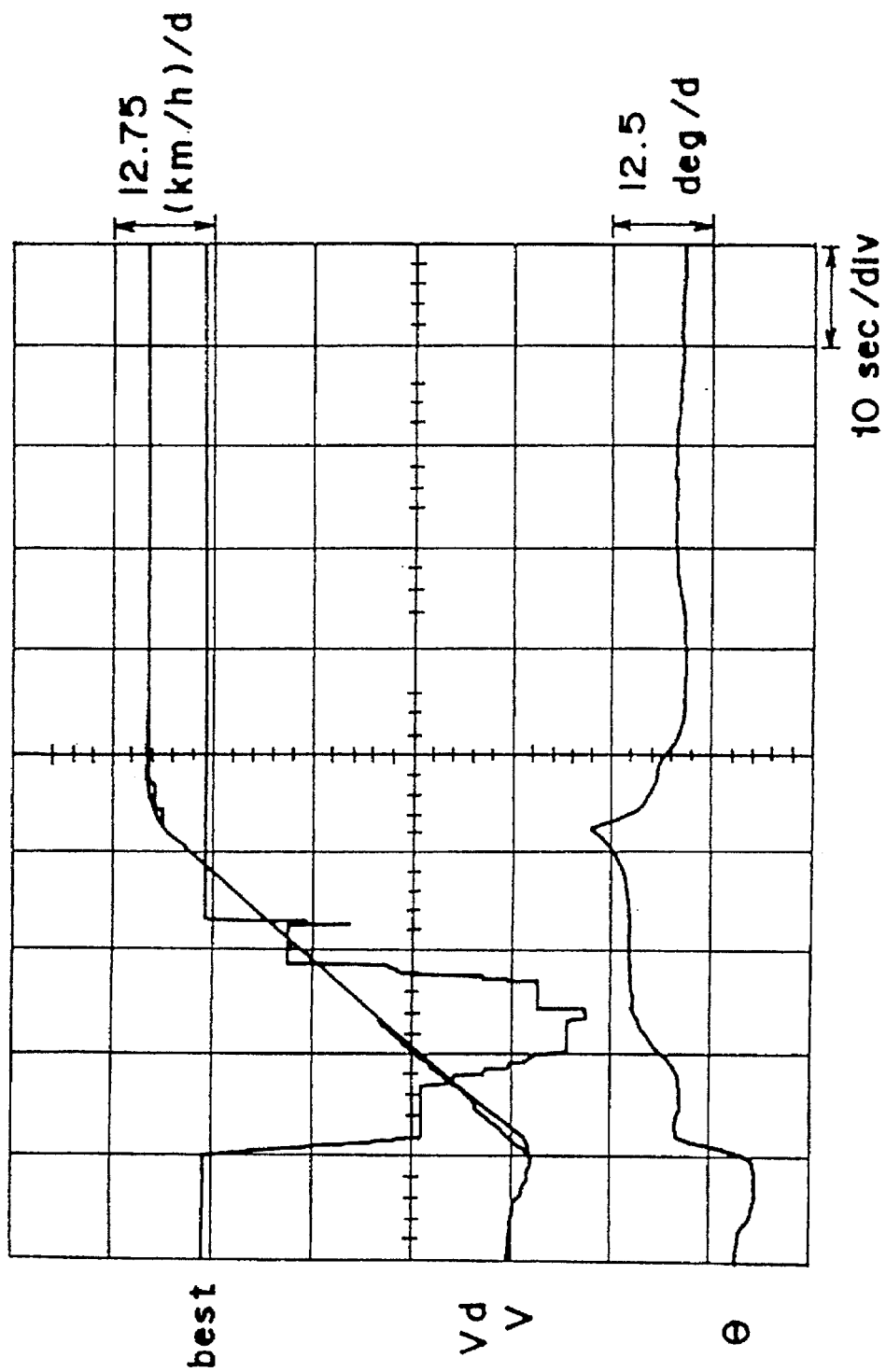
Fig. 26(a)2

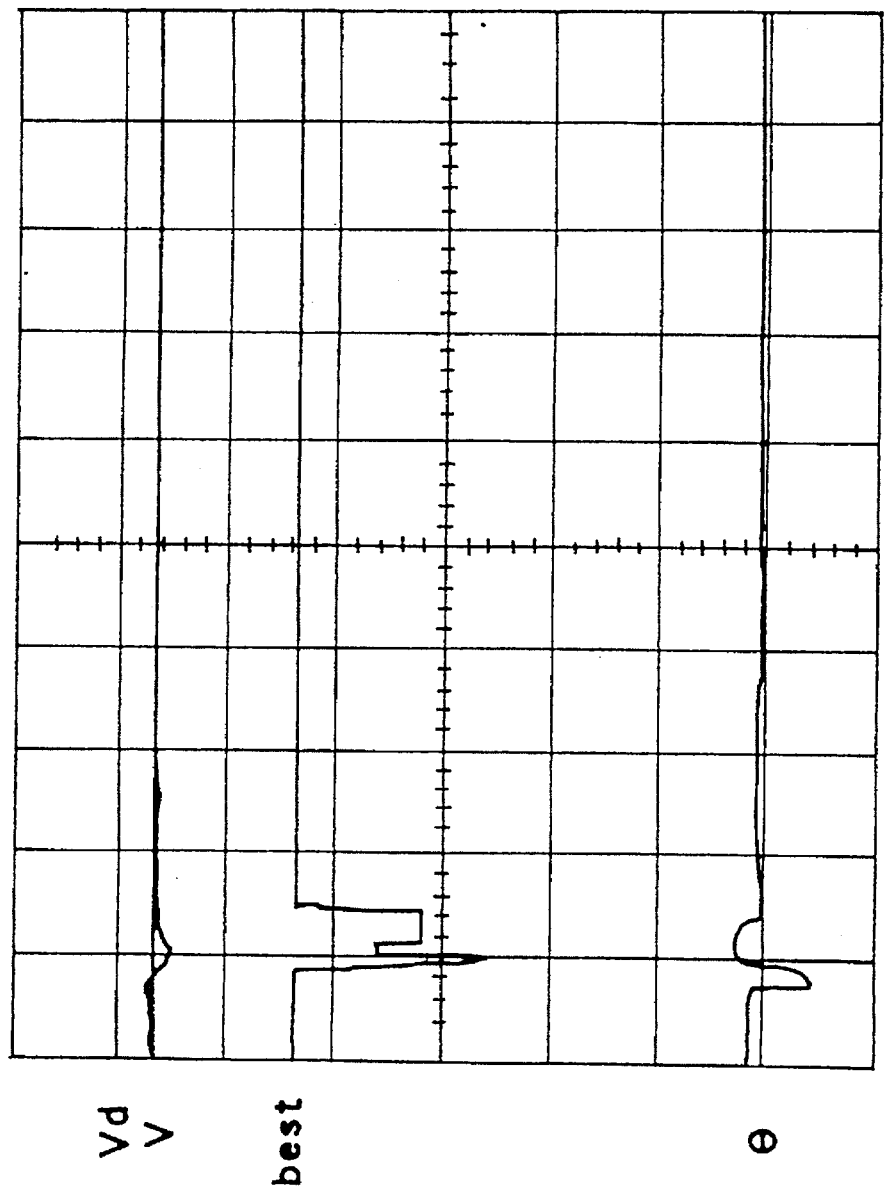

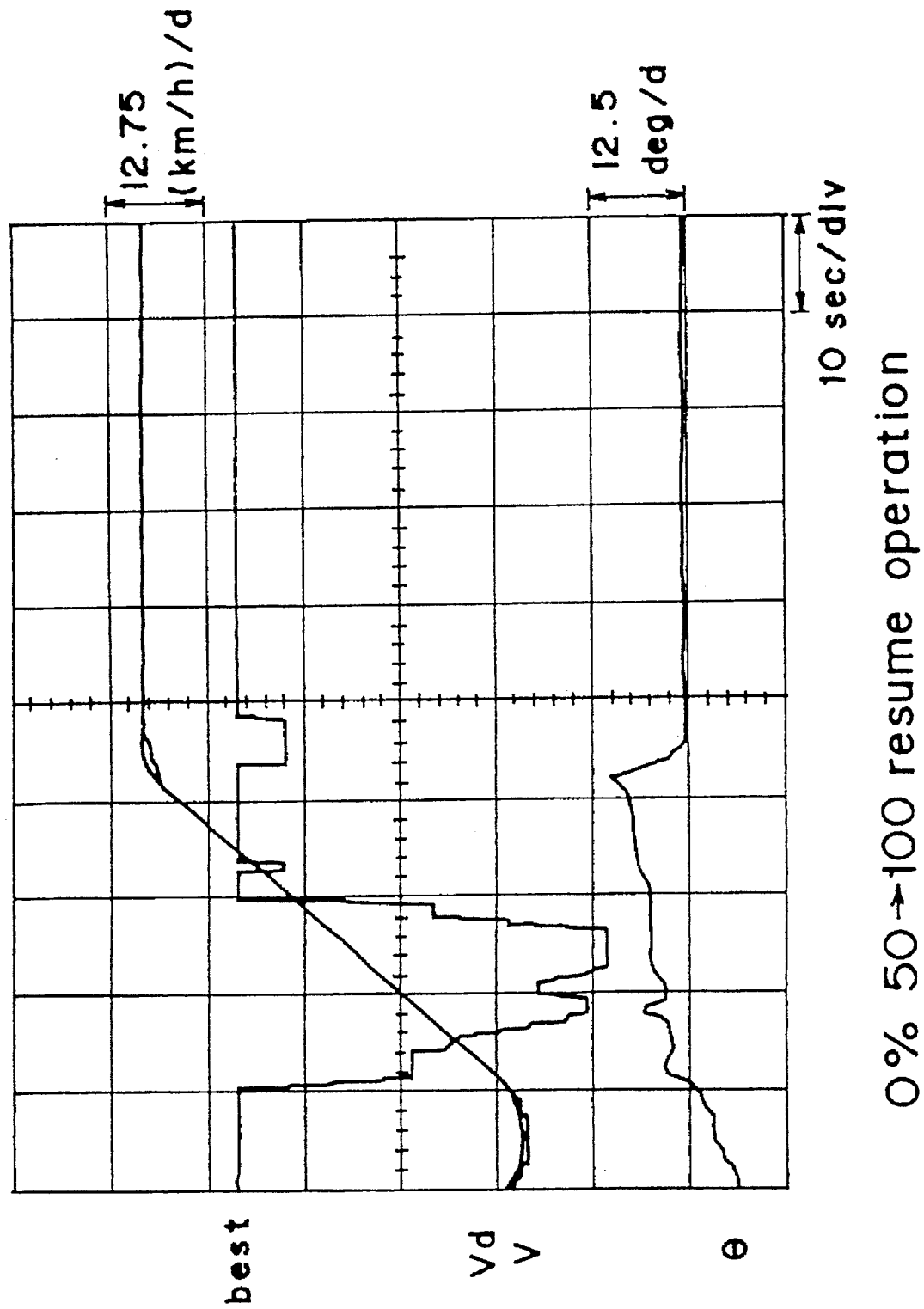

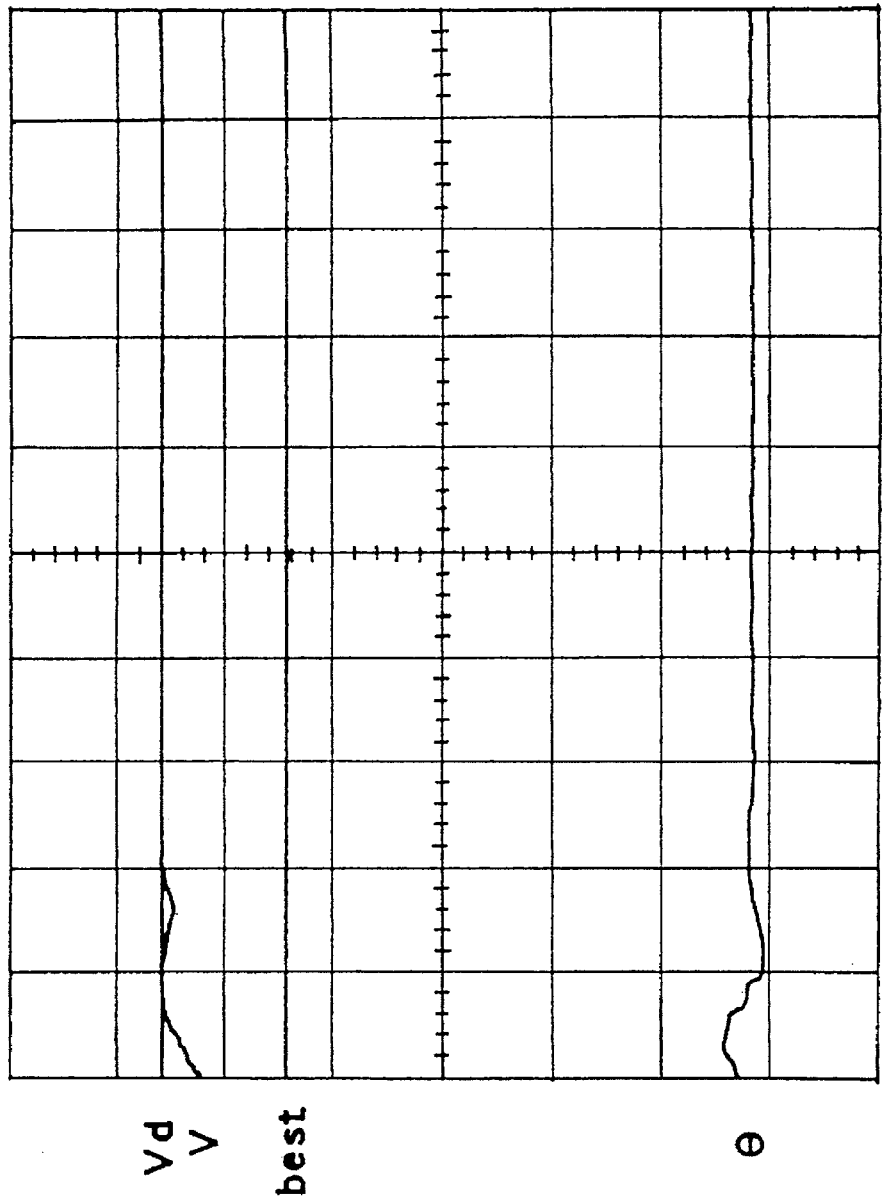
Fig. 26(c)1 -3% 100km/h set operation

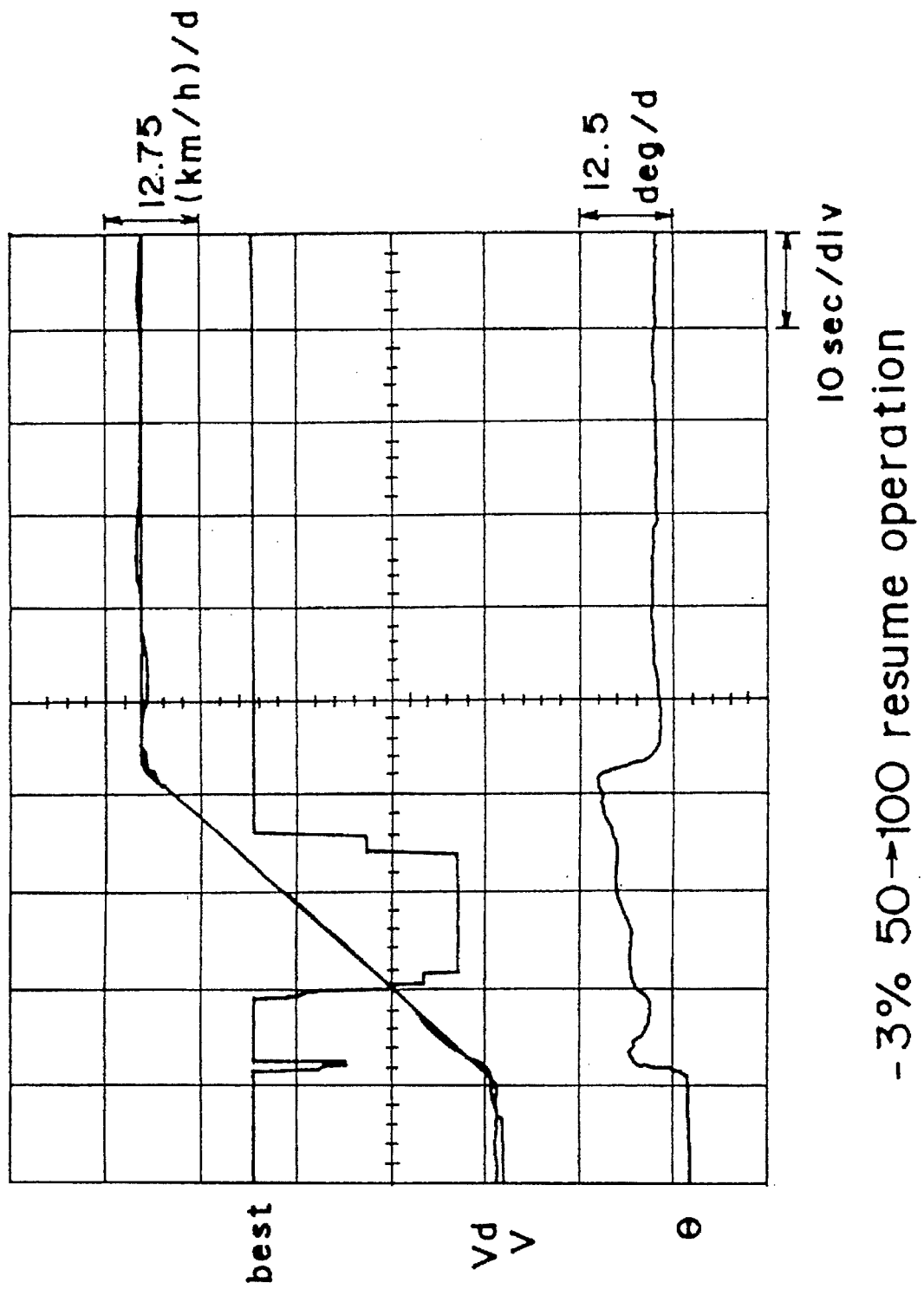

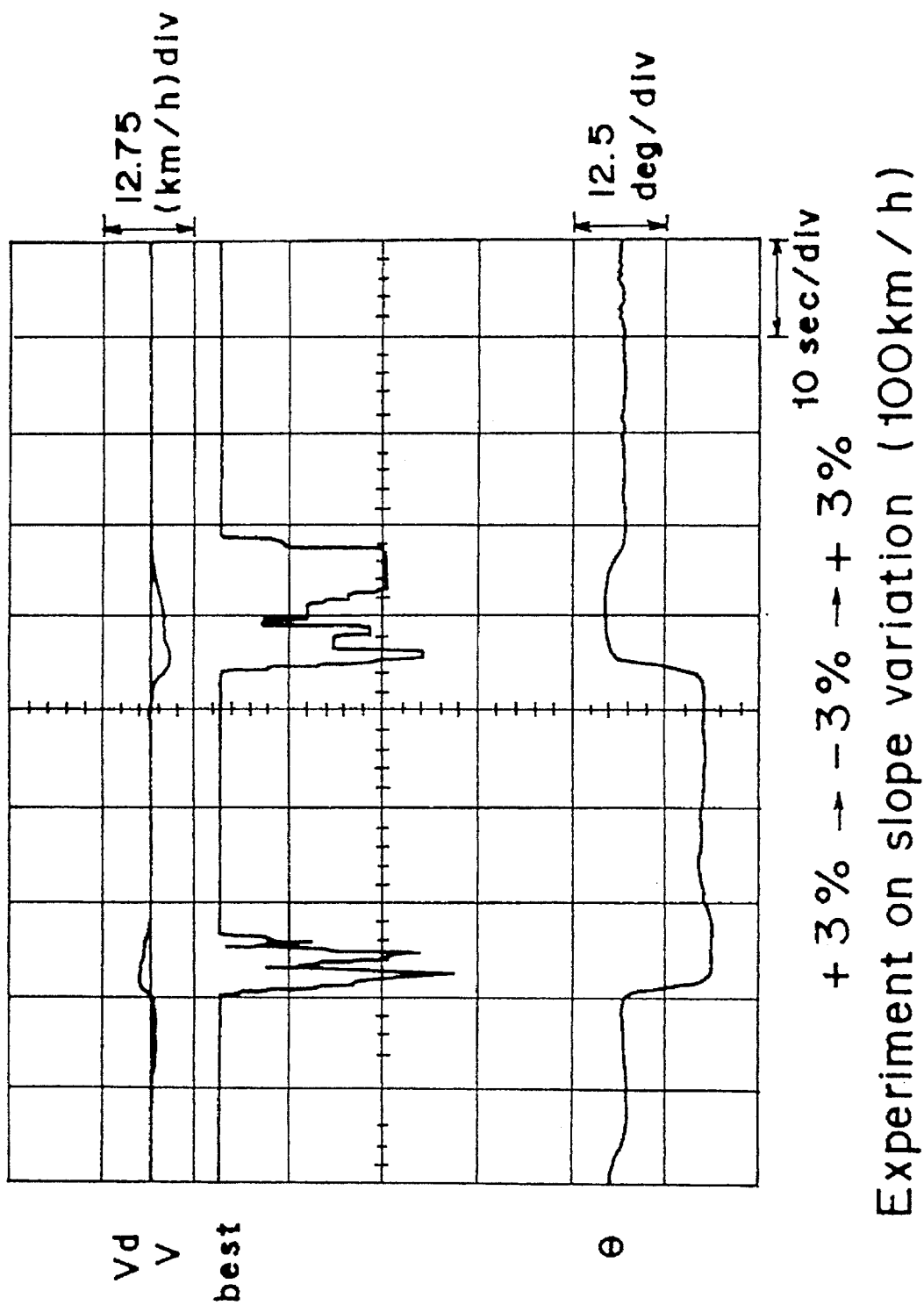

AUTO-DRIVE CONTROL APPARATUS FOR USE IN VEHICLE APPARATUS

This application is a Continuation of application Ser. No. 07/733,208, filed Jul. 19, 1991 and now abandoned.

BACKGROUND OF THE INVENTION

1. Field of the Invention

The present invention relates to an apparatus for use in a vehicle for controlling the vehicle to travel at a constant speed.

2. Description of the Related Arts

In a conventional constant travel speed control apparatus of a vehicle, the actual speed of a vehicle is detected by a sensor and a target speed is set by a driver. The control apparatus includes a system of one output for one input represented by $V(s)/U(s)=b/(s+a)$ (s is Laplace operator, $V(s)$ is vehicle speed, $U(s)$ is instruction voltage of an actuator, a is unknown characteristic, and b is unknown input distribution characteristic) and a feed-back system based on PID control. Dynamic characteristics include changes in the number of speeds, changes in travel load, namely, changes in road gradient, changes in air resistance, and the weight changes of the vehicle. As a result, the convergence of the actual speed on the target speed is not always constant.

In order to obtain a constant convergence performance of the actual speed on the target speed notwithstanding the dynamic characteristics of the vehicle, it is necessary to adjust a plurality of control gains for calculating an operation amount to be outputted to an actuator for driving a throttle valve according to the change of the number of speeds and the change of travel load. Much labor is required in this adjustment. As disclosed in Japanese Patent Laid-Open Publication No. 1-153344, the operation amount to be outputted to the throttle valve is calculated by (P+1–P+D) control and a travel load is calculated by the difference between a current opening amount of the throttle valve and the opening amount thereof required for a constant travel on a plane ground, and the proportional constant of a forward control system (P+1) and the integration constant thereof are made to be large while the proportional constant of a negative feed-back control system (P+D) and the differential constant thereof are made to be small according to the increase of travel load. Thus, the convergence of the actual speed on the target speed is set at a constant value notwithstanding the difference of the travel load and consequently, a favorable constant speed travel control is achieved.

However, in the conventional apparatus based on the feed-back control by (P+1–P+D) control, the operation required for the object to be controlled is a PTP (point to point) operation for moving the target point (vehicle speed) from a fixed point to a fixed point. That is, an operation guaranteed by the conventional apparatus is only a movement operation from a speed at a certain point in travel to a set target speed and is unsuitable for a CP (continuous path) operation in which the target point moves continuously. That is, the following performance is not guaranteed for a target path speed for converging an actual speed on the target speed and therefore, it is very difficult for the conventional PID control to obtain a constant convergence performance, namely, to converge the actual speed at a constant rate, namely, to converge the actual speed on the target speed along the same target path. Further, in controlling the speed of vehicles of many kinds, a same path cannot be followed by all vehicles due to the difference of engine power. Thus, the conventional apparatus is incapable of generating an appropriate path by the same software.

In addition, the above construction has the following problems. That is, in a vehicle, the input distribution characteristic b of the object to be controlled changes two to three times due to the fluctuation of a travel load. But a control input which operates stably and the actual speed follows the target path favorably by appropriately switching each constant of PID, namely, control gain. However, with the same software, the control gain developed for only one kind of vehicle is incapable of allowing a control output to follow the target path in other kinds of vehicles. It is difficult for the conventional PID control to vary the control gain for other kinds of vehicles and to constitute a robust control system.

SUMMARY OF THE INVENTION

It is therefore an object of the present invention to provide a constant speed travel control apparatus for use in a vehicle in which the actual speed of the vehicle converges on the target speed thereof with a constant convergence performance along a given path in spite of the fluctuation of vehicle dynamic characteristics which occurs due to, for example, the change of a gear condition or the change of a travel load. In order to accomplish the above object, the present invention introduces a concept that a fluctuation during a slight time is constant is introduced. That is, using time delay control which is a kind of adaptive control for estimating an unknown term, a plurality of targeted paths, having a certain waveform, for the actual speed of the vehicle to converge on the target speed are provided and an error vector is defined on the basis of the paths.

It is another object of the present invention to provide a constant speed travel control apparatus for use in a vehicle in which a constant speed travel control is made in conformity with a driver's desire due to the provision of a plurality of target paths.

It is still another object of the present invention to provide a constant speed travel control apparatus for use in a vehicle in which the setting time of a target path along which the actual speed converges on the target speed can be switched according to the degree of the deviation between the actual speed in a resuming operation and the target speed.

It is a further object of the present invention to provide a constant speed travel control apparatus for use in a vehicle in which a target path appropriate for a vehicle can always be obtained by constructing a rule for correcting the target path in conformity with the limited capability of each vehicle according to the deviation between the actual speed of the vehicle and the target path thereof or the differentiated value of the deviation and the average speed of the operation of an actuator and the position thereof.

It is a still further object of the present invention to provide a constant speed travel control apparatus for use in a vehicle in which the output of an object of a system of one output for one input favorably follows the target path by updating the upper limit of the initial value bset0 of a control input characteristic best, namely, the initial value best0 thereof at the time of the initial setting or a resuming operation so as to limit the fluctuation range of the control input characteristic best to a small range. That is, the actual input distribution characteristic b of the object is unknown. Therefore, there is a case in which the control input characteristic best which is the control gain in a controller is inappropriate. Based on the qualitative relationship between input and output, a rule for altering the control input characteristic best necessary for performing a control amount according to the deviation or the differentiated value thereof and the average speed of the actuator and the position thereof is constructed.

In accomplishing these and other objects, there is provided an apparatus for controlling a vehicle to travel at a constant speed which includes: a speed detecting circuit for detecting the actual speed of the vehicle; a target value setting circuit for setting a target speed depending on a driver's desire; target path setting means for providing a target path speed in time function in a resuming operation; and a control amount operating means for operating a control amount to be outputted to an actuator for driving a throttle valve so as to converge the actual speed on the target speed, according to time delay control rule of a locus following type which makes zero an error between the vehicle speed detected by the speed detecting circuit and the target path speed.

According to another embodiment, the apparatus comprises a target path selecting means for allowing a driver to select a desired response in addition to the above-described target path setting means provided with a plurality of normalized target paths on which the vehicle speed converges; and a return speed deviation detecting means for detecting the deviation between the target speed and the actual speed.

According to another preferred embodiment, the apparatus comprises a target path amending means for amending an already found target path speed using at least one path amending rule in which an input variable is the deviation between the target path speed and the actual speed or at least one differentiated value of the deviation and the average speed of the actuator and the position thereof and an output variable is an amended target path speed; and a control input coefficient determining means, for finding a control input characteristic best using at least one coefficient determining rule, in which an input variable is the deviation between the target path speed and the actual speed or at least one differentiated values of the deviation and the average speed of the actuator and the position thereof, and an output variable is the control input characteristic best which is an operation coefficient of the control amount operation means.

According to still another preferred embodiment, the apparatus comprises a coefficient range amending means for determining the initial control input characteristic best0, which is the maximum value of the control input, at the initial setting or resuming operation and the minimum value best1 of the control input characteristic characteristic according to the condition of the change of the control input characteristic best; and initial control input calculating means for calculating an initial control input amount U(0) at the time of setting and resuming operation using the control input characteristic best.

According to still a further preferred embodiment, the apparatus comprises a convergence acceleration altering means for finding a return acceleration $\alpha$ at a resuming operation and altering an acceleration which provides the target path speed when the actual speed converges on the target speed at the resuming operation, with one target path speed provided by the target path amending means in time function at a return acceleration $\alpha$ indicating a convergence slope at a resuming operation, using at least one acceleration amending rule in which an input variable is the deviation between the target path speed and the actual speed or at least one differentiated values of the deviation, the average speed of the actuator, and the position thereof and an output variable is the value of the return acceleration $\alpha$ indicating the target path speed.

According to a preferred embodiment, the apparatus comprises an initial target path altering means for altering a target path speed exceeding a predetermined value to the actual speed by measuring the deviation between the actual speed and the target speed at the start of a resuming operation.

According to the above construction, a plurality of normalized paths, for example, speedy, normal, and slow paths having a desired response waveform at a return time are set so that a driver selects a desired response waveform, namely, a target path. The operation amount for adjusting the opening amount of a throttle valve is calculated by time delay control of a path following type in which the difference between the target path speed and the actual speed is an error vector. Thus, an actuator can be controlled so that the convergence of the actual speed on the target speed always coincides with the path of a desired response waveform without being affected by the change of the position of speed change gears and the fluctuation of a travel load. Therefore, a vehicle can be controlled so that it travels at a constant speed with the actual speed stably converging on the target speed. Further, a plurality of normalized target paths having a different convergence period of time are set. Thus, a desired target path is selected from the plurality of normalized target paths according to the deviation between the target path and the actual speed. Therefore, a smooth response waveform can be obtained is respective of different deviations. Further, the initial control input characteristic best0 is set to the maximum value $b_{MAX}$ of the input distribution characteristic b of all kinds of vehicles equipped with the apparatus and the target path amending means amends a target path speed already found to a new one using the deviation between the target path speed and the actual speed or at least one differentiated value of the deviation and the average speed of the actuator and the position thereof. A smooth response waveform can be obtained according to the capability of each vehicle for a resuming operation during travel by using the amended target path speed. If the control input characteristic best is substantially different from the input distribution characteristic b equipped with the apparatus, the control input coefficient determining means amends the control input characteristic best by using the deviation or at least one differentiated value of the deviation value, the average speed of the actuator, and the position thereof. The control amount operation means calculates a control input by using a found control input characteristic and the convergence performance of the actual speed on the target speed can be made at a constant value without being affected by the change of the dynamic characteristic due to, for example, the fluctuation of a travel load, with the actual speed following the target speed stably and preferably. In addition, observing the condition of the change of the updated control input characteristic, the coefficient range amending means updates the initial control characteristic best0 which is the maximum value of the control input characteristic and the minimum control input characteristic best1 so as to update the allowable fluctuation range of the control input characteristic. Thus, the initial control characteristic best0 at the initial setting or in a resuming operation approaches the input distribution characteristic b of a vehicle according to a travel condition irrespective of the kind of vehicle. The initial control input calculating means finds the initial control input amount U(0) by using best0. As a result, speed reduction can be largely prevented. Thus, the actual speed follows the target speed stably and preferably. Further, the return acceleration $\alpha$ providing the target path in convergence in a resuming operation can be altered so that the differentiated value of the target path speed Vd(t) is reduced to a great extent and the convergence acceleration altering means allows the target path speed to smoothly converge on the target speed. Therefore, an overshoot or an undershoot can be prevented to a great extent during a convergence. If the deviation between the target path speed and the actual speed exceeds a certain value due to a speed reduction at a resuming operation, the initial target path altering means reduces the target path speed to the actual speed. Therefore, a stable constant speed travel can be accomplished.

As apparent from the foregoing description, a plurality of waveform paths are provided and time delay control of a path following type is provided. Thus, a driver can obtain can select a desired response and enjoy a comfortable constant speed travel by changing the convergence period of time according to the deviation between the actual speed and the target speed.

The target path amending means provides a stable and smooth response without setting a target path according to a vehicle in advance. If many kinds of vehicles are provided with the apparatus, there is a case in which an unknown input distribution characteristic b is largely different from the control input characteristic best. At this time, the control input coefficient determining means alters best. Thus, the actual speed follows the target path speed favorably.

The coefficient range amending means updates the initial control input characteristic best0, and the initial control input calculating means finds an initial gain according to the kind of vehicle and calculates the initial control input amount at the initial setting or in a resuming operation. Thus, an overshoot can be substantially prevented from occurring even though a speed is reduced at the initial setting or in a resuming operation. The target path setting means provides a path by a return acceleration α, so that the convergence period of time can be changed according to the deviation between the actual speed and the target speed, and the return acceleration α can be switched to a return acceleration conforming to a vehicle capability and a road situation. As a result, a stable and smooth response can be obtained in the resuming operation. In addition, the convergence acceleration altering means reduces the acceleration α at a certain rate. Thus, the change rate of convergence of the target path speed on the target speed is small and thus, discontinuity does not occur because no sudden change of the target path takes place, with the occurrence of an overshoot or undershoot being prevented. Hence, a stable constant speed travel can be accomplished. Furthermore, if the deviation is more than a certain value, the initial target path altering means alters the actual speed to a different one. Therefore, time is not wasted due to the loosening of a throttle wire. Hence, a favorable constant speed travel can be performed with a preferable response to the resuming operation.

BRIEF DESCRIPTION OF THE DRAWINGS

These and other objects and features of the present invention will become apparent from the following description taken in conjunction with the preferred embodiments thereof with reference to the accompanying drawings, in which:

FIG. 20(a) to FIG. 20(f) are graphs showing experimental results of a vehicle under the time delay control;

FIG. 21 and FIG. 22 are graphs showing test results of vehicles to examine the target path altering means;

FIG. 23 and FIG. 24 are graphs showing experimental result data of a vehicle by using the control input coefficient determining means; and FIG. 25(a) to FIG. 25(d) and FIG. 26(a) to FIG. 26(d) show experimental results of a chassis travel of vehicles.

DETAILED DESCRIPTION OF THE INVENTION

Figure 1:
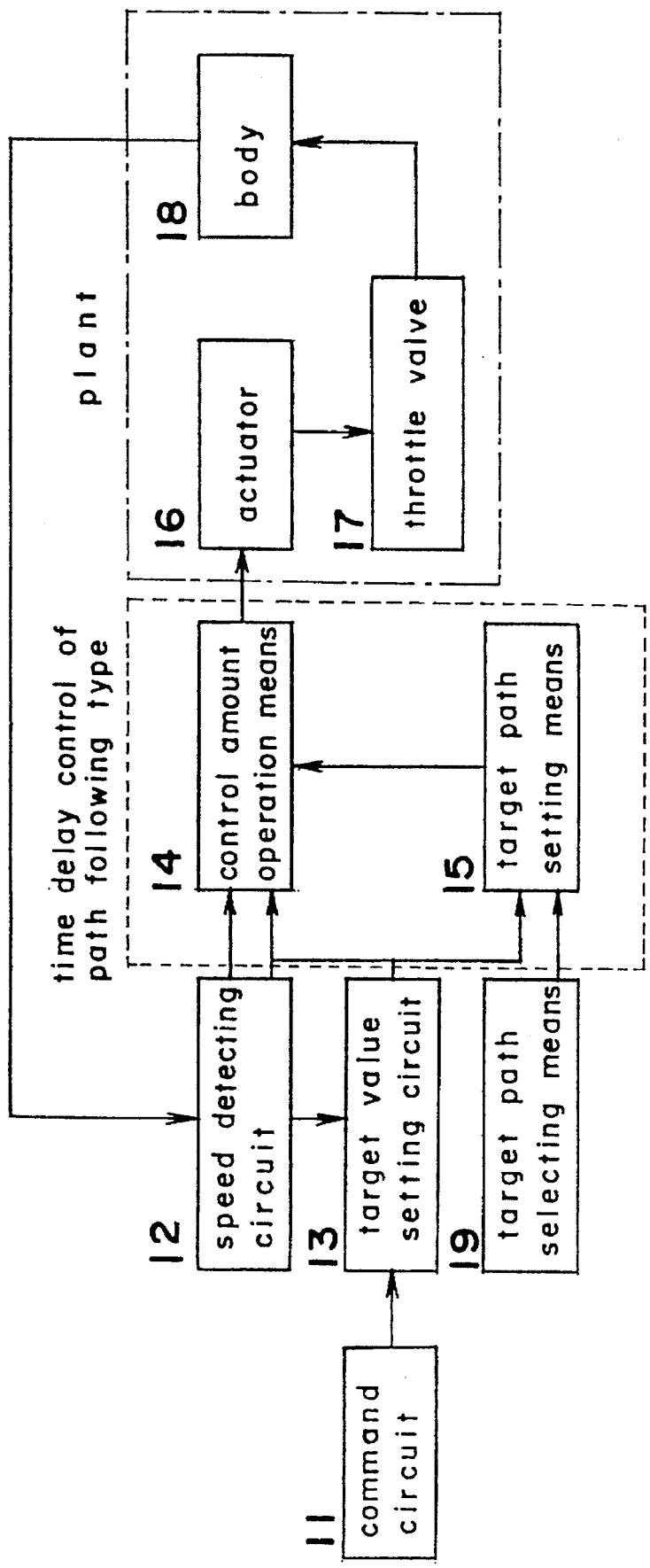
FIG. 1 is a construction view showing the concept of a first embodiment of the present invention.

Before the description of the present invention proceeds, it is to be noted that like parts are designated by like reference numerals throughout the accompanying drawings.

Referring to the accompanying drawings, the embodiments of the present invention are described below.

First, the system construction and the construction of the control system of a constant speed travel control control apparatus for use in a vehicle are described below. FIG. 1 is a construction view showing a first embodiment of the present invention conceptually. A command circuit 11 outputs a constant travel speed control command signal, a resumption signal for returning the current speed to the previous constant travel speed after a constant speed travel command is cancelled, and an increase/decrease signal for increasing or decreasing the speed during the constant speed travel. In response to the constant travel speed command signal from the command circuit 11 to a speed detecting circuit 12, the speed detecting circuit 12 detects an actual speed. In response to the constant travel speed control start signal from the speed detecting circuit 12, a target value setting circuit 13 sets a target speed. A target path setting means 15 outputs a signal indicating several paths having a desired response waveform in a resuming operation. A target path selecting means 19 is provided for a driver to select a path from among several paths provided by the target path setting means 15. Based on the target path speed, the actual speed, and the target speed, a control amount operation means 14 performs an operation of a control input to a plant, namely, a control input to an actuator 16 so that the actual speed converges on the target speed in a desired response waveform, namely, an error between the actual speed and the target path speed is zero. That is, the control amount operation means 14 and the target path setting means 15 are time delay controls of a path following type. An object to be controlled, namely, the plant comprises the actuator 16, a throttle valve 17, and a body 18. According to the above operation, the opening amount of the throttle vale 17 is adjusted by the actuator 16. As a result, the speed converges on the target speed in a desired response waveform. That is, the constant speed travel can be made at the target speed in a stable condition.

Figure 2:
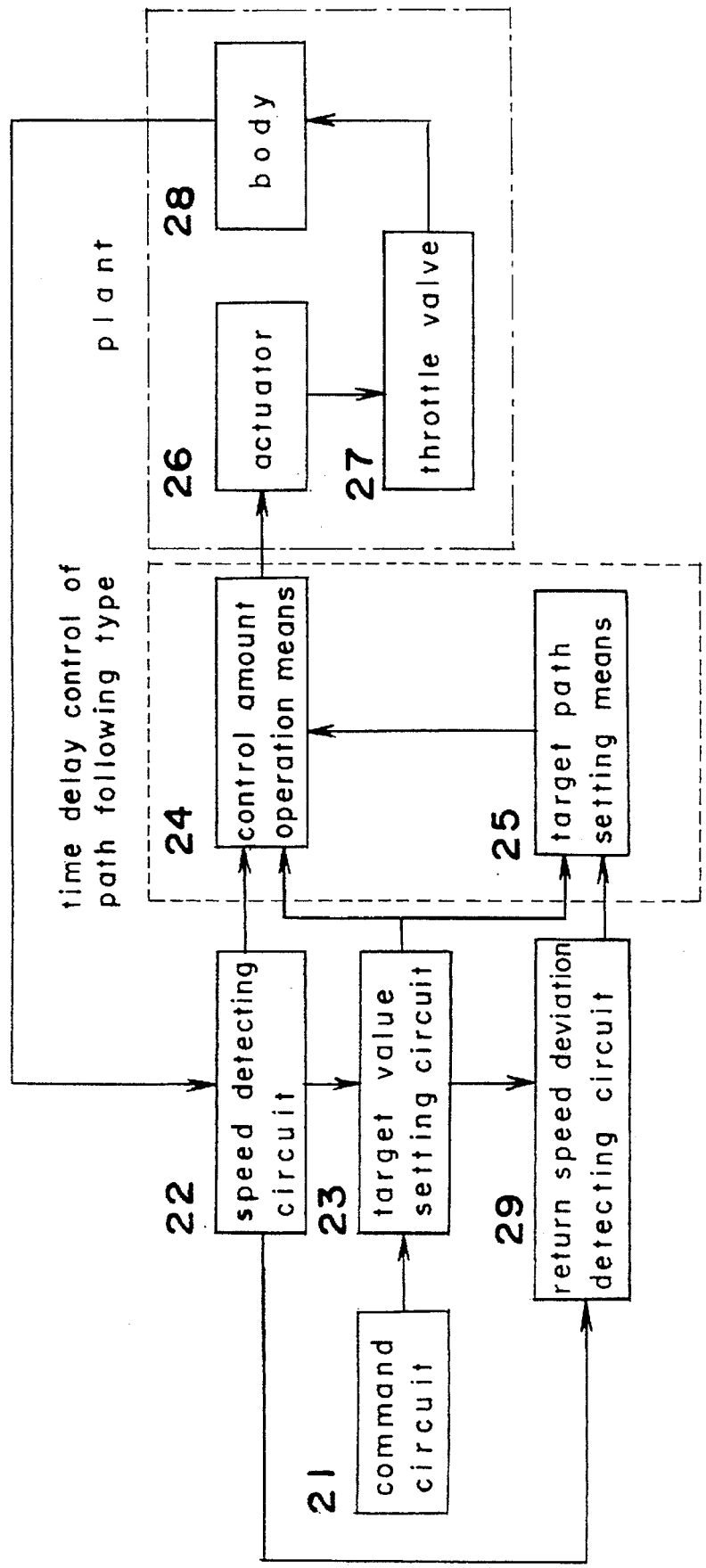
FIG. 2 is a construction view showing the concept of a second embodiment of the present invention.

FIG. 2 is a construction view showing a second embodiment of the present invention conceptually. When the vehicle speed is to return to a target speed set by a target value setting circuit 23 by a resuming operation of a command circuit 21 with the constant travel speed cancelled, an actual speed at which the vehicle has started is detected by a speed detecting circuit 22. A return speed deviation detecting means 29 detects the deviation between the target speed and the actual speed. A target path setting means 25 selects a target path corresponding to the value detected by the return speed deviation detecting means 29 from a plurality of target paths which differ from each other in convergence period of time, thus outputting a signal indicating the target path to a control amount operation means 24. Based on the target path speed found according to the value of the initial deviation, the actual speed, and the target speed, the control amount operation means 24 calculates a control amount so that the actual speed converges on the target speed in a desired response waveform, namely, so that the actual speed converges along the target path, thus outputting a signal indicating the control amount to the plant comprising an actuator 26, a throttle vale 27, and a body 28.

Figure 3:
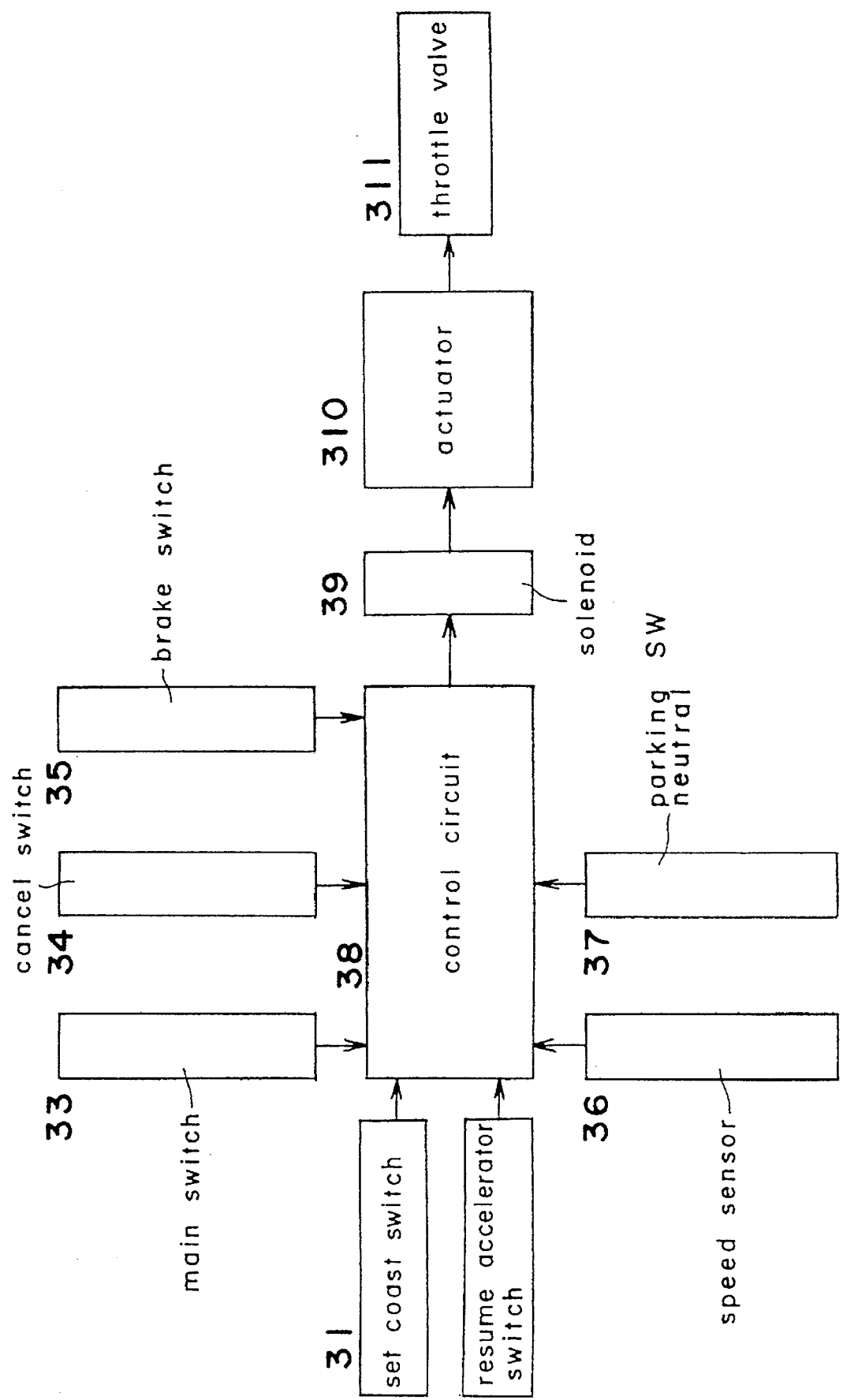
FIG. 3 is an entire construction view showing an embodiment of the present invention.

FIG. 3 shows the system construction of an embodiment of the present invention. The system comprises a control circuit 38 comprising a CPU, a ROM, a RAM, and an I/O; a main switch 33 for supplying electric current to the power source of an actuator and the control circuit 38; a switch 31 for use as a set/switch for setting a target speed or as a coast switch for setting a lower target speed; a resumption switch/acceleration switch 32 for returning the vehicle speed to the target speed and setting a higher target speed; a brake switch 35 which is turned on when the brake pedal is stepped down; a cancellation switch 34 for cancelling the setting and resuming functions; a speed sensor 36 for detecting an actual speed; an N/P switch 37 for detecting that the number of speeds is at the neutral position or the parking position; and a solenoid 39 for supplying electric current to an actuator 310 or cutting it off the actuator 310 when constant speed travel starts or terminates. When a constant travel speed control starts by turn-on of the set switch 31 or the resumption switch 32, the solenoid 39 is turned on according to the instruction of the control circuit 38 and the difference between the actual speed detected by the speed sensor 36 and a target speed set is calculated. A target path speed is found based on the difference thus calculated and information, for example, normalized target path data for generating a target path contained in the ROM. The control amount is calculated so that the error between the target path speed and the actual speed is zero. Then, the control amount is outputted to the actuator 310. As a result, the actuator 310 opens or closes a throttle valve 311 and adjusts a fuel amount to be supplied to the engine. Thus, the constant speed travel control is accomplished.

Figure 4:
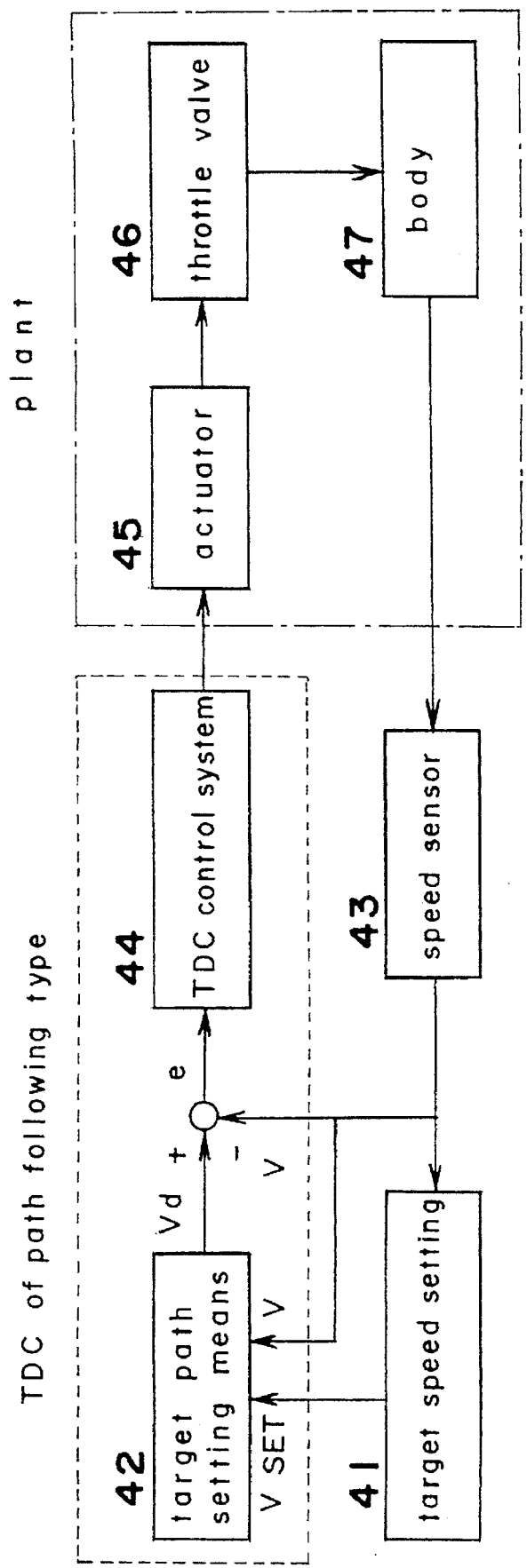
FIG. 4 is a control block diagram.

FIG. 4 is the control block diagram of the above-described embodiment. The concept of time delay control (TDC) of path following type which is a kind of adaptive control is described below with reference to FIG. 4. Upon receipt of an input U of a target opening amount, an actuator 45 controls a speed V by adjusting the opening amount of a throttle valve 46. The speed V is read by a speed sensor 43. The actual speed set by the target value setting circuit is stored in a target speed setting means 41 as a target speed Vset. When the resumption switch 32 is turned on, a target path setting means 42 provides a target path speed Vd in the form of a time function according to the difference between the actual speed V and the target speed Vset. The target path speed Vd is provided in time series of a desired response waveform in a convergence. The control amount U to be outputted to the actuator 45 is calculated by a TDC control system 44 so that the deviation between the actual speed V and the target path speed Vd is zero. When the actual speed V is set, the target speed Vset is the target path speed Vd.

According to the above operation, the actual speed V follows the target speed Vset in a desired response characteristic, i.e., a speed control which follows the target path speed Vd can be made. That is, a constant speed travel control which makes the convergence performance stable and constant can be achieved. The design of the control system of the time delay control (TDC) of path following type is described below.

First, the transfer function of the plant is found. Supposing that the target opening amount input to the actuator 45 is U(S) and the actual speed is the output V(S) thereof, a transfer function G(S) is expressed by the following equation:

$$G(S)=b/(s+a) \qquad (1)$$

The transfer function of the plant is found by approximation supposing that it is of linear function, but actually, a parameter varies according to a travel condition. Therefore, it is a plant expressed by a non-linear function. The TDC is a controller effective for a system having an unknown dynamic characteristic. The control rule of path following type suitable for a CP operation is found with respect to a plant expressed by a non-linear function below. The control rule of path following type is described in detail in "Proposal of time delay control of path following type and application to its robot manipulator control" written by Osamu Itoh et al. in journal of Precision Engineering 55/12/1989.

Expressing the equation (1) in terms of time region, the following equation is obtained. Differentiation is expressed by d/dt.

$$dV(t)/dt=-aV(t)+bU(t) \qquad (2)$$

where a and b are unknown, and fluctuation range is known as below.

$$0 < a_{min} < a < a_{max} \quad (3)$$

$$0 < b_{min} < b < b_{max} \quad (4)$$

The target path speed of the speed V is Vd and the deviation between the speed V and the target path speed Vd is e which is defined by the following equation.

$$e = Vd - V \quad (5)$$

The following equation governing the dynamic characteristic of an error is obtained from equations (2) and (5):

$$de(t)/dt = dVd(t)/dt + aV(t) - bU(t) \quad (6)$$

If the control input U is determined to satisfy the following equation, $$dVd(t)/dt + aV(t) - bU(t) = -Ae \cdot e(t) \quad (7)$$

the following equation is obtained from equations (6) and (7).

$$de(t)/dt = -Ae \cdot e(t) \quad Ae > 0 \quad (8)$$

Accordingly, the dynamic characteristic of a given error can be defined by Ae.

Finding the control input U from equation (7), the following equation is obtained.

$$U = b^{-1}(dVd/dt + aV + Ae \cdot e) \quad (9)$$

But unknown variables a and b are included in the above equation, so that the control input U cannot be determined as it is. Therefore, the unknown terms are estimated.

From equation (2), aV is as follows:

$$aV = -dV/dt + bU \quad (10)$$

Supposing that L is a slight time lag and aV=h, an assumption is made as follows:

$$h(t) = h(t-L) \quad (11)$$

The unknown term aV, namely, h is estimated by the following equation based on equations (10) and (11).

$$hest(t) = -dV(t-L)/dt + bU(t-L) \quad (12)$$

Substituting the estimated value hest into equation (9), the control rule of time delay control about the constant travel speed control is obtained by the following equation:

$$U(t) = U(t-L) + b^{-1}\{-dV(t-L)/dt + dVd(t)/dt + Ae \cdot e\} \quad (13)$$

Since equation (13) for calculating the control input U includes unknown term b, the control input U(t) to the actuator cannot be determined as it is. Therefore, the estimation value best of b which stabilizes the control system is substituted into equation 14 to obtain the actual control input. That is, the following equation gives the control input.

$$U(t) = U(t-L) + b^{-1}\{-dV(t-L)/dt + dVd(t)/dt + Ae \cdot e\} best > 0 \quad (14)$$

Figure 5:
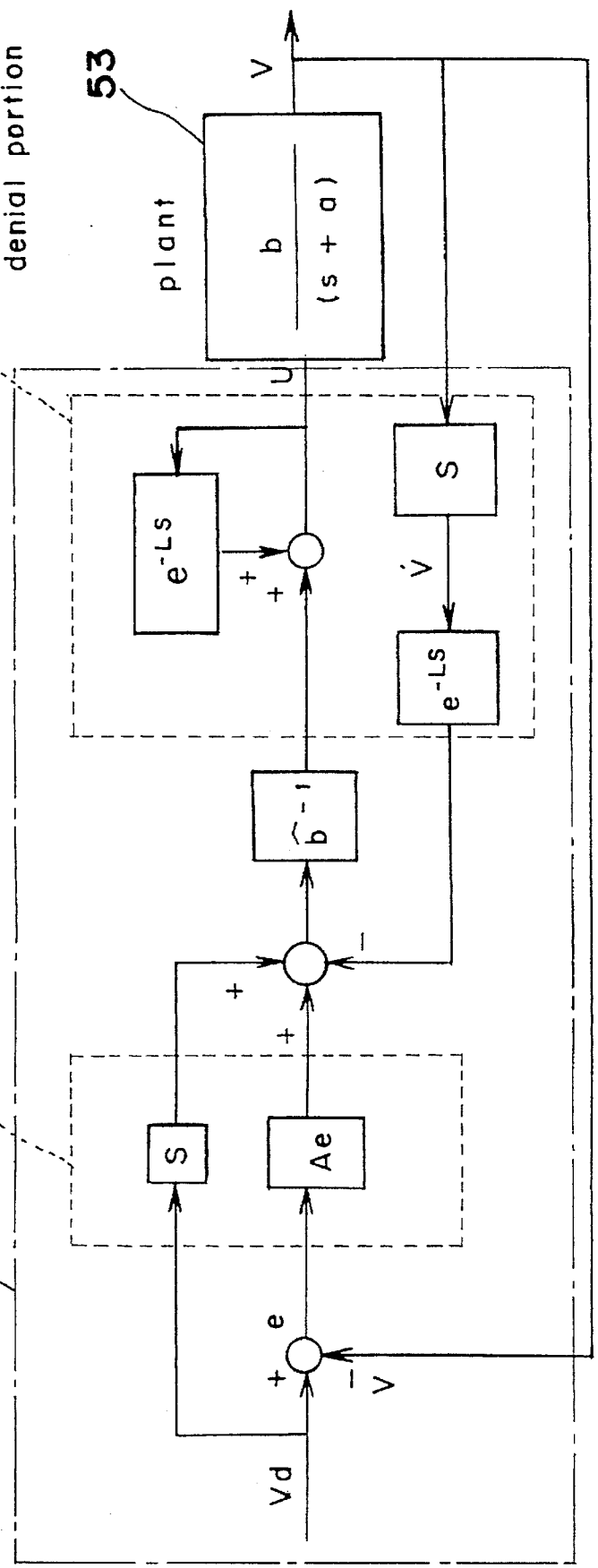
FIG. 5 is a construction view of time delay controller of a path following type.

A block diagram shown in FIG. 5 represents the control rule in detail given by equation 14. When the control input U is given to an object 53 to be controlled, the speed V is outputted. The error convergence performance is guaranteed by a target error property inserting portion 51 based on the target path speed Vd and the deviation e between the target path speed Vd and the speed V, and an unknown property cancelling portion 52 estimates a nonlinear term according to the actual speed V and the control input U. Thus, a time delay controller 54 of path following type is constituted and the deviation e becomes zero, so that the control input U to the object 53 is calculated so that a desired response waveform is obtained.

That is, $-dV(t-L)/dt$ and $U(t-L)$ are terms for cancelling unknown portion of the plant 53, and $dVd(t)/dt + Ae \cdot e$ is an error dynamic property inserting term for a given target path.

The calculation of the estimated value best to stabilize the entire control system is described below. The following equation is obtained by Laplace-transforming equation (14):

$$best(1-e^{-LS})U(S) = \{-(Sc^{-LS}+Ae)V(S)+(S+Ae)Vd(S)\} \quad (15)$$

The following equation is obtained by Laplace-transforming equation (2):

$$U(S) = b^{-1}(S+a)V(S) \quad (16)$$

The following equation is obtained from equations (15) and (16):

$$\{best\, b^{-1}(S+a)(1-e^{-LS})+Se^{-LS}+Ae\}V(S)=(S+Ae)Vd(S) \quad (17)$$

Pade approximation is applied to equation (17). That is, the following equation is substituted into equation (17).

$$e^{-LS} = (2-LS)/(2+LS) \quad (18)$$

$$\frac{V(S)}{Vd(S)} = \frac{(2+LS)(S+Ae)}{2\,best\,b^{-1}(S+a)LS + S(2-LS) + (2+LS)Ae} \quad (19)$$

Accordingly, the condition for stabilizing the above equation is found by Routh's rule for stabilization discrimination. First, supposing that the denominator of equation (19) is F(S), F(S) is as follows from equation (19):

$$F(S)=(2best\,b^{-1}-1)LS^2+\{(2a\,best\,b^{-1}+Ae)L+2\}S+2Ae=A\phi S^2+A_1 S+A_2 \quad (20)$$

Since $A_1$ and $A_2$ are positive according to the parameter range of equations (3), (4), (8), and (14), the following equation is only just large enough for stabilization.

$$A\phi = (2\,best\,b^{-1}-1)L > 0 \quad (21)$$

Accordingly, the condition best is given by the following equation:

$$best > b/2 \quad (22)$$

Accordingly, the real value of best must be more than 1/2. Equation (22) is expressed by the following equation in consideration of the parameter range of equation (4):

$$best > bmax/2 \tag{23}$$

A response which satisfies the error dynamic characteristic can be obtained by using the above estimated value and the control input U obtained from equation (14). The control input is calculated above by approximating the object supposing that the object is of a linear function, but the object may be designed as being expressed in a quadratic function or a higher order function.

The method for calculating the target path speed Vd is described below.

Figure 6:
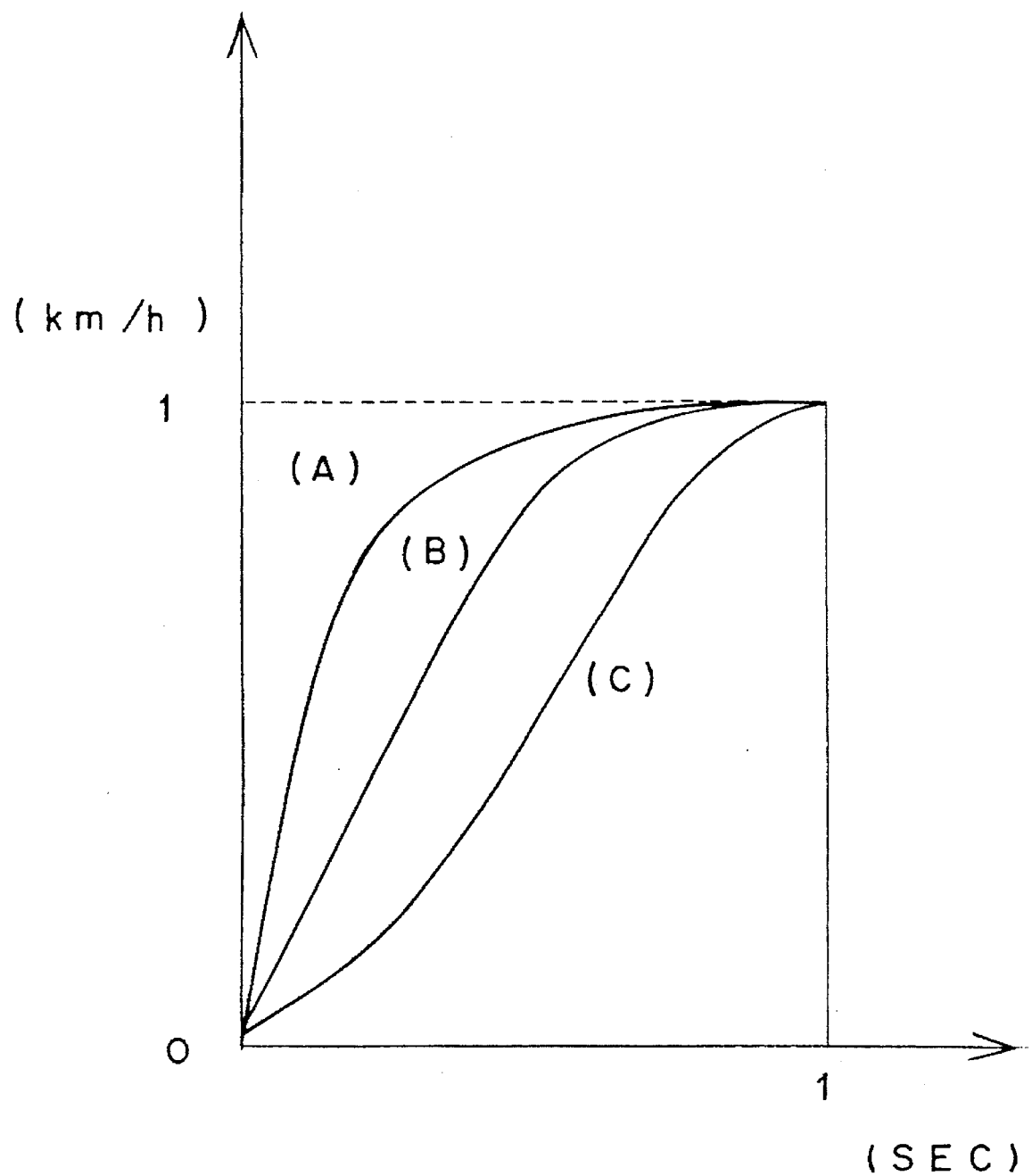
FIG. 6 is a view showing a normalized target path provided by a first embodiment.

FIG. 6 is a graph of a target path in which the speed axis (ordinate) and time axis (abscissa) given by the target path setting means of the first embodiment are normalized. A driver selects one of normalized target path from among speedy path (A), normal path (B), and slow path (C). That is, if a driver wants to carry out a return-travel with an acceleration of a high response, a path speedy (A) is selected through the target path selecting means. If the driver wants to travel slowly, a path slow (C) is selected.

A target path speed which converges on the target path speed is calculated by the product of any one of the normalized target path (A), (B), and (C) and the initial speed deviation which is the absolute value of the deviation between the target speed Vset and the actual speed at the time of ON of the resumption switch.

Figure 7A:
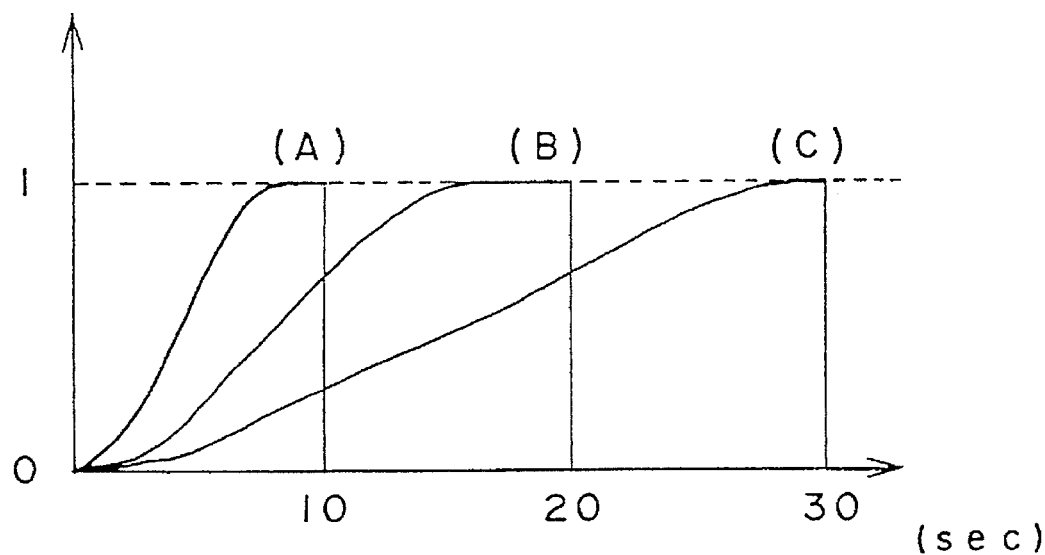
FIGS. 7(a) and 7(b) are views showing a target speed calculating means to be used in a second embodiment.
Figure 7B:
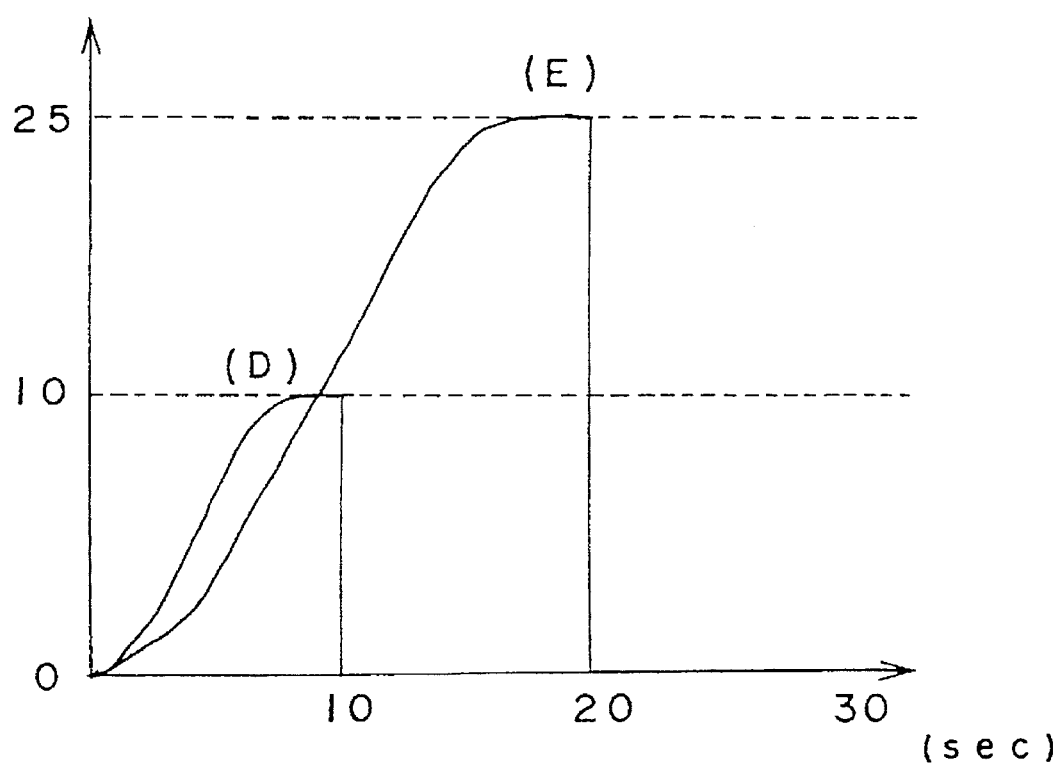

FIG. 7 is a graph showing a target path in which a convergence period of time given by the target path setting means of the above-described second embodiment are different from each other and only speed axes (ordinate) are normalized. For example, if a speed ranges from 50 km/h to 100 km/h, the initial speed deviation ranges from 0 to 50 km/h at the time of turn-on of the resumption switch. The initial speed deviation is divided into three target paths which are different from each other in convergence period of times, namely, A: 0~15 km/h, B: 15~35 km/h, and C: 35~50 km/h. The convergence period of time of each actual speed on each target speed is set to, for example, 10 seconds, 20 seconds, and 30 seconds. FIG. 7(b) shows paths (D) and (E) of target path speeds for speed deviation of 10 km/h and 25 km/h at the time of turn-on of the resumption switch. For example, when the deviation between the target speed and the actual speed, namely, the initial speed deviation FE is 25 km/h upon turn-on of the resumption switch, first, the normalized target path (B) in FIG. 7(a) is selected. The product of the target path (B) and initial speed deviation 25 km/h is the path (E) shown in FIG. 7(b). The actual speed at the time of ON of the resumption switch is added to the path (E) as a bias. Thus, the target path speed is obtained. The target path speed is given for each control cycle.

Figure 8:
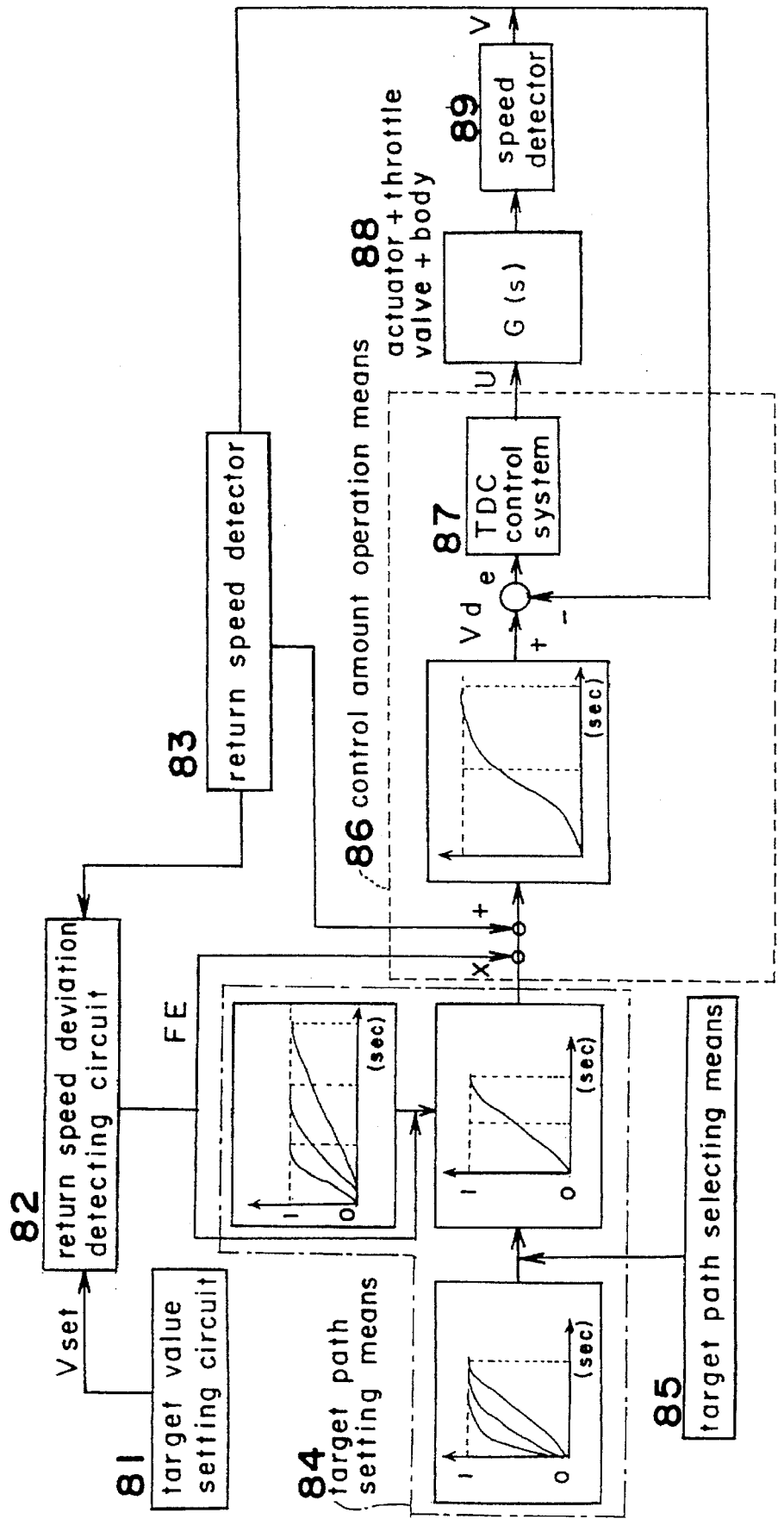
FIG. 8 is a construction view of the control concept of an embodiment according to present invention.

FIG. 8 is a block diagram showing an embodiment of the present invention. The method for calculating the target path speed Vd and the concept of the time delay control of path following type which is an example of adaptable control are described with reference to FIG. 8. First, the method for calculating the target path speed is described below. Through a target path selecting means 85, a desired target path is selected from among normalized paths given by a target path setting means 84. Then, a return speed deviation detecting means 82 calculates an initial speed deviation FE based on the target speed Vset set by a target value setting circuit 81 and an actual speed as a result of ON of the resumption switch obtained by a return speed detector 83. Then, the time axis of the normalized target path selected in advance, namely, convergence period of time is altered by a target path setting means 84 according to the value of the detected initial speed deviation FE. Thereafter, a control amount operation means 86 multiplies the value of the target path by the initial speed deviation FE. Then, the return speed detector 83 adds the value of the actual speed at the time of ON of the resumption switch to the product as the offset. Thus, the target path speed Vd is calculated. A TDC control system 87 makes zero the deviation between the target path speed Vd and the actual speed V detected by a speed detector 89 so as to calculate the operation amount U for converging the actual speed V on the target speed in a desired response waveform as the target path speed Vd. An object to be controlled is a plant 88 comprising an actuator, a throttle valve, and a body. FIGS. 20(a) through 20(f) show an experimental result of the chassis travel of a turbo engine-equipped vehicle of 2000 cc (205/6400 (PS/rpm)) under the control of time delay control of path following type. The control input is given by the following discrete equation:

$$U(k)=U(k-1)+best^{-1}\{-(V(k)-V(k-1))/L+(Vd(k)-Vd(k-1))/L+Ae \cdot e(k)\} \tag{24}$$

$$Vd(k)=(1-\cos(\pi*k/TAU))*(Vset-V0)/2 \tag{25}$$

where best=0.11808, Ae=0.11574, control cycle L=720 msec, Vset is target speed, and V0 is actual speed at ON of resumption switch. Locuses in which when TAU is 20, setting time is 20 seconds and when TAU is 30, setting time is 30 seconds are obtained. FIGS. 20(a) through 20(f) show resuming operations in which speed ranges from 50 km/h to 80 km/h. FIGS. 20(a) through (c) show experimental results of the resuming operation at a gradient of +3%, 0%, and −3% when the setting time is 30 seconds. FIGS. 20(d) through (f) show experimental results of the resuming operation at +3%, 0%, and −3% when the setting time is 20 seconds. A desired response waveform can be obtained by thus selecting a target path. The control system is very robust for the change of gradient.

Next, the method for automatically amending a target path and the rule for automatically altering control gain are described below.

Figure 9:
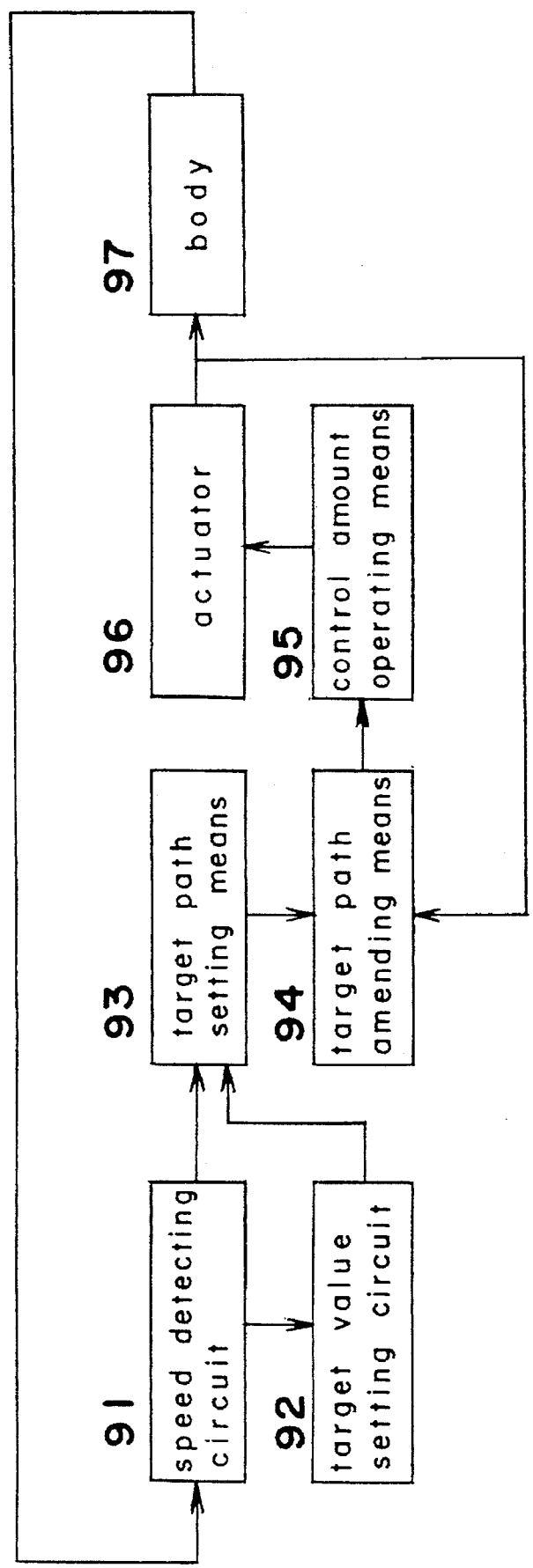
FIG. 9 is a construction view showing the concept of a third embodiment of the present invention.

FIG. 9 is a construction view conceptually showing a third embodiment of the present invention. A speed detecting circuit 91 reads the actual speed of a body 97. A target value setting circuit 92 sets, the actual speed initially set, as the target speed. A target path setting means 93 calculates a target path speed providing a reference path which converges the actual speed on the target speed in a desired response waveform. Based on the deviation between the actual speed and the target path speed, a control amount operation means 95 calculates a control amount to be outputted to an actuator 96 so that the deviation becomes zero. Based on the output value of the actuator 96 and the deviation, the target path speed provided by the target path setting means 93 is amended to a target path speed suitable for various kinds of vehicles and travel conditions by a target path amending means 94. Using the amended target path speed, the control amount operation means 95 keeps controlling the constant travel speed control.

Figure 10:
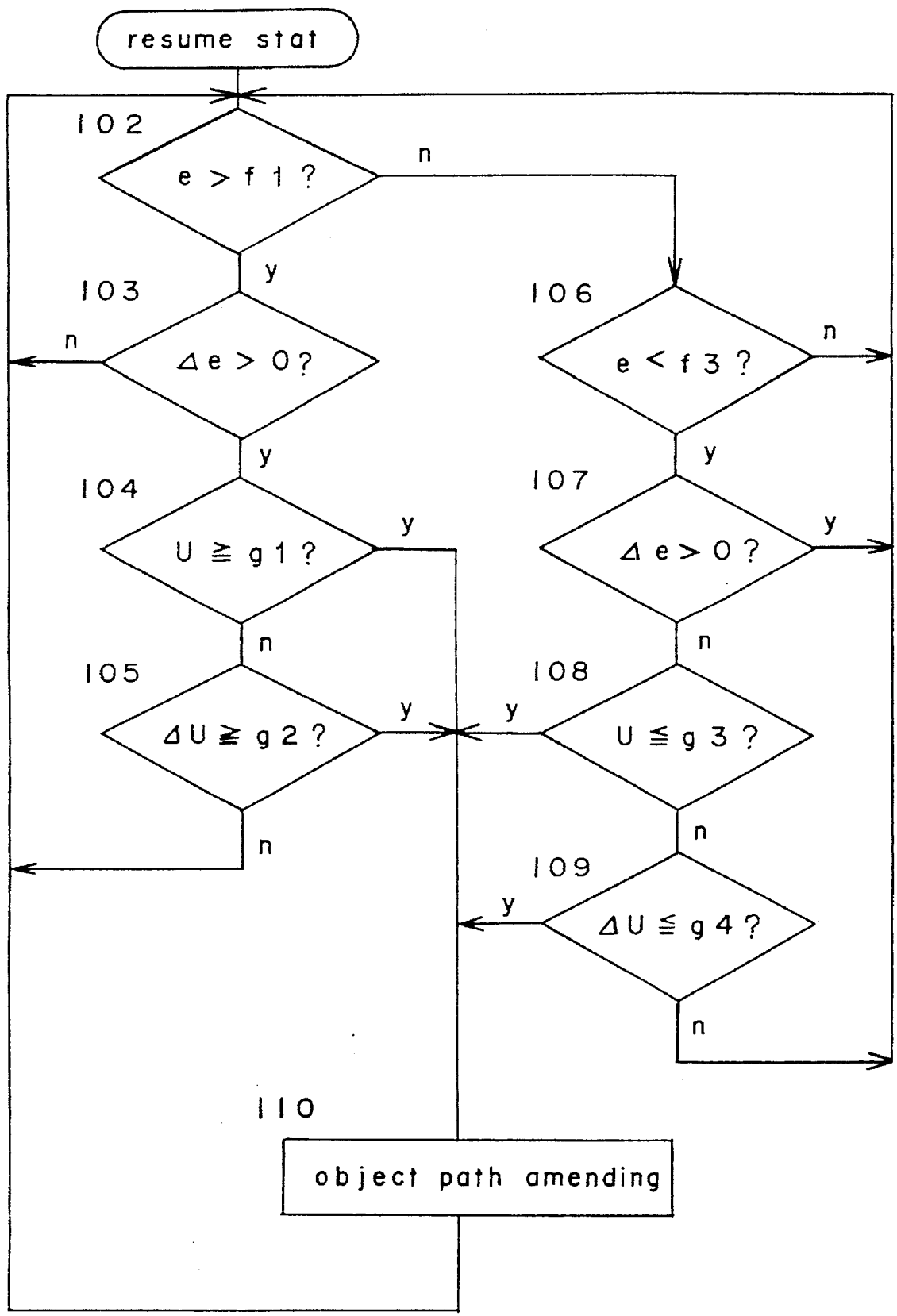
FIG. 10 is a flowchart showing the fundamental procedure of a target path amending means to be used in the third embodiment.

The concept of amending the target path speed Vd(t) is described below. The target path setting means 93 calculates the target path speed Vd(t) in time function. For example, the target path speed Vd(t) has a map for giving a normalized target path, and the map is multiplied by the difference between the target speed at the time of ON of the resumption switch and the actual speed. Thus, the target path speed for each control cycle is provided in time series. The target path speed may be calculated by providing an acceleration in convergence. All vehicles are not capable of following the target path speed Vd(t) depending on the kind of a vehicle or travel conditions such as the gradient of a road. Therefore, in view of this fact, it is necessary to amend the above-described target path speed to a target path speed. FIG. 10 is a flowchart for amending the above-described target path speed to a target path speed. An object expressed in a linear function system of one output for one input under time delay control is considered.

$$G(s)=V(s)/U(s)=b/(s+a) \quad (26)$$

where s is Laplace operator, V is an speed, U is input, a is unknown characteristic, b is an unknown input distribution characteristic.

Referring to FIG. 10, e(t) is the deviation between the target path speed Vd(t) and the actual speed V(t), namely, e(t)=Vd(t)−V(t), and de(t)/dt(=Δe(t)) is a differentiated value of the deviation. U(t) is a control input satisfying target deviation characteristic de(t)/dt=−k·e(t) (k is deviation feedback coefficient) and calculated as follows:

$$U(t)=U(t-L)+\{-dV(t-L)/dt+dV_d(t)/dt+k\cdot e(t)\}/best \quad (27)$$

where L is delay of given slight time, U(t−L) is input applied to object to be controlled time L earlier, dV(t−L)/dt is the differentiated value of actual speed of the object detected a time L earlier, best is the control input characteristic, and ΔU is the differentiated value of U(t) (ΔU=dU(t)/dt)

The operation of the flowchart shown in FIG. 10 is described below. After a resuming operation is started at step 101, a deviation e is compared with a set value f1 at step 102. If e>f1, it is decided at step 103 whether or not the differentiated value Δe is positive. If Δe is positive, it is decided at step 104 whether or not the control input U is greater than g1. The saturation value of the control input is used as the value of g1. If e>f1 at step 102, Δe>0, and U≧g1, the target path is amended. If U is smaller than g1 at step 104, it is decided at step 105 whether the variation of the control input U is greater than g2. The value of g2 is, for example, the maximum speed in the actuator opening direction. If e>f1, Δe>0, and ΔU≧g2, the target path is amended at step 110. If it is decided at step 102 that the deviation e is smaller than f1, the program goes to step 106 at which it is decided whether e is smaller than f3. If e<f3, it is decided at step 107 whether or not the differentiated value Δe is positive. If Δe<0, it is decided at step 108 whether the control input U is greater than g3. The minimum value of the control input is used as the value of g3. If e<f3, Δe<0, and U≦g3, the program goes to step 110 at which the target path is amended. If U>g3, it is decided at step 109 whether or not the variation ΔU is smaller than g4. The value of g4 is, for example, the maximum speed in the actuator closing direction. If e<f3, Δe<0, and ΔU≦g4, the target path is amended at step 110. As described above, the target path is amended as follows:

(1) e>f1, Δe>0, and U≧g1, then the target path is amended.
(2) e>f1, Δe>0, and ΔU≧g2, then the target path is amended.
(3) e<f3, Δe<0, and ΔU≦g3, then the target path is amended.
(4) e<f3, Δe<0, and ΔU≦g4, then the target path is amended.
(5) in the case except of the above items (1) to (4), the target path is not amended.

Figure 11:
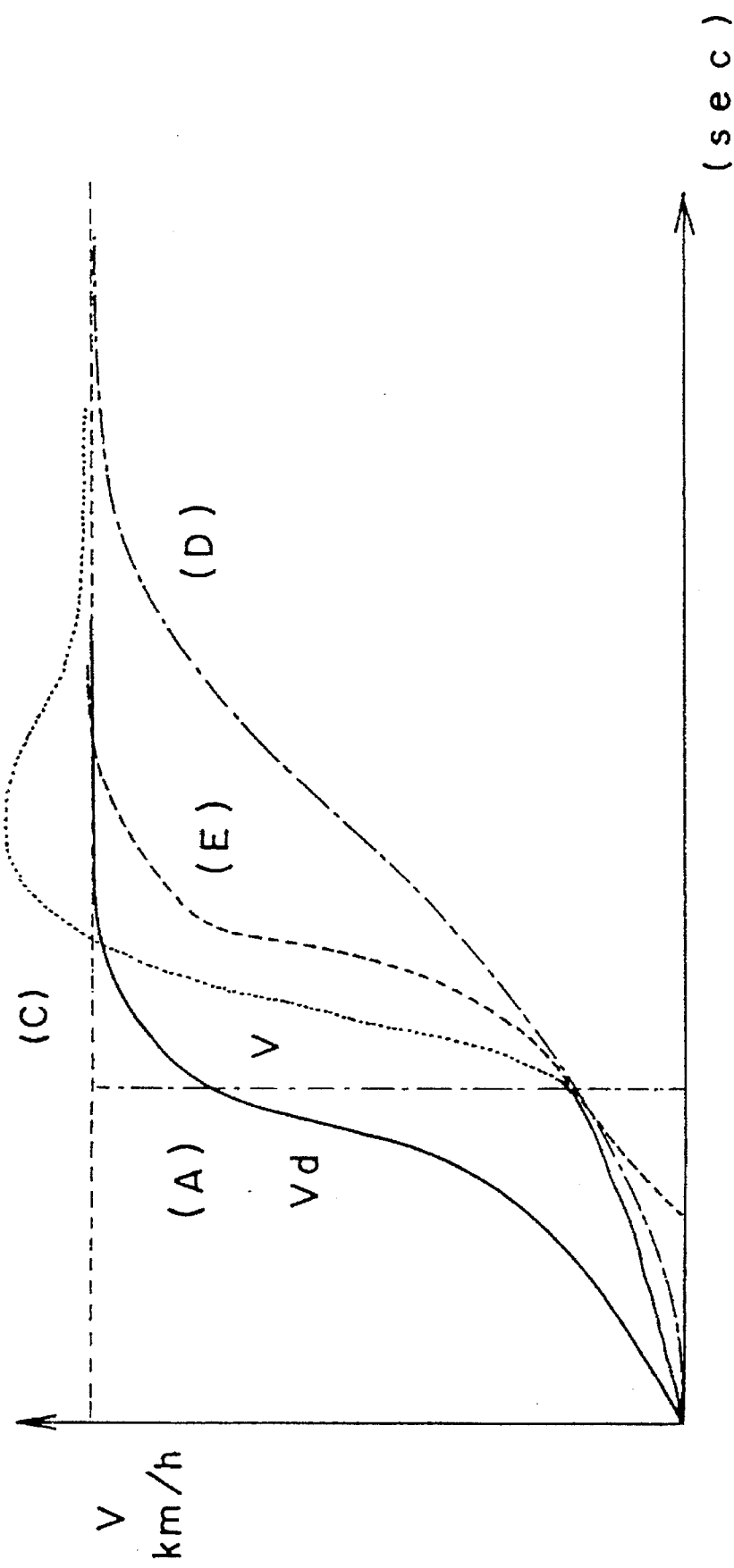
FIG. 11 is a descriptive view showing the method for amending a target path to be used in the third embodiment.

The above decision may be made by comparison of the deviation e. In addition, it is possible to use a higher order differentiated value of the deviation if an object is of a higher order function under time delay control. The differentiated value of the deviation e is compared with zero above, but a dead zone of, for example, f3<e<f1 may be provided. A method for amending the target path performed at step 110 is described below with reference to FIG. 11. In FIG. 11, reference symbol (A) denotes a target path speed Vd given by the target path setting means 93 and (C) denotes the actual speed V upon turn-on of the resumption switch. If the target path speed Vd is used as it is, an overshoot occurs as shown by the dotted line (C) and the setting time may become long. Therefore, the target path speed (A) is dislocated so that it coincides with the speed at the time when the condition for amending the target path is satisfied as shown by the graph (B). By selecting the graph (B) as a new target path speed, a smooth acceleration without an overshoot can be obtained. The following method for amending the target path speed may also be carried out. That is, the path (A) is stretched in the time axis direction as shown by the one-dot chain line (D) so that the path (A) coincides with a speed V at the time when the condition for amending the target path is satisfied. As another method for amending the target path speed, the path is expressed in a trigonometric function and the cycle is elongated. Further, the input/output variable of the above-described rule (1) through (5) is expressed by a fuzzy variable, and the target path is expressed by a trigonometric function with a cycle for the output variable of being the cycle found by direct method and indirect method.

An embodiment of an appropriate method for providing a target path in cruise control is described below.

In the target path setting means, a target path speed which provides a reference path converging an actual speed on a target speed at a desired return acceleration α is calculated upon turn-on of the constant speed travel resumption switch.

The target path speed Vd(t) is obtained by providing the inclination of the target path in convergence, namely, a return acceleration α in advance and adding the increased amount of the return acceleration α to a speed at the time of turn-on of the resumption switch for each cycle. Some kinds of vehicles are incapable of following the target path speed Vd(t) even when it is fully opened. Therefore, it is necessary to amend the target path speed to a target path speed which can be followed by those vehicles.

Figure 12:
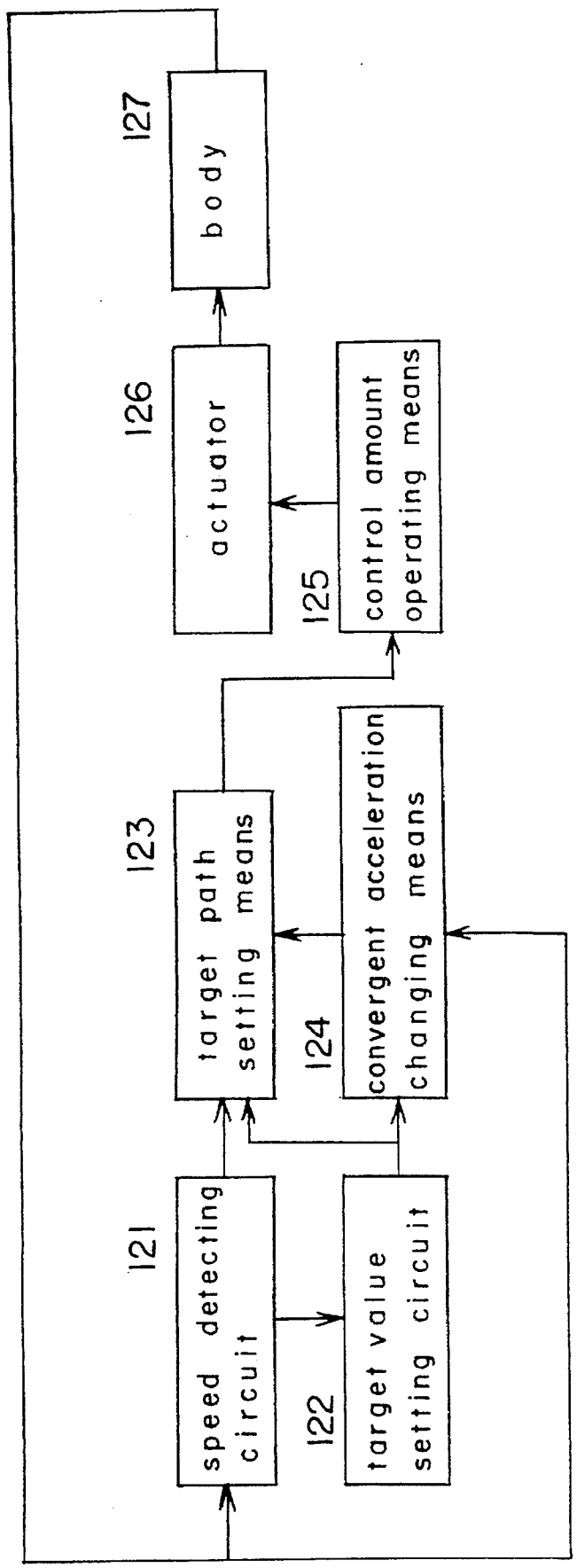
FIG. 12 is a construction view showing the concept of a fourth embodiment of the present invention.

FIG. 12 is a construction view conceptually showing a fourth embodiment of the present invention. A speed detecting circuit 121 detects the actual speed of a body 127, and a target value setting circuit 122 sets, the actual speed set, as a target speed. Then, a target path setting means 123 calculates a target path speed providing a reference path which allows the convergence of the actual speed on the target speed in a desired response waveform at the time of ON of the resumption switch, for example, at a certain acceleration α at a return time. Based on the deviation between the actual speed and the target path speed, a control amount operation means 125 calculates a control amount to be outputted to an actuator 126 so that the deviation becomes zero. A convergence acceleration altering means 124 alters an acceleration in the convergence of the actual speed on the target speed to a small value when the deviation between the target path speed and the target speed becomes less than a certain value. Thus, the target path speed at the time of the termination of the resuming operation is amended to a smooth target path speed. Using the amended target path speed, the control amount operation means 125 effects a resumption control continuously. As a result, a resumption response can be accomplished without an overshoot in convergence.

The fundamental manner of altering an acceleration α in convergence of a target path speed on a target speed is described below. A target path setting means 123 calculates the target path speed Vd(t) obtained by adding the gradient of the target path in convergence, namely, the increased amount of a return acceleration α provided beforehand to the speed at the time of ON of the resumption switch. When the deviation between the target path speed Vd(t) and the target speed becomes less than a certain value, the cycle in calculating the target path speed is made to be short and the acceleration α is made to be small at a certain rate. Thus, the variation amount at the time of the convergence of the target path speed on the target speed becomes small and the target path does not change rapidly. As a result, discontinuity does not occur and an overshoot or an undershoot at the time of the convergence of the actual speed on the target speed in response to the resuming operation can be prevented. Accordingly, the apparatus provides a favorable constant travel speed without discomfort in a resuming operation.

The cycle of the target path speed in convergence may be constant, and the acceleration α may be performed not at a constant rate, but at a large rate when the deviation is great and at a small rate as the actual speed converges.

Figure 13:
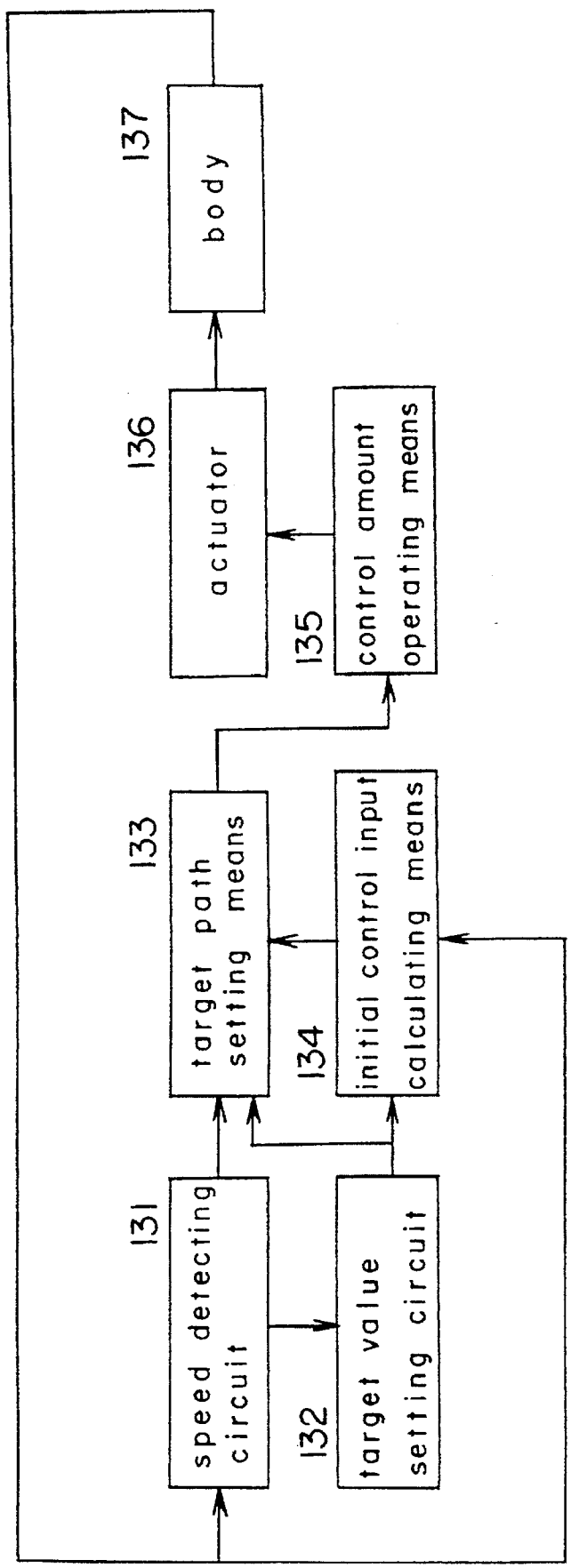
FIG. 13 is a descriptive view of the control input coefficient determining means of the fourth embodiment.

FIG. 13 is a construction conceptually showing a third embodiment of the present invention. A speed detecting circuit 131 detects the actual speed of a body 137, and a target value setting circuit 132 sets, the actual speed set, as the target speed. Then, a target path setting means 133 calculates a target path speed providing a reference path which allows the convergence of the actual speed on the target speed at a desired return acceleration α at the time of ON of the resumption switch. Based on the deviation between the actual speed and the target path speed, a control amount operation means 135 calculates a control amount to be outputted to an actuator 136 so that the deviation becomes zero. An initial target path altering means 134 alters the target path speed provided by the target path setting means 133 at the time of ON of the resumption switch to the actual speed value when the deviation becomes more than a certain value. Using the amended target path speed, the control amount operation means 135 effects a resumption control continuously. As a result, the influence of wasted time due to, for example, the loosening of a throttle wire can be removed and a smooth response control can be performed without a wasteful accelerating operation.

Figure 14A:
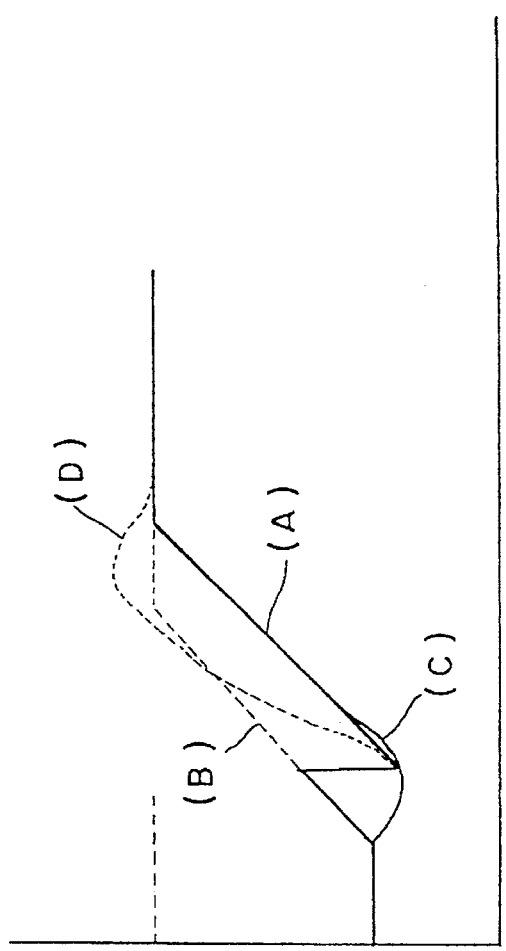
FIGS. 14(a) and 14(b) are charts showing the procedure of the control input coefficient determining means of the fourth embodiment.
Figure 14B:
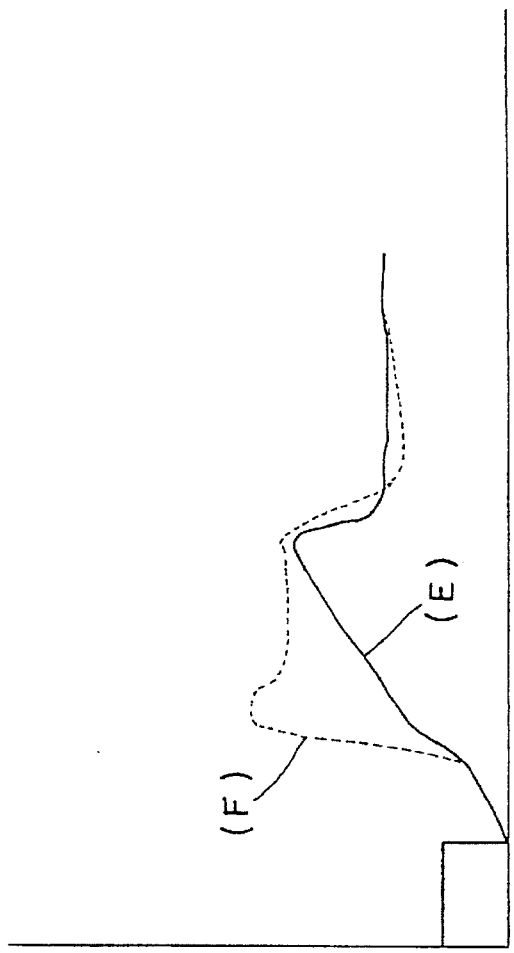

The fundamental manner for altering a target path at the time of turn-on of the resumption switch is described with reference to FIGS. 14(a) and 14(b). A line shown by a narrow broken line indicates a target path toward a target speed after the resumption switch is turned on. In this case, the initial target path is not altered. The response to the use of this target path speed is shown by a thick broken line D. The control input at this time is shown by a broken line F. When the target path is not changed, the opening amount of the throttle valve is excessive due to the operation for following the path. As a result, an overshoot may occur. Further, a rapid acceleration gives the driver discomfort. In order to prevent such an occurrence, after the resumption switch is turned on, the target path speed is reduced to the actual speed by the initial target path altering means if the actual speed is different from the target path speed by more than a certain value. Thus, the vehicle speed follows the target path speed accurately as shown by (C) in FIG. 14 and the control input amount is expressed by a smooth response waveform as shown by a straight line (E).

FIGS. 21 and 22 show test results of vehicles to examine the target path altering means. The control equation is expressed by equation 27 in which L=720 msec, best= 0.11808, and Ae=0.11574. The target path speed Vd is expressed by a gradient α in resuming time.

$$Vd=V0+\alpha*L \qquad (28)$$

where α=1.5 km/h/sec or 1.0 km/h/sec

In FIGS. 21 and 22, the target path is expressed by an acceleration showing a slope at resuming time. FIG. 21 shows the experimental result in a resuming operation in which a chassis experiment conducted on a vehicle (125/5600 (PS/rpm)) not equipped with a turbo engine, road gradient is 0% and speed range is 50 km/h~100 km/h. A set speed was cancelled when the vehicle was travelling at a speed of 100 km/h which was reduced with the throttle closed. When the speed was at 50 km/h, the resumption switch is turned on. As shown in FIG. 21, the target path speed is provided at a certain slope after the resumption switch is turned on while the actual speed was decreasing with the deviation between the actual speed and the target path speed increasing. But the initial target path altering means allowed the target path speed to coincide with the actual speed so as to obtain a smooth acceleration without an abnormal opening of the throttle valve. Further, the convergence acceleration altering means allowed the actual speed to converge on the target path speed smoothly without an overshoot.

FIG. 22 shows an experimental result in a resuming operation in which an experiment was conducted on the same vehicle at a gradient of +3% and 70 km/h~100 km/h. Similar to FIG. 21, the target path was altered after the resumption switch is turned on and the target path speed coincided with the actual speed, but the deviation between target path speed and the actual speed increased again. Therefore, the target path amending means discriminated that the actual speed was incapable of following the target path speed by the acceleration for providing the target path, thus altering the acceleration. As a result, a favorable response to the resuming operation can be obtained.

Figure 15:
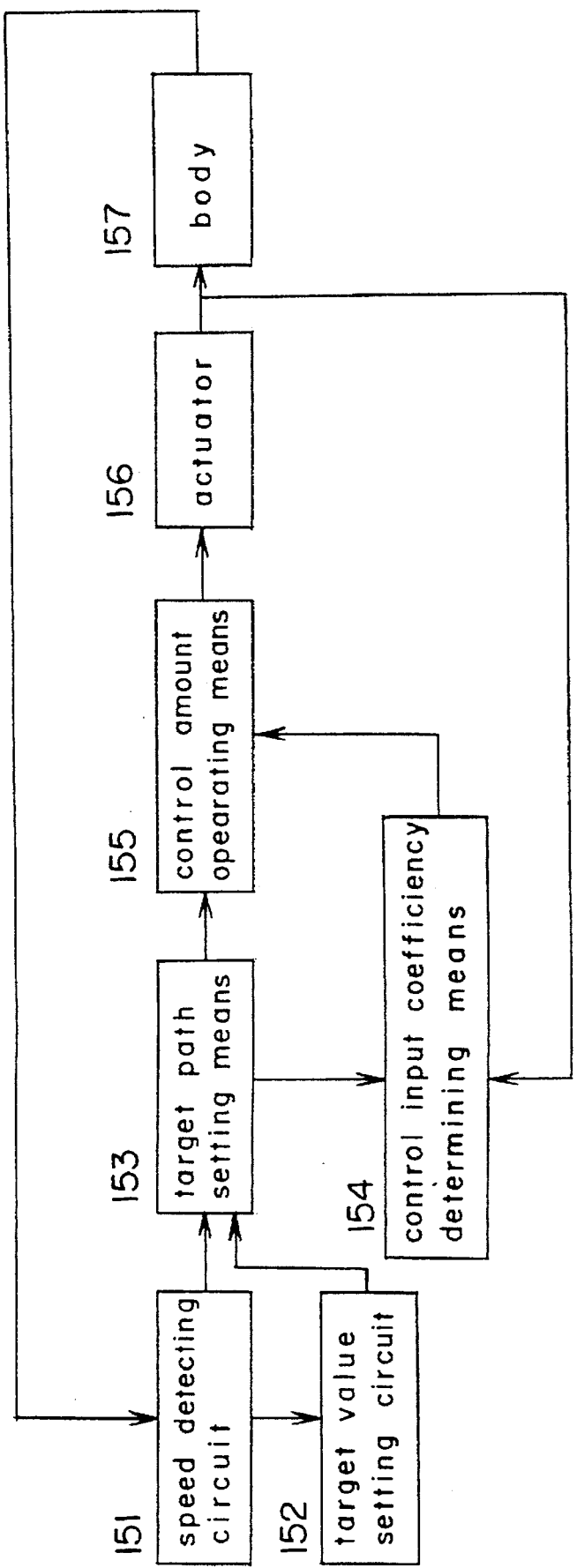
FIG. 15 is a construction view showing the concept of a fifth embodiment of the present invention.

A rule for automatically altering a control gain is described below. FIG. 15 is a conceptual view showing a fifth embodiment of the present invention. A speed detecting circuit 151 reads the actual speed of a body 157, and a target value setting circuit 152 sets, the actual speed set, as a target speed. Then, a target path setting means 153 calculates a target path speed providing a reference path which allows the convergence of the actual speed on the target speed in a desired response waveform. Based on the deviation between the actual speed and the target path speed, a control amount operation means 155 calculates a control amount to be outputted to an actuator 156 so that the deviation becomes zero. Based on the output value of the actuator 156 and the deviation, the control input characteristic best of the control amount operation means 155 is altered to a control input characteristic according to each travel condition by a control input coefficient determining means 154. Using the calculated control input characteristic best, the control amount operation means 155 keeps the constant travel speed control.

Figure 16A:
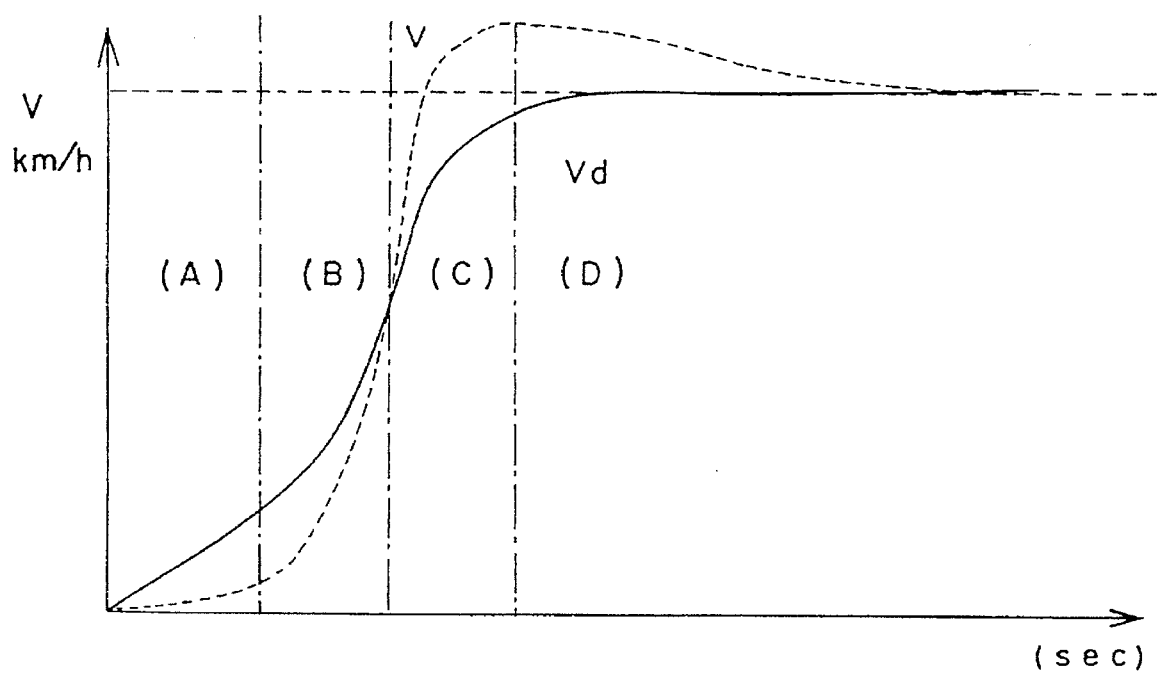
FIGS. 16(a) and 16(b) are flowcharts showing the procedure of the coefficient range amending means and the initial control input calculating means to be used in the fifth embodiment according to the present invention.
Figure 16B:
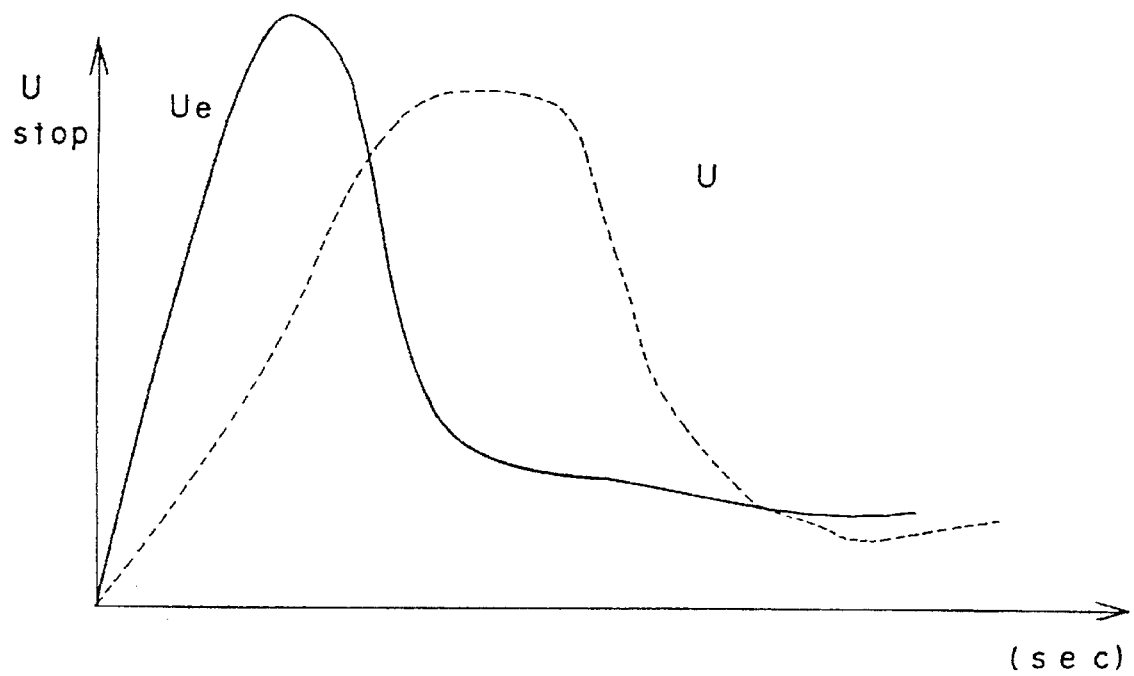

The following description is concerned with the fundamental manner for altering the control input characteristic best for allowing the actual speed to converge on the target path speed favorably when the control input characteristic best and the input distribution characteristic b of an actual object are different from each other. In order to form a rule for determining the control input characteristic best by using the deviation between the actual speed and the target path speed, the differentiated value thereof, and the position/speed of the actuator, FIG. 16-a shows the target path speed Vd and speed V which is the output of the object to be controlled by the apparatus when the input characteristic best (control input characteristic) of the controller is greater than the actual input distribution characteristic b. FIG. 16-*b* shows the input to the actuator. In FIG. 16-*b*, Ue indicates an input when the input characteristic best=b (b>0). As shown in FIG. 16-*a*, four conditions (A) through (D) are considered. The method for changing best is described with reference to the flowchart of FIGS. 17-*a* and 17-*b*. First, a resuming operation starts at step 172. At step 142, the control input characteristic best is set to $b_{MAX}$. It is decided at steps 173 through 177 whether or not a control input oscillates. If yes, the control input characteristic best is made to be large to move the system in a stable condition to prevent an oscillation. More specifically, it is decided at step 173 whether or not the product of the differentiated values (differentiated value of deviation is permitted) of two inputs an L time apart from each other is negative. If the product is negative, it is decided that the control input has oscillated a great deal, so that the control input characteristic best is made to be large at step 174 in order to accomplish a stabilization. Then, it is decided at step 175 whether or not the absolute value of the deviation is greater than a value FA. If no, it is decided at step 176 whether or not the control input oscillates in a small extent in a constant travel speed. If yes, the control input characteristic best is made to be large at step 177. If no, at step 176, it is decided at step 148 whether or not the absolute value of the deviation is greater than a certain value FB. If yes, the control input characteristic best is made to be small at step 1712 and the target path suitable for the capability of each vehicle is selected at step 1714. If the condition is as shown by (A) of FIG. 16, i.e., if it is decided at step 179 that the deviation is greater than f1 and at step 1710 that the differentiated value of the deviation is greater than f2, it is decided at steps 1711 and 1713 which of the following cases suits this decision. At steps 1714 and 1715, the control input characteristic best and the target path are altered. The condition of (A) is as follows:

[a-1]: Like an ascending slope, the input characteristic best of the controller is greater than the actual input distribution characteristic b, and consequently, the increased amount of the controller is small and an input is not obtained sufficiently.

[a-2]: Condition in which speed is not increased by engine capability although the actuator is fully opened.

[a-3]: A desired input cannot be obtained due to a delayed operation of the actuator.

The above is summarized as follows:

[a-1] e(t)>f1, Δe(t)>f2, U(t)≦g1, and ΔU(t)≦g2, the control input characteristic best is decreased.

[a-2] e(t)>f1, Δe(t)>f2, U(t)≧g1, target path is altered.

[a-3] e(t)>f1, Δe(t)>f2, U(t)≦g1, and ΔU(t)≧g2, target path is altered.

Similarly, condition (B) of FIG. 16 is as follows: That is, it is decided at step 1710 that the deviation is greater than f1 and it is decided at step 1710 that the differentiated value of the deviation is smaller than the set value f2, namely, negative. The following conditions are considered as condition (B):

[b-1]: best>0; best is still greater than b in spite of the reduction of best and increase of input in (A) portion. Therefore, the input is not reduced to a sufficient degree. The deviation is reduced below the target deviation characteristic value.

[b-2]: Like a descending slope, the actual input distribution characteristic b is increased more than the value of the input characteristic sed currently by the controller.

[b-3]: best is not altered except the above case.

The above decision is made at steps 1716, 1717, and 1719 and best is altered at steps 1418 and 1429. The above relationship is summarized as follows:

[b-1]: e(t)>f1, Δe(t)<f2, e is reduced below the target deviation characteristic, U(t)≧g3, and ΔU(t)≧g4, best is reduced.

[b-2]: e(t)>f1, Δe(t)<f2, e is reduced below the target deviation characteristic, U(t)≦g3, best is increased.

[b-3]: e(t)>f1 and Δe(t)<f2, and except the above, best is not altered.

Similarly, condition (C) of FIG. 16 is as follows: That is, it is decided at step 1721 that the deviation is smaller than f3, namely, smaller than a negative value and it is decided at step 1723 that the differentiated value of the deviation is smaller than the set value f2, namely, negative. The following conditions are considered as condition (C):

[c-1]: best>b; best is still larger than b in spite of the reduction of best and increase of input in (B) portion. As a result, the target path is followed. But best is still greater than b, so that input is not reduced to a sufficient degree.

[c-2]: Like a descending slope, the actual input distribution characteristic b is increased more than the value of the input characteristic used currently by the controller.

[c-3]: best is not altered except the above case.

The above decision is made at steps 1724 and 1726 in which of (C) the current condition is and best is altered at steps 1725 and 1727. The above relationship is summarized as follows:

[c-1]: e(t)<f3, Δe(t)<f2, U(t)≧g3, ΔU(t)≧g4, best is reduced.

[c-2]: e(t)<f3, Δe(t)<f2, U(t)≦g3, target path is altered.

[c-3]: e(t)<f3, Δe(t)<f2, U(t)≧g3, target path is altered.

Similarly, condition (D) of FIG. 16 is as follows: That is, it is decided at step 1721 that the deviation is smaller than f3, namely, smaller than a certain negative value and it is decided at step 1723 that the differentiated value of the deviation is greater than the set value f2, namely, positive. The following conditions are considered as condition (C):

[d-1]: best>b, a sufficient reduction of input is not obtained, and the deviation is reduced below the target deviation characteristic.

[d-2]: Like an ascending slope, the actual input distribution characteristic b is reduced.

[d-3]: best is not altered except the above case.

It is decided at steps 1728 and 1729, and 1730 in which of (C) the current condition is and best is altered at steps 1731 and 1732. The above relationship is summarized as follows:

[d-1]: e(t)<f3, Δe(t)>f2, e is reduced below the target deviation characteristic, U(t)≦g1, and ΔU(t)≦g2, best is reduced.

[d-2]: e(t)<f3, Δe(t)>f2, e is reduced below the target deviation characteristic, U(t)≧g1, best is reduced.

[d-3]: e(t)<f3, Δe(t)>f2, best is not altered.

$$|(1-\exp(-K \cdot L)) \cdot e(t-L)| < |e(t-L) - e(t)| \qquad (29)$$

Figure 17A:
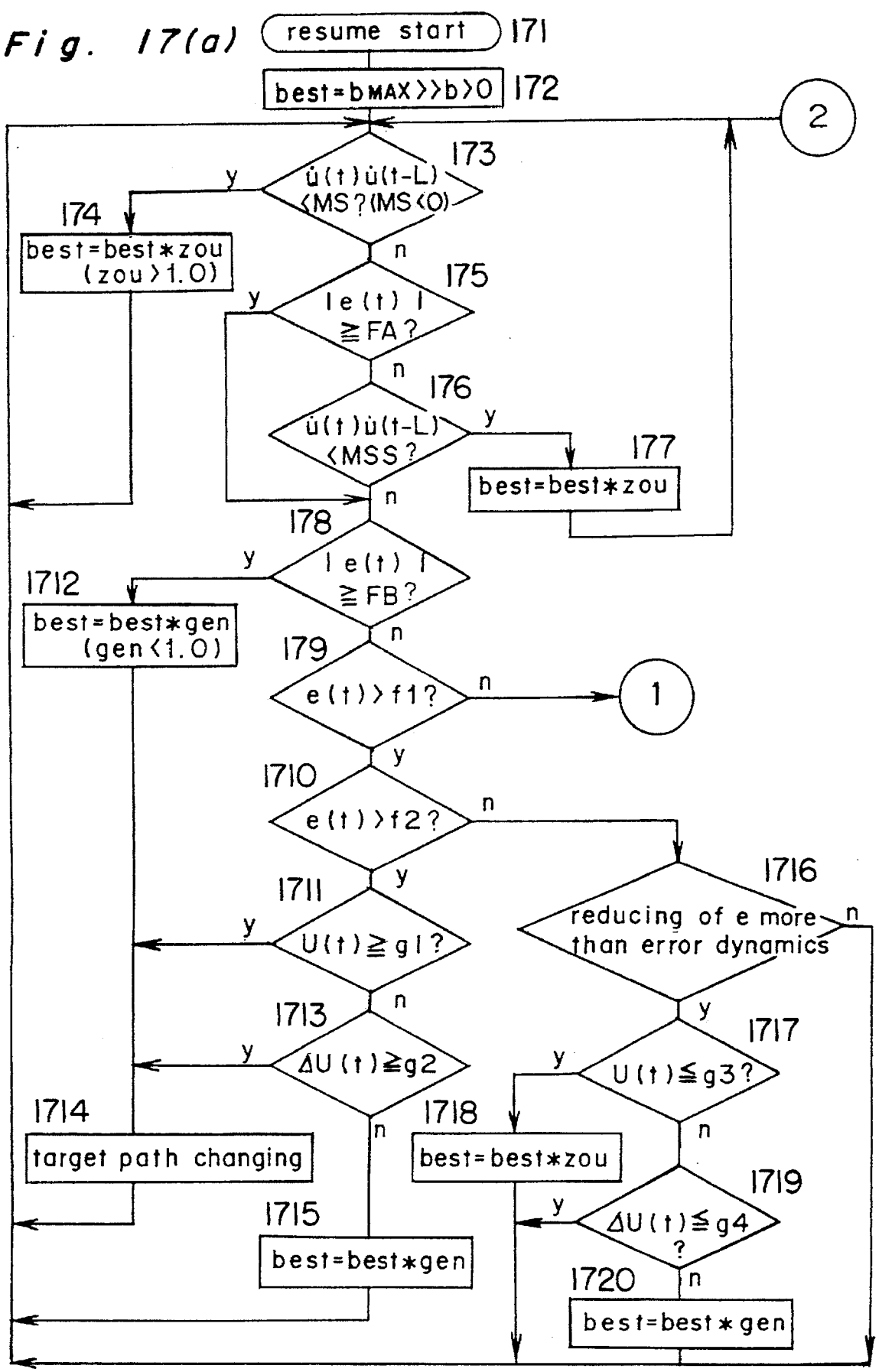
FIGS. 17(a) and 17(b) are construction views showing the concept of a sixth embodiment of the present invention.
Figure 17B:
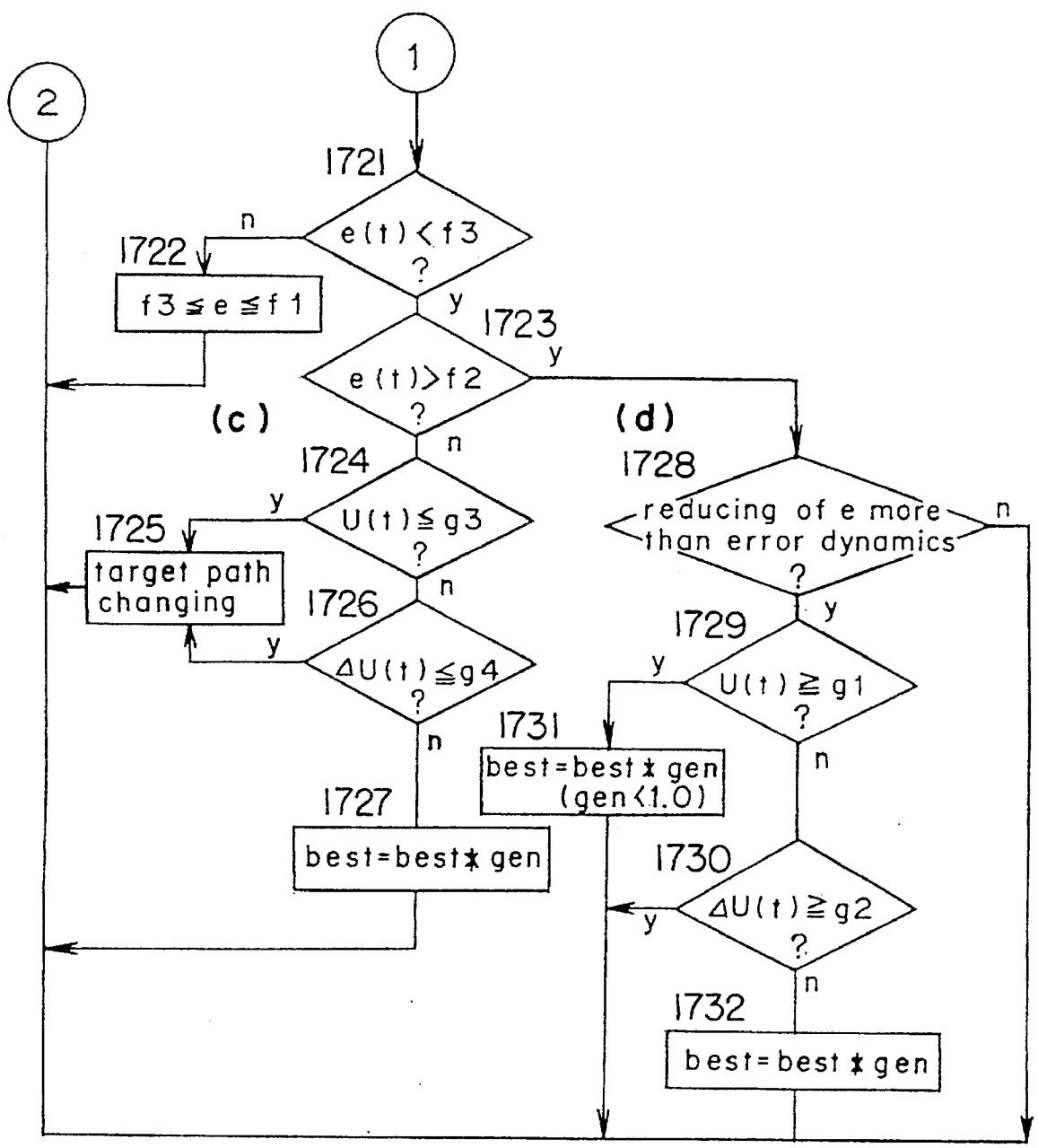

In the above rule [a-1] to [d-1], if an object to be controlled by the apparatus comprises a system expressed by a higher order function, it is possible to generate a rule using a higher order differentiated value of the deviation. Thus, best can be altered by using a rule conforming to an object. In FIGS. 17(*a*) and 17(*b*), the alteration portion of best is set as follows: best=best*zou (zou>1.0), best=best*gen (gen<1.0), but coefficients zou and gen are given in the form of numerical values or in the following equations:

$$zou = 1 + |e| \cdot uk$$

$$gen = 1 - |e| \cdot uk \quad (uk>0) \qquad (30)$$

It is to be noted that input/output variable in the rule is expressed in a fuzzy variable and best may be estimated by direct method or indirect method.

As described above, according to the present invention, the initial control input characteristic best is set as the maximum value $b_{MAX}$ of the initial control input characteristic b, a constant travel speed control is made in advance by a target path normalized by the map, and an appropriate target path speed according to the capability of a vehicle can be found by the target path amending means by using the deviation or at least one higher order differentiated value of the deviation and the average speed of the actuator and position thereof. If the initial control input characteristic differs greatly from the input distribution characteristic of a vehicle equipped with the constant travel speed control apparatus, the control input characteristic is altered by the control input coefficient determining means by using the deviation or at least one higher order differentiated value of the deviation and the average speed of the actuator and position thereof, and the control input is calculated by the control amount operation means by using the control input characteristic. Thus, the converging performance for converging the actual speed on the target speed can be made to be constant and the actual speed stably follows the target path without being affected by the change of a vehicle dynamic character which occurs due to, for example, the fluctuation of a travel load.

The apparatus has a similar effect for an object, of one input-one output expressed by a higher order function, which is under the time delay control. The control amount operation means may be constructed with a digital circuit. In this case, a sampling cycle is lagged by time L or an integer multiple of the sampling cycle is set as time L. Thus, the apparatus has an effect similar to the above-described effect. If a differentiated value of a speed cannot be detected, the deviation may be used.

The method for reducing the variation range of best and calculating an appropriate initial control input amount are described below with reference to figures.

First, the system construction and the construction of the control system are described.

Figure 18:
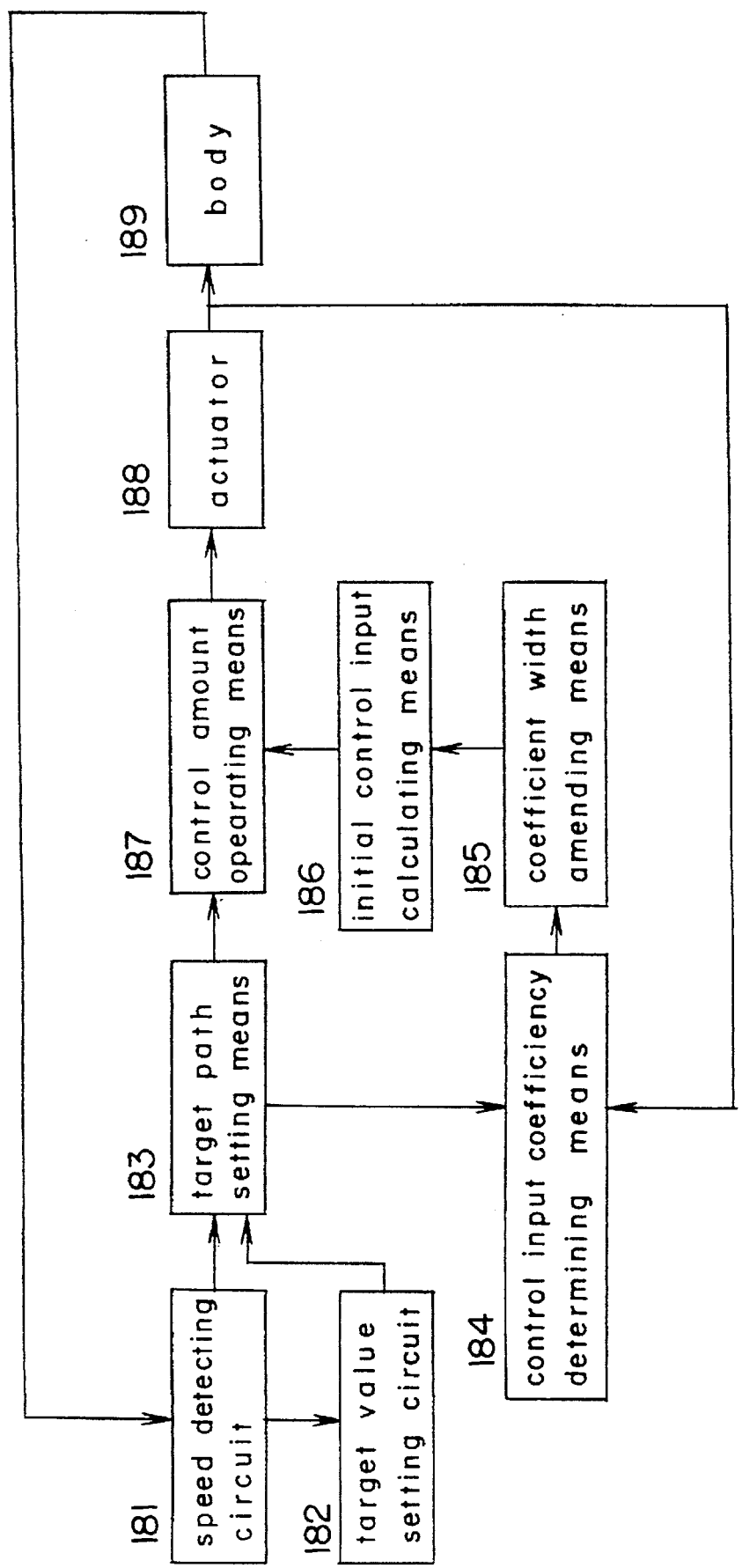
FIG. 18 is a construction view showing the concept of a seventh embodiment of the present invention.

FIG. 18 is a construction view showing a seventh embodiment of the present invention conceptually. A speed detecting circuit 181 reads the actual speed of a body 189, and a target value setting circuit 182 sets, the actual speed set, as a target speed. Then, a target path setting means 183 calculates a target path speed providing a reference path which allows the convergence of the actual speed on the target speed in a desired response characteristic, namely, at a certain acceleration α in a resuming time. The target speed is set as the target path speed at the initial setting. Based on the deviation between the actual speed and the target path speed, a control amount operation means 187 calculates a control amount to be outputted to an actuator 188 so that the deviation becomes zero. Based on the output value of the actuator 188 and the deviation, the control input characteristic best of the control amount operation means 187 is altered to a control input characteristic according to each travel condition by a control input coefficient determining means 184. Using the calculated control input characteristic best, the control amount operation means 187 keeps the constant travel speed control. A coefficient range amending means 185 observes the condition of the change of the calculated control input characteristic best, thus determining the value of a subsequent initial control input characteristic best, namely, the upper limit value of the fluctuation range of the initial control input characteristic best and the minimum value of the control input characteristic best, namely, the lower limit value of the fluctuation range of the control input characteristic. An initial target opening amount of the throttle valve according to the kind of vehicle or the road situation can be obtained by the initial control input calculating means 186 which calculates the initial control input amount U(O) in the initial setting or resuming operation by using best0.

The fundamental manner for determining the fluctuation range of the control input characteristic for each vehicle, namely the upper and lower limit values is described below. First, during a constant travel speed, the control input coefficient determining means alters the control input characteristic best according to a travel ta exceeds T1. At step 197, ta is cleared and the upper limit value best0 is reduced by a certain value gen at step 198. At steps 199 and 1910, the fluctuation range of the control input characteristic best is adjusted to become more than a certain value H. If it is decided at step 194 that the control input has oscillated, the upper limit value best0 is increased by a certain value zou at step 1911 and best0 is adjusted not to exceed $b_{MAX}$ at steps 1912 and 1913. A flag for deciding whether or not an oscillation has occurred is set to "1" at step 1914. It is prevented at step 195 that best does not become smaller than best0.

The method for altering the lower limit value best1 is described below with reference to FIG. 19(b). It is decided at step 1915 whether or not the updated control input characteristic best is smaller than the minimum value bm of previous times. If yes, the counter tb is reset to "0" at step 1916 and the minimum value bm is updated at step 1917. It is decided at step 1918 whether or not the current best is equal to the minimum value bm. If yes, it is decided at step 1919 whether or not this condition exceeds a certain period of time T2 according to the value of the counter tb. If yes, the counter tb is reset to "0" at step 1920 and it is decided at step 1921 whether or not the minimum value bm is equal to the current lower limit value best 1. If yes, the counter tc is reset to "0" at step 1922 and the lower limit value best1 is reduced by the value gen condition. The initial value of the control input characteristic best at the start of the initial cruise, namely, the upper limit value best0 of the fluctuation range is set to the maximum value $b_{MAX}$ of the input distribution characteristic b of all vehicles equipped with the apparatus for safety because it is difficult to clarify the kind of vehicle.

Figure 19A:
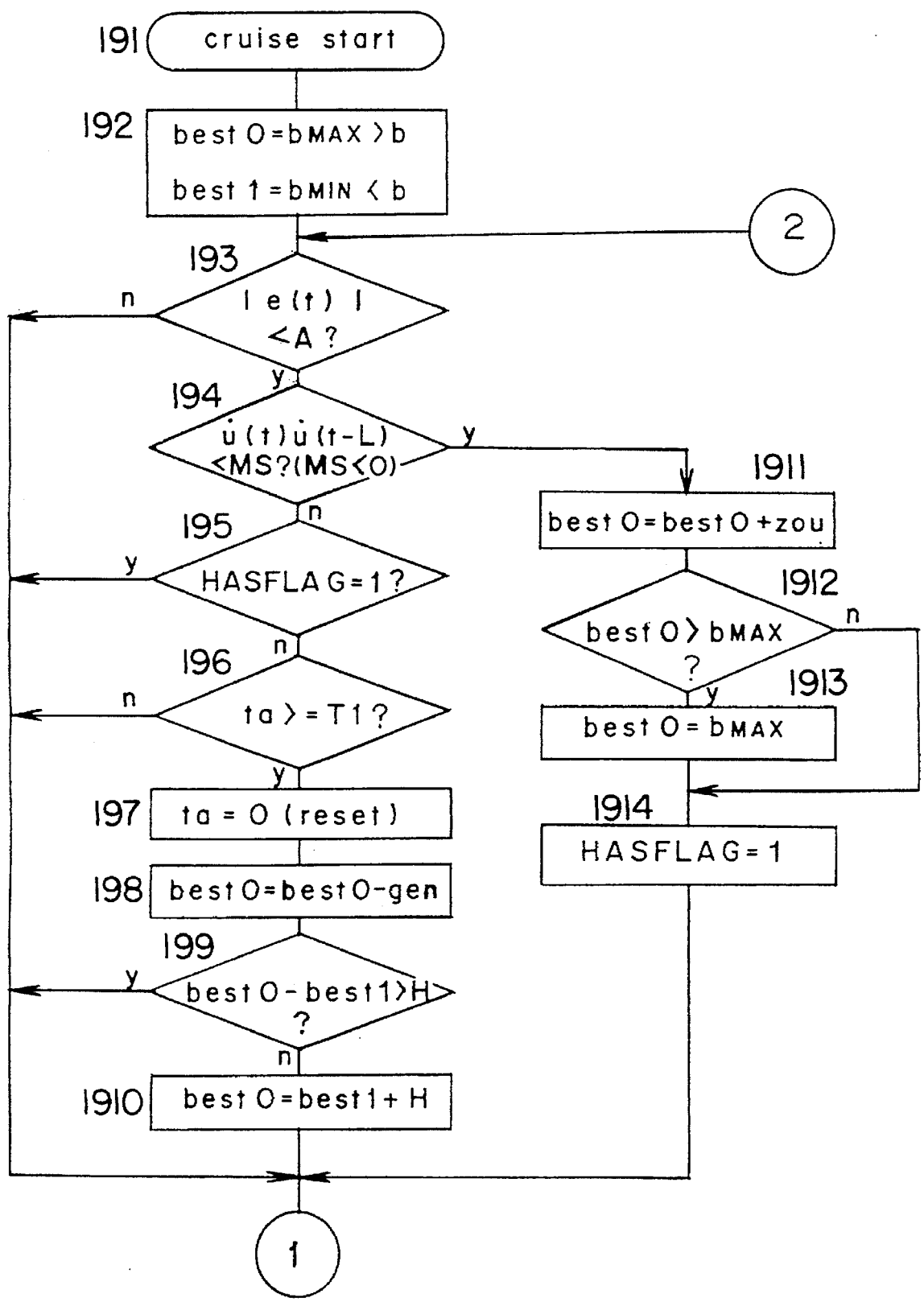
FIGS. 19(a) and 19(b) are concept views showing the speed response of the initial target path altering means and a control input amount of the seventh embodiment of the present invention.
Figure 19B:
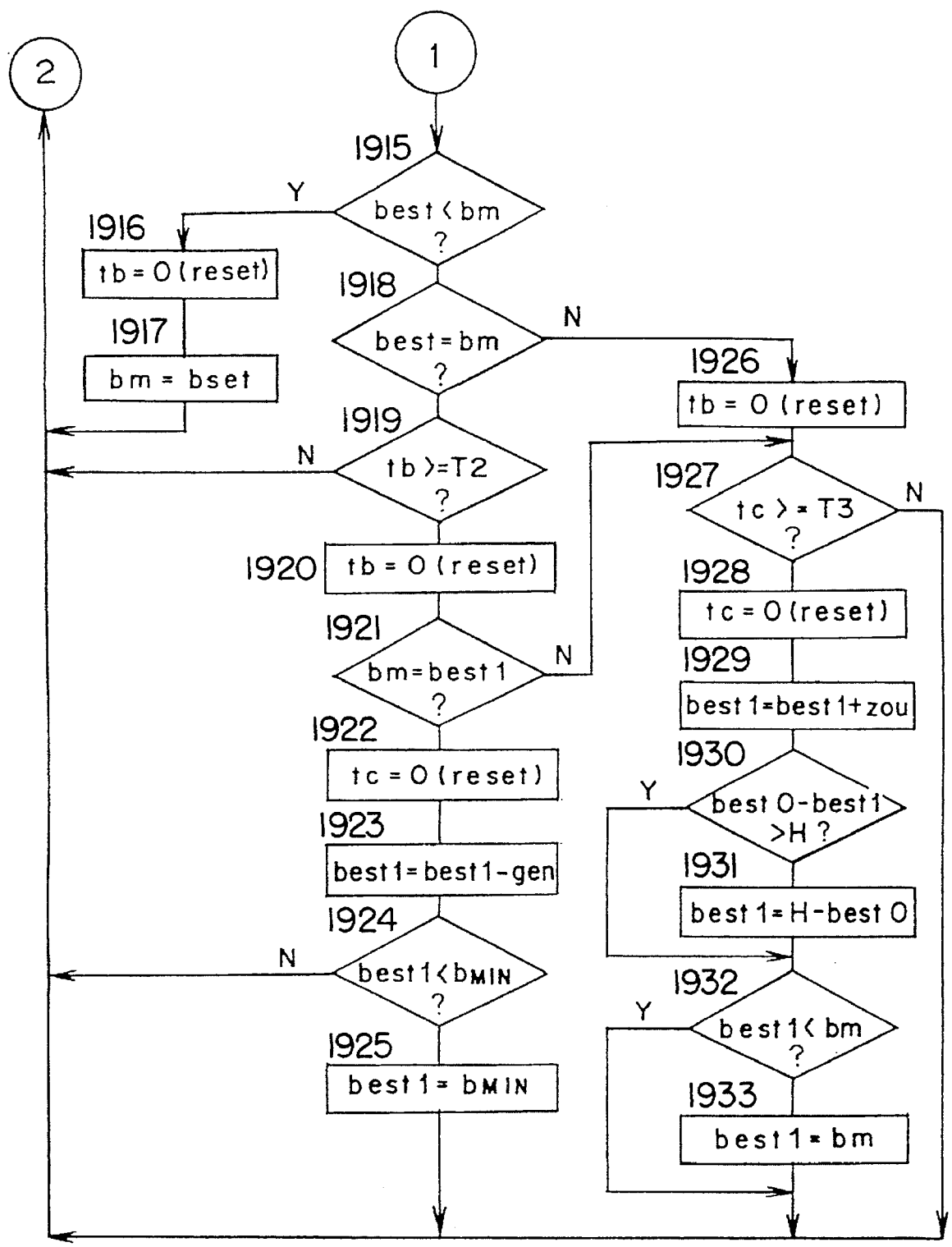

FIGS. 19(a) and 19(b) show flowcharts for the coefficient range amending means to update the upper limit value best0 and the lower limit value best1.

At step 191, a switch for a cruise operation starts. As a result, a constant travel speed control starts. At step 192, the upper limit value best0 and the lower limit value best1 are set to $b_{MAX}$ and $b_{MIN}$, respectively. At steps 193 through step 1914, the upper limit value best0 is updated. The lower limit value best1 is updated at steps 1915 through 1933. The control input coefficient determining means is always updating best. It is decided at step 193 whether or not the vehicle is traveling at a constant speed, namely, whether or not the absolute value of the deviation is smaller than a certain value A. If yes, it is decided at step 194 whether or not the control input oscillates. If no, it is decided at step 195 whether or not the control input has oscillated. If no, the program goes to step 197 when the period of time of a stable travel exceeds a certain set time T1, namely, when a counted value at step 1923. At steps 1924 and 1925, the updated lower limit value is smaller than $b_{MIN}$. If no, at step 1918, the program goes to step 1926 at which the counter tb is reset to "0" and it is decided at step 1927 whether or not the condition in which the minimum value bm of bset is greater than the lower limit value best1 exceeds a certain period of time T3 according to the counter tc. If yes, the counter tc is reset to "0" at step 1928 and the lower limit value best1 is increased by the value zou at step 1929. At steps 1930 and 1931, the upper limit value and the lower limit value are maintained to have a certain width H and the updated lower limit value is prevented from exceeding the minimum value bm of best. According to the above operation, the upper limit value best0 and the lower limit value best1 are altered to an appropriate value, respectively and updated according to the kind of a vehicle or a travel condition while they maintain a value greater than the range H between the maximum value $b_{MAX}$ and the minimum value best1. The updated value is stored at a cancellation time or OFF of the main switch. Therefore, the initial control amount U(0) at a subsequent setting time or resuming time is calculated as follows by the initial control input calculating means by using the updated upper limit value best0.

$$U(0)=V*best0 \qquad (31)$$

where V is a speed at the time of the ON of switch and (a) is a constant of a vehicle dynamic characteristic. A speed at the initial setting is a target speed and a speed in resuming operation brought about due to ON of the resumption switch is an actual speed.

As apparent from the above description, the initial control input characteristic can be obtained according to a vehicle by updating the initial control input characteristic best0 by the coefficient range amending means. Further, the initial control input amount upon turn-on of the resumption switch can be calculated. Therefore, the occurrence of an overshoot in the resuming operation can be reduced even though a vehicle speed is reduced. Thus, a constant speed travel control can be made with a high accuracy. A different value may be used for the increase and decrease of the upper and lower limit values. The upper and lower limit values may be found by performing a multiplication by a certain rate.

Figure 24:
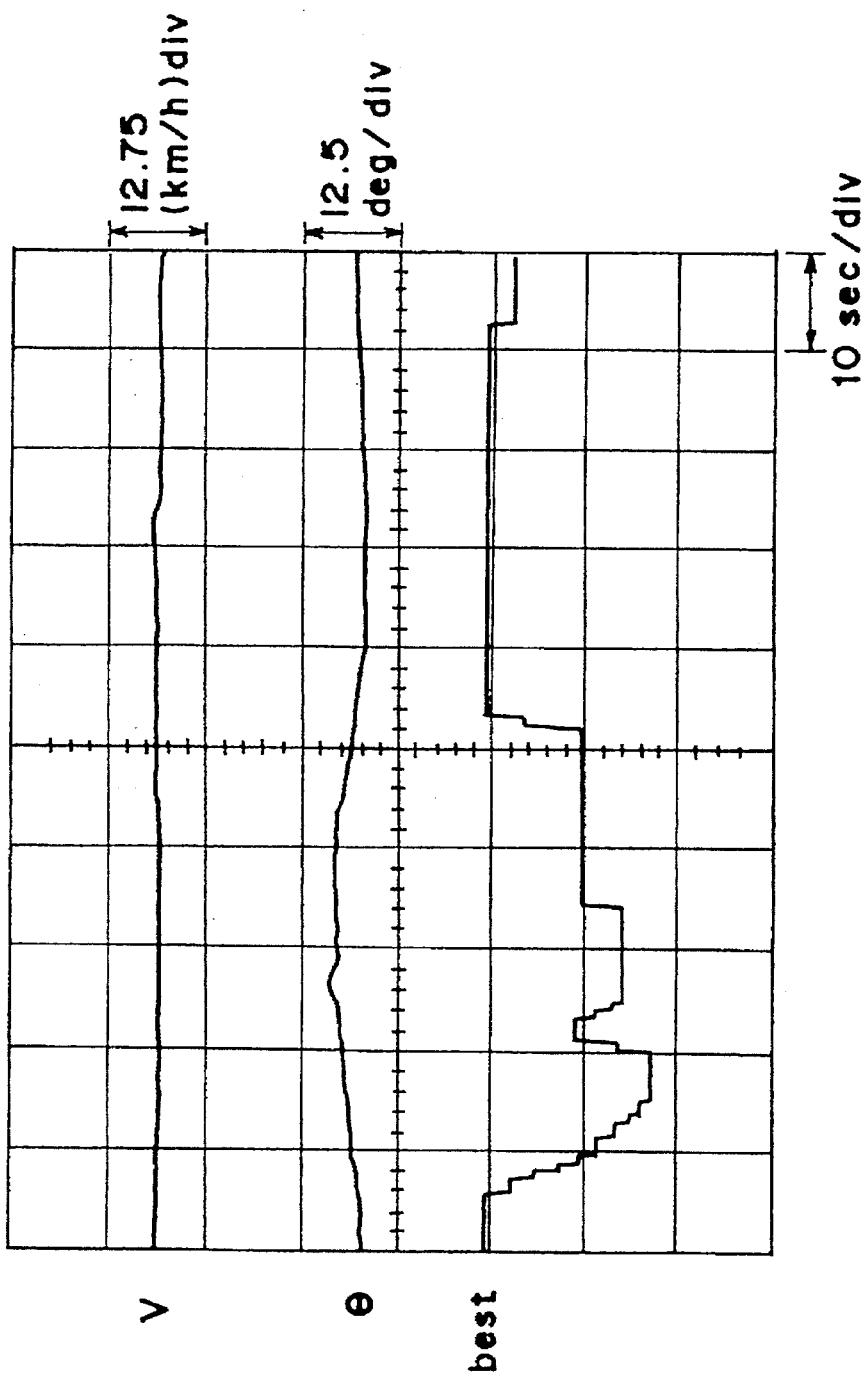

FIGS. 23 and 24 show data of experimental results conducted on a vehicle of 2000 cc equipped with a turbo engine (205/6400(PS/rpm)) by using the control input coefficient determining means. The control equation is given by equation (25) and the initial value of best0 is 0.2315. FIG. 23 shows a setting operation on a plane road at a speed of 80 km/h. The control input characteristic best is reduced at the initial setting, but stopped at a certain value. Thus, a stable constant speed travel control can be accomplished. FIG. 24 shows a result conducted on the same vehicle which traveled at a speed of 100 km/h on an ascending or descending road. With the approach of the vehicle to an ascending slope, the estimated value best decreased a little and increased with the approach thereof to a descending slope. With the decrease and increase thereof, the control input to the actuator increased and decreased, but the vehicle speed was constant and the actual speed followed the target speed with a high accuracy. These experiments revealed the effectiveness of the algorithm for altering the control input characteristic. Travel experiments by way of the algorithm provided with the method for automatically correcting a target path and altering the control gain were conducted on two kinds of vehicles by the same software. The control equation is given by equation (25) and the target path speed is given by equation 26. L is 360 msec and best0 is 0.2315. FIGS. 25(*a*) through 25(*d*) and FIGS. 26(*a*) through through 26(*d*) show experimental results of chassis travel of vehicles of 3000 cc (280/6200(PS/rpm)) and 3000 cc (180/6000(PS/rpm)). FIGS. 25(*a*) and 26(*a*) show a setting operation of 100 km/h at a gradient of 3% and a control in resuming operation of 50 km/h to 100 km/h. FIGS. 25(*b*), 25(*c*), 26(*b*), and 26(*c*) show setting operations and resuming operations in the same condition as those of FIGS. 25(*a*) and 26(*a*) at 0% and −3%, respectively. FIGS. 25(*d*) and 26(*d*) show experimental results of speed response when a sudden gradient change occurred from +3% to −3% and from −3% to +3% during the travel at a speed of 100 km/h. It can be said from the above result that a control for allowing a vehicle to travel stably and accurately can be made irrespective of the kinds of vehicles and gradients. Further, vehicles reach the target speed in a desired response waveform without an overshoot. Thus, a robust control can be accomplished regardless of the kind of vehicle and the change of road gradient.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An auto-drive control apparatus for use in a vehicle, comprising:

a speed detecting circuit for detecting an actual speed V(t) of the vehicle at a time (t), an actuator for adjusting the speed of the vehicle through a throttle valve of an engine, a target value set circuit for setting a target speed Vset, a control amount operation means for calculating a control amount to be inputted into the actuator for adjusting the speed of the vehicle, and, a target path set means for setting a target path Vd(t) denoting a time rate function of the speed of the vehicle as a function of time (t) at which the vehicle is to reach the target speed Vset from the actual speed V(t), wherein the control amount operation means calculates the control amount to be inputted into the actuator to effect a control process in which the actual speed V(t) detected by the speed detecting circuit becomes the target speed Vset in accordance with the target path Vd(t).

2. An apparatus as defined in claim 1, further comprising:

a command circuit for outputting an auto-drive start signal to initiate an auto-drive operation in which the speed of the vehicle is controlled to said target speed, an auto-drive stop signal to stop the auto-drive operation, and a resume signal to reinitiate the auto-drive operation using the target speed of the auto-drive operation prior to a previous stopping of the auto-drive operation in response to the auto-drive stop signal, wherein the target value set circuit sets the target speed responsive to the auto-drive start signal of the command circuit, wherein the control amount operation means includes means for effecting an adaptive learning process in which a control input parameter thereof is used for adaptively calculating the operation amount and is more than half a vehicle system input parameter which is an input coefficient of a transfer function between an input of said actuator and an output of said speed detecting circuit and in which a vehicle system parameter except for said vehicle system input parameter is estimated using a time delay process wherein a current unknown value of a variable of the vehicle system parameter is calculated from a previous known value of the variable of the vehicle system parameter and a predetermined estimated constant variation of the variable during a minute time duration from the current unknown value and the previous known value of the variable, and wherein the target path set means sets the target path Vd(t) responsive to the resume signal of the command circuit.

3. An apparatus as defined in claim 2, further comprising a target path select means for selecting, from among a plurality of different target paths stored in advance, a target path which is determined most suitable for a driver of the vehicle, wherein the target path set means sets the selected target path as the target path Vd(t).

4. An apparatus as defined in claim 3, further comprising a return speed error detecting means for determining a deviation between the target speed and the actual speed immediately after recognizing the resume signal from the command circuit, wherein the target path is selected by said target path selecting means according to the deviation determined by the return speed error detect means.

5. An apparatus as defined in any of claims 2–4, wherein said target path set means stores in advance more than two different target paths which are normalized with respect to a vehicle speed.

6. An apparatus as defined in any of claims 2–4, wherein an acceleration $\alpha$ of the vehicle upon receipt of the resume signal is employed to set the target path Vd(t).

7. An apparatus as defined in claim 1, wherein the control amount operation means includes means for effecting a time delay control process to calculate the operation amount by utilizing a previous value U(t−L) of the operation amount existing a minute time L prior to a current value U(t), an nth-order differential value of the actual speed V(t−L) existing at the minute time L prior to the current actual speed v(t), an nth-order differential value of the target path, an (n−1)th-order differential equation and a control input parameter, such that said (n−1)th-order differential equation has said actual speed differential value and said target path differential value multiplied by respective constant coefficients of a deviation e(t) between the proceeding target path Vd(t) and the output V(t) of the speed detecting circuit and a deviation feedback coefficient ki (>0, i=n−1 to 0) and, where a value of the control input parameter is more than at least half a maximum value of a vehicle system input parameter which is an input coefficient of a transfer function between an input of said actuator and an output of said speed detecting circuit, wherein the output V(t) from the speed detecting circuit is controlled to coincide with the target path Vd(t).

8. An apparatus as defined in claim 7, further comprising a target path amend means for determining a new time (t) rate function of the target path Vd(t) according to at least one predetermined target path amendment rule based on an average speed of the actuator, a position of said actuator, a deviation between the actual speed of the vehicle and the target speed and at least one of the differential values of the deviation up to an nth-order.

9. An apparatus as defined in claim 8, wherein in the path amend rule of the target path amend means, the deviation and the at least one of the differential values of the deviation up to an nth-order being inputted as variable factors are compared with first set values, and the average speed of the actuator and position of the actuator are compared with second set values, and wherein in accordance with the respective results of comparison, the target path Vd(t) is represented by output variable factors given by a real number value obtained by a calculation of linear or non-linear functions employing at least one of the deviation or the differential value of the deviation, or by employing a variable number decide rule expressing the input and output variable factors with fuzzy variable numbers.

10. An apparatus as defined in claim 8 or 9, wherein the target path set means includes converged acceleration change means for changing a vehicle acceleration $\alpha$ so as to converge smoothly the actual speed to the target speed when the deviation between the target speed and the actual speed is less than a certain set value.

11. An apparatus as defined in claim 10, wherein the converged acceleration change means is adapted to reduce the acceleration $\alpha$ when the deviation between the actual speed and the target speed upon receipt of the resume signal becomes less than a certain set value.

12. An apparatus as defined in claim 8 or 9, wherein the target path set means includes an initial target path change means for determining a new target path upon shifting the target path so as to coincide with the actual speed when the deviation e(t) having been measured from the time of initiating a resume of auto-drive control becomes larger than a certain set value.

13. An apparatus as defined in claim 7, further comprising a control input coefficient decide means for finding the control input parameter on the employment of more than one coefficient decide rules upon estimating the deviation between the target path and the actual speed, or at least one of the differential values of the deviation up to an nth order, and the average speed of the actuator and position of the actuator.

14. An apparatus as defined in claim 13, wherein the deviation and the at least one of the differential values of the deviation up to nth-order being inputted as variable factors are compared with first set values, and the average speed of the actuator and position of the actuator are compared with second set values and, wherein in accordance with the respective results of comparison the control input parameter is given by a real number value obtained by a calculation of linear or non-linear functions employing at least one of the deviation and the differential value of the deviation.

15. An apparatus as defined in claim 7, further comprising:

a control input parameter decide means for estimating a control input parameter according to at least one predetermined parameter determining rule based on an average speed of the actuator, a position of said actuator and a deviation between the actual speed of the vehicle and the target speed and at least one of the differential values of the deviation up to nth-order, a parameter width amend means for changing both an initial maximum value of said control input parameter and a minimum value of said control input parameter according to a change in said estimated control input parameter to restrict a changing width of the control input parameter, and an initial control input calculate means for calculating an initial control input amount based on said initial maximum value of the control input parameter.

16. An apparatus as defined in claim 15, wherein, in the initial control input calculate means, an initial control input amount U(0) is given by the value of V0*a/best0, where best0 is the initial maximum value of the control input parameter, V0 is the actual speed at the time of setting the target speed and a is a constant.

17. An apparatus as defined in claim 15, wherein in the parameter width amend means, initial values of a maximum best0 and a minimum best1 of the control input parameter are respectively a maximum value and a minimum value of the vehicle system input parameter of different vehicles.

18. An apparatus as defined in any one of claims 7–9 or 13–17, wherein the minute time L is a control period, and the control apparatus operates as a discrete time system.

* * * * *